United States Patent [19]
Christ

[11] Patent Number: 5,977,913
[45] Date of Patent: Nov. 2, 1999

[54] METHOD AND APPARATUS FOR TRACKING AND LOCATING PERSONNEL

[75] Inventor: Roger Christ, Herndon, Va.

[73] Assignee: Dominion Wireless, Sterling, Va.

[21] Appl. No.: 09/018,897

[22] Filed: Feb. 5, 1998

Related U.S. Application Data

[60] Provisional application No. 60/038,037, Feb. 7, 1997.

[51] Int. Cl.$^6$ ............................... G01S 3/02; G08B 5/22
[52] U.S. Cl. ................................. 342/465; 340/825.36
[58] Field of Search ............................ 342/465, 42, 44

[56] References Cited

U.S. PATENT DOCUMENTS

| | | | |
|---|---|---|---|
| 3,886,553 | 5/1975 | Bates | 343/112 R |
| 5,612,703 | 3/1997 | Mallincrodt . | |
| 5,661,492 | 8/1997 | Shoap et al. | 342/465 |
| 5,790,076 | 8/1998 | Sypniewski | 342/365 |

OTHER PUBLICATIONS

"Keeping Tabs On Criminals" Joseph Hoshen, AT&T Bell Laboratories, Jim Sennott, Bradley University, and Max Winkler, Colorado Department of Corrections, IEEE Spectrum, pp. 26–32, Feb., 1995.

"Reporting Error Measures in Radio Location by triangulation: A Review" David Saltz, J. Wildl. Manage. 58(1): pp. 181–184, 1994.

"Person–Locater System Based On Writstband Radio Transponders" Brent R. Blaes, Charles W. Chandler and Fredrick W. Mintz, National Aeronautics and Space Administration Contract No. NAS 7–918, Technical Support Package for Dec. 1995 NASA TECH BRIEF, vol. 19, No. 12, Item #23 from JPL New Technology Report NPO–19280.

"A Minaturized Global Tracking Device for Law Enforcement Applications" Matthew J. Schor, Eagle Eye Technologies, Inc., presented at 1995 Law Enforcement Technologies Conference in Nashua, New Hampshire, Oct., 1995 .

"RFID Tags Locate Growing Wireless Markets", Ron Schneiderman, Senior Editor/News, Microwaves & RF, Feb., 1994.

*Primary Examiner*—Mark Hellner
*Attorney, Agent, or Firm*—Kenyon & Kenyon

[57] ABSTRACT

To locate a person within a particular room inside a building or, if outside, within a small enough radius that enables a rapid identification of where that person is located, a system of sensors is strategically disposed throughout the building or area. The sensors are calibrated so that upon activation of an alarm the feedback from all of the sensors enables differentiation of the location of the alarm. To locate an object within a defined area, received values output by the sensors are compared to stored reference values received by the sensors when transmitting reference signals. A best fit of the received values against the reference values is performed to determine the location of the person. To create the stored reference values, a calibration of the sensors is performed. This includes transmitting one at a time a plurality of reference signal levels, and measuring an output of each of the sensors after each transmission. One particularly noteworthy aspect of the present invention is that the sensors are coupled to a central computer via AC power lines in the facility in which the person is to be located. In this case, the AC power lines act as the physical interconnection layer of a local area network.

33 Claims, 20 Drawing Sheets

PALS HARDWARE ARCHITECTURE

GPS-BASED PERSONNEL LOCATION DEVICE

TAGGING STYLE PERSONNEL LOCATION DEVICE

INDOOR MULTIPATH DELAY PROFILE

FIG. 6 PALS HARDWARE ARCHITECTURE

PALS SYSTEM
TYPICAL BLOCK DIAGRAM

PALS SENSOR UNIT (PSU)
BLOCK DIAGRAM

PALS WLSU
BLOCK DIAGRAM

PALS SENSOR RELAY UNIT (PSRU)
BLOCK DIAGRAM

PALS WIRELESS SENSOR RELAY UNIT (WLRU)
BLOCK DIAGRAM

MONITORING POST INTERFACE UNIT (MPIU) BLOCK DIAGRAM

TRANSMITTER TEST UNIT (TTU) BLOCK DIAGRAM

MICROPOWER ID TRANSPONDER BLOCK DIAGRAM

CW RADAR INTERROGATOR BLOCK DIAGRAM

SOLENOID STYLE GENERATOR BLOCK DIAGRAM

PIEZOELECTRIC STYLE GENERATOR BLOCK DIAGRAM

 181 ENTER SETUP MODE

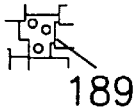 182 EXIT CURRENT SCREEN

 183 SETUP HUBS AND SENSORS

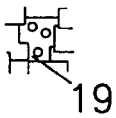 184 SETUP TTU'S, EXECUTE TTU TEST

 185 ENTER DIAGNOSTICS MODE

 186 SETUP PROTECTION ZONES

 187 CALIBRATE SYSTEM, CALIBRATE SELECTED ZONE

 ENTER PASSWORD
188

 189 MODIFY C-ZONE LIST

 190 MOVE C-ZONE TO NEW P-ZONE

 191 ACKNOWLEDGE ALARM, ACCEPT CALIBRATION DATA

 SILENCE ALARM
192

 193 ZOOM MAP

 194 SCROLL SELECTION UP

 SCROLL SELECTION DOWN
195

 196 ADD PALS ITEM

 DELETE SELECTION
197

 MOVE/POSITION ITEM
198

INDEX OF PALS APPLICATION ICONS

FIG. 18A

| Icon | Label | | Icon | Label |
|---|---|---|---|---|
| 199 | DELETE ALL SAMPLES | | 205 | EXECUTE BATTERY TEST |
| 200 | DO NOT MOVE C-ZONE | | 206 | EXECUTE COMMUNICATIONS TEST |
| 201 | VIEW ERROR LOG | | 207 | EXECUTE HIGH TRAFFIC TEST |
| 202 | ABC 123 EDIT SYSTEM PARAMETERS | | 208 | MODIFY OFF-SITE LIST, ACKNOWLEDGE OFF-SITE ALARM |
| 203 | EXECUTE MAJOR SELF TEST | | 209 | EXIT TO C:\ PROMPT (DOS) |
| 204 | EXECUTE MINOR SELF TEST | | | |

FIG. 18B

METHOD AND APPARATUS FOR TRACKING AND LOCATING PERSONNEL

RELATED APPLICATIONS

The present application claims priority to U.S. Provisional Application Ser. No. 60/038,037 filed by the same inventor on Feb. 7, 1997, and entitled "Method and Apparatus for Tracking and Locating Personnel."

BACKGROUND OF THE INVENTION

The present invention relates generally to personal security systems, and more particularly to a personal security system employing a locating and tracking device.

Security personnel often place their lives at risk merely by showing up for work. Quick response to emergency situations helps alleviate the concern that some of these personnel feel when performing their jobs. Yet, at times these individuals are unable to notify the main control center that they are in trouble or where they are when trouble arises.

College campuses and certain employers also seek to monitor security personnel within their zone of control, both for safety and managerial reasons. Some of these areas are inside buildings, while others are outside.

Many organizations would benefit from the ability to continuously locate the position of individuals as they move throughout a facility. The most likely candidates of these are corrections facilities, hospitals, and nuclear power plants and storage sites. However, university and office campuses and amusement parks also become candidates for this capability as the frequency of violent crime increases.

Early tracking and direction-finding (DF'ing) was achieved using directional antennas or pseudo-Doppler array techniques. These techniques were developed for outdoor use over relatively long ranges. The reliability and accuracy of these systems falls short of required personnel tracking needs.

The increase in violent crime and the imposition of mandatory sentencing guidelines have dramatically expanded the U.S. population behind bars. The U.S. prison population climbed to 1.4 million in 1996—a 100% increase over a seven year period. Expansion of prison capacity has failed to keep pace despite $2 billion national budgets for new prison construction. Advanced technology is needed to protect corrections staff in the current over-crowded prison settings and to extend electronic monitoring of prisoners on early release and home-arrest programs.

The plague of violent crime has extended from the country's urban centers to envelop commercial business centers, government facilities, shopping malls and university campuses. Local police are overwhelmed in their attempts to protect an increasingly mobile populace. Nationwide, 911 emergency services are unable to adequately respond to requests for aid. In Los Angeles, 13.5% of 911 callers abandon their call before operators service their request for emergency aid.

Introduction of remote emergency alarm reporting and locating technologies could relieve the burden on existing law enforcement agencies and deliver more rapid response to true emergency situations. In an agreement with the Cellular Telecommunications Industry Association, the FCC mandated a five year program requiring cellular providers to phase in technology to determine the location of cellular callers to within 125 meters. Similar personnel location services are required on a micro-cellular basis.

Direction-finding (Angle of Arrival)

The earliest position location systems were based on direction-finding (DF) antenna technology. These systems calculated the angle of arrival of incoming radio signals. If two or more receive sites were equipped with DF receivers, and the relative positions of the two receive sites was known with accuracy, the location of the transmitter could be computed by calculating the intersection of the two angles of arrival. This calculation is often referred to as "triangulation."

Modern DF systems utilize a pseudo-Doppler technique to determine the angle of arrival of an incoming radio signal. A useful way to visualize the concept is to imagine a fixed monopole antenna mounted on the circumference of a rotating disk. During some portions of its travel, the monopole will be moving towards the transmit site. During other portions, the monopole will move away from the transmit site. The received carrier frequency will exceed that of the transmitter while the monopole is approaching the transmit site due to the Doppler effect. The received carrier frequency will be less than the that of the transmitter while the monopole is moving away from the transmit site—again, due to the Doppler effect. The observed output frequency from the rotating antenna will be modulated at the rotational frequency of the monopole. If the output signal from this monopole is demodulated, the result will be an audio tone equal in frequency to the rotational rate of the monopole antenna. The relative phase of this tone, however, is determined by the angle of arrival of the transmitted carrier. By performing a phase comparison between this demodulated tone and the physical rotational frequency of the monopole, the angle of bearing will result.

Large mechanical rotating structures are undesirable from a reliability standpoint. Practical implementations replace the single rotating monopole with an array of fixed dipoles which are sampled using an electronic commutator. This multi-element antenna is called an Adcock array.

FIG. 1 presents a block diagram of an Adcock array connected to an antenna commutator, a DF receiver and bearing processor and display. The receiver is a standard FM receiver tuned to the frequency of the transmitter. It separates the recovered Doppler tone from any modulation (audio/data) applied by the transmitter. The bearing processor contains a phase comparator which operates on the antenna commutator control signal and the demodulated output of the receiver.

When this process is applied to locate tracking beacons, the transmit pulse width is very narrow (50–250 ms) with a maximum duty cycle of 10%. Pulsed operation maximizes tracking beacon battery life. The challenge for DF receivers is to capture sufficient pseudo-Doppler information and perform the bearing calculation within the pulse width of the transmitter. Pseudo-Doppler principles apply at any frequency of operation. However, practical limitations on antenna construction and RF propagation confine commercial DF systems to the HF through UHF bands.

The principal limitation of pseudo-Doppler systems is susceptibility to multipath (RF carrier reflections from adjacent objects). The DF receiver will determine the angle of arrival of the largest amplitude signal reaching the antenna array. Due to multipath, the angle of arrival of the largest signal often deviates from the actual bearing of the transmitter. In high multipath environments, such as dense urban areas, DF receivers often produce erroneous results. Indoors, where direct line-of-sight paths seldom exist, pseudo-Doppler DF receivers and triangulation are useless. In addition, the Adcock arrays are physically large and should be mounted on masts for maximum performance. Such installations are generally unwelcome inside buildings.

The bearing accuracy of commercial DF systems is typically 3° RMS under ideal, line-of-sight conditions. At a range of one mile, this bearing accuracy corresponds to a location uncertainty of 276 feet. This accuracy degrades dramatically under multipath conditions. To achieve a higher degree of accuracy, the DF receivers need to be spaced more closely. For twenty foot accuracy, the maximum distance between the DF receiver and the transmitter is 380 feet.

DF systems can locate individuals moving through large, open compounds if their movements are confined outdoors. Used in conjunction with an indoor location capability, DF systems can extend coverage into distant, outdoor regions of a large facility. By themselves, DF systems can not provide a single solution to personnel location in facilities having indoor areas.

Satellite-based Radiolocation

Satellite-based location systems utilize an array of communication satellites to locate earth-bound personnel location devices PLD's. Location and velocity data are computed by calculating the relative range between the individual satellites and the PLD and the Doppler shift of the received carriers. The most mature of these system, Global Positioning System (GPS), delivers accurate time, location, and velocity data to receive-only hand-held units allowing simultaneous access by an unlimited number of earth-bound units. Other systems have been recently deployed which utilize an array of low earth orbit (LEO) satellites to provide bidirectional data communications and positioning information to commercial users.

Global Positioning System

GPS was developed to deliver accurate position, velocity and clock data using a standard positioning reference to an unlimited number of simultaneous users distributed throughout the globe. In 1990, there were only thirteen orbiting GPS satellites in service limiting the system's availability to eighteen hours per day. Full service will be provided by twenty-one satellites providing twenty-four hour, three dimensional positioning around the globe. Basic accuracy is ten meters for the military service and twenty-five meters for commercial GPS receivers. Differential GPS service can improve the accuracy dramatically but differential GPS service requires communication with a second fixed terrestrial GPS station.

GPS satellites transmit signals on two L-Band frequencies (approximately 1.5 GHZ) enabling the system to adjust for variations in ionospheric propagation time delays. Users obtain three-dimensional co-ordinates based on ranging measurements from at least four GPS satellites. Velocity information is extracted from the Doppler shift of the received GPS carriers. GPS utilizes a spread spectrum coding format allowing the satellite transmissions to occupy the same spectrum while enabling the earth-bound GPS receivers to independently track the carrier phase and code.

FIG. 2 presents a block diagram of a GPS-based personnel location device. The PLD obtains its location from the GPS receiver. Upon activation, the PLD transmits this location, along with an ID code to the central monitor site.

Due to the requirement for the GPS receiver to acquire, decode, and process four independent satellite signals, GPS receivers require over one minute to determine position after power up. After acquiring this first bearing, position updates occur much more rapidly. A one minute delay is not compatible with personnel location applications where emergency response is required. Typical response times for emergency location systems are three seconds maximum. A potential solution would be to operate the GPS receiver continuously to maintain position information current. However, the power consumption (900 mW) of existing OEM GPS receiver boards is too high for continuous operation from body-worn communications battery packs.

GPS service is effectively confined to outdoor location. The link margins are so small that the RF carrier penetration loss into most building materials reduces the GPS signal level below the receiver detection threshold. For example the penetration loss produced by standard cinder block is 21 dB at 1.5 GHZ. Recall that accurate location requires four satellite signals to reach the GPS receiver simultaneously. Even if the receiver is operated outdoors, care must be taken to direct the receive antenna upward—this restriction is not practical for most body-worn PLD applications.

GPS accuracy can be seriously degraded by carrier reflections off the ground and nearby objects. The reflected signals combine with the direct path signals to create a propagation phenomenon known as "multipath." The multipath effect causes a slow fading (0.1 Hz variation in received signal amplitude envelope) and, in spread spectrum systems, corrupts the code and carrier synchronization. The following results were obtained by Van Nee:

| Receiver Environment | SNR | $B_f$ | Mean Error |
| --- | --- | --- | --- |
| Rural, Suburban, Fixed | 5 dB | 0.1 Hz | 33 meters |

In other words, in rural and suburban settings using a motionless GPS receiver, the amplitude of the direct path signal exceeds the multipath signal by 5 dB, and a ±33 meter error occurs at a 0.1 Hz rate (once every 10 seconds). In urban settings, where the streets are lined with tall buildings, the multipath delay spreads are shorter and the mean error due to multipath will be even larger.

An error of this magnitude, ±33 meters, exceeds the maximum tolerable location error for most personnel location applications. As stated, if differential GPS service is available, the accuracy can be improved significantly. However, combining the limited location accuracy with the restrictions of outdoor-only service and one minute location-determination delays, it becomes apparent that GPS is not a complete solution to current personnel location applications. GPS can be a valuable outdoor complement to other indoor location capabilities such as the tagging or distributed sensor approaches, which are discussed later herein.

Signpost Location Systems

If the facility to be monitored has well defined patterns of movement and many bottleneck areas which personnel must traverse during their movements, then that facility is a candidate for a signpost location system. At each of these bottlenecks, a "signpost" is installed which logs the passing of individual body-worn Personnel Location Devices (PLD's). The system's location accuracy is dictated by the number of installed signposts and by the precision with which a given signpost predicts an individual's location. For example, a signpost installed at an entry point to a small office would yield a more accurate location than a signpost installed at an entry point to a large auditorium.

One feature of all signpost systems is that they can only provide updated position information when PLD's pass by the electronic signposts. Interrogating the signposts will yield updated information only if a PLD has traversed a signpost since the last report. Signposts have unique advantages and disadvantages with regards to reliability. If one signpost fails, the location capability is terminated in that area—there is no systematic redundancy. However, the degraded location capability is confined to one zone and the accuracy of the remainder of the system is unaffected. One unattractive feature of signpost systems is their lack of an effective self-test mechanism. The only way to confirm operation is to physically walk through the facility and test location accuracy.

There are two variations on the signpost architecture shown in FIGS. 3 and 4, which are typical of all location systems. FIG. 3 presents a tagging style system, in which the PLD acts as a transmitter, which announces to the system its location. FIG. 4 presents a self-locating system in which the PLD acts as a receiver and determines its location from the signpost. The PLD then transmits this location information to the central monitor site upon alarm activation. These two approaches will be discussed in detail in the following sections.

Tagging PLD's

FIG. 3 presents a tagging system where the PLD acts as a transmitter which announces to the system its location. For reliable operation, the required PLD transmit duty cycle would be so high that battery life of a PLD using an active transmitter would be compromised. Therefore, a transponder-based PLD is utilized. Many commercially available systems based on RFID technology can be applied to the signpost location problem. For example, the Texas Instruments Registration and Identification System (TIRIS) supplies tags in a variety of form factors. One large-volume application of the TIRIS technology is automobile security. Commercial tags operate in the 150–400 KHz bands and the FCC ISM bands.

The PLD shown in FIG. 3 contains a passive transponder, which reflects a portion of the incident RF interrogating signal. The reflected signal is modulated by a serial data sequence identifying the PLD. The only power required by the PLD is that consumed by the ID code generator and a bias current for the transponder subcarrier oscillator. No RF carrier is actually generated by the transponder itself in an attempt to minimize PLD current drain. The signpost in this case is actually a CW radar. The radar consists of an interrogator, which generates the transmitted RF signal and receives the reflected carrier. The radar then subtracts a sample of the transmitted carrier to yield the ID code of the PLD passing within the radar's illumination zone. An ID decoder then formats the ID for retransmission. A communications interface encodes the signal for modulation and transmission over a wired or wireless network to the central monitor site. The range system was limited to about 15 feet.

Self-locating PLD

FIG. 4 presents a self-locating system, in which the PLD acts as a receiver and determines its location from the signpost. In this case, the signpost continuously transmits a location code that the central monitor site will interpret correctly as a particular entry way or room number. Although this location code could be transmitted on an RF carrier, current commercial implementations utilize IR and ultrasonic carriers in an attempt to confine the propagation of the location signal. These carriers however can easily be blocked by clothing. The wearer of the PLD must be careful to avoid obstructing the path between the PLD and the signpost by garments—a limitation found unacceptable to some users. Further, IR receivers are susceptible to saturation by direct or reflected sunlight so operation is typically confined to indoor areas.

The PLD in this configuration contains a receiver/decoder, which collects the location signal and, in effect, tells the PLD where it is currently located. The PLD then formats the location code packet with a PLD identifier code packet and transmits the information over a wired or wireless network to the central monitor site. This transmitted data packet informs the central monitor site of the current location the PLD.

Time of Arrival Location Systems

Tracking systems under development utilize distributed receivers, which measure the time of arrival of personal alarm transmissions. The systems addressed here are terrestrial location receivers, which can be installed throughout urban areas or building complexes. The speed of travel of radio signals in free space is known—signals require one nanosecond (ns, one billionth of a second) to travel one foot. Knowing this delay, and knowing the exact positions of an array of time-of-arrival (TOA) receivers, one can compute the location of an RF transmission based on the relative times-of-arrival of the signal reaching each receiver. The term "relative" must be emphasized because the actual time of the RF transmission is unknown—only the time at which the wavefront reached each receiver is known. Therefore, the calculation is not as simple as finding the intersection of multiple circles. A minimum of three receivers must receive the RF transmission to obtain a single location solution.

TOA receiver arrays must be synchronized to perform relative time-of-arrival measurements. For indoor or urban receivers, this requires a hardwired connection between the receiver modules to synchronize the time stamp clocks. For example, given the propagation speed of RF signals (1 ns/foot), the clocks of every TOA receiver must be synchronized to within 20 ns to achieve a location accuracy of 20 feet. Further, the receivers signal strength indicator must be sampled at an even higher rate (less than 5 ns) to prevent sampling error from contributing further to the location inaccuracy. Installation of this synchronization backbone can be extremely expensive—particularly in existing corrections facilities in which cabling must be installed in conduit and security procedures hamper access. In addition, cutting this backbone can potentially disable the complete system.

TOA location systems are particularly vulnerable to multipath. When a single direct and multiple reflected signals reach the TOA receiver, the solution is simple—the direct signal will always travel over the shortest path and will provide the best estimate of relative transmitter distance. The TOA processor must always choose the relative time-of-arrival of the first signal to reach it. However, in most urban and indoor settings, there is no direct path. Because of the complex signal propagation paths, the first signal to arrive does not necessarily represent the Euclidean distance to the transmitter.

A further difficulty arises in TOA systems when attempting to process multiple alarms over a short period. The problem becomes apparent when examining the typical delay spread of an RF signal in an indoor setting. Delay spread is the range of RF carrier propagation delays between two physical points in space caused by the many propagation paths that exist between two points. FIG. 5 presents the results of a propagation delay profile over an indoor obstructed path (no line of sight exists).

The indoor delay profile demonstrates that, although the first time-of-arrival occurs at 50 ns, multipath causes delayed replicas of the direct signal to be received for the next 200 ns. These delayed signals are still within 20 dB of the direct signal. If a distant alarm transmission were to take place within this 200 ns window, its measured time-of-arrival would be corrupted. The alarm transmitters would need to operate using a carrier sense-multiple access (CSMA) protocol to eliminate this problem. CSMA requires the personal location device (PLD) to monitor the channel for activity before transmitting. Although feasible, it now requires the PLD to include a receiver which is constantly powered, which limits battery life and increases package size.

The TOA approach imposes another limitation for personnel tracking applications. Flexible location systems are designed to locate existing personal communications devices (cell phones, walkie talkies) to minimize system cost. These communications devices are characterized by long periods of continuous transmission. During continuous transmission periods, the TOA system is unable to measure a relative difference in carrier arrival times and the transmitter's position cannot be updated.

The present invention is therefore directed to the problem of developing a method and apparatus for locating a person within a particular room inside a building or, if outside, within a small enough radius that enables a rapid identification of where that person is located.

SUMMARY OF THE INVENTION

The present invention solves this problem by providing a system of sensors for locating within a facility, which sensors are calibrated so that upon activation of an alarm the feedback from all of the sensors enables differentiation of the location of the alarm.

According to the present invention, a method for locating an object within a defined area includes the steps of: a) sensing a signal output by the object using several sensors disposed within the defined area; b) forwarding several received signal levels from the sensors to a central processor; and c) comparing the received signal levels with reference values to determine a location of the alarm signal. In this case, the step of comparing can consist of performing a best fit of the received values against the reference values.

According to the present invention, additional advantageous steps include transmitting one at a time several reference transmissions, and measuring an output of each of the sensors after each transmission, thereby forming the reference values.

It is particularly advantageous of the plurality of sensors are coupled to a central computer via existing wiring, such as AC power lines, in the defined area, especially if the existing wiring is used as the physical layer of a local area network.

According to the present invention, a method for locating an object within a predetermined area includes the steps of: a) sensing an alarm signal output by the object using sensors disposed within the predetermined area; b) creating a propagation model of the predetermined area, which can determine a signal level of an imaginary signal received at each of the plurality of sensors if a reference signal was transmitted at a reference location; and c) comparing signal levels sensed by the sensors with reference values predicted by the propagation model to determine a location of the alarm signal.

According to the present invention, an apparatus for locating a person within a facility includes a personal alarm transmitter, a central monitoring system, and an array of sensors. The central monitoring system locates a person carrying the personal alarm transmitter. The sensors in the array are disposed in overlapping zones within the predetermined area. The array of sensors is coupled to the central monitoring system. If the personal alarm transmitter outputs an alarm signal, each sensor within a zone in which the personal alarm transmitter is disposed reports back to the central monitoring system. In this case, the sensors can be coupled to the central monitoring system using either existing wiring or RF links.

According to the present invention, a system for locating a person within a facility includes a portable alarm transmitting means, a sensing means, and a processing means. The portable alarm transmitting means transmits a user activatable alarm signal. The sensing means senses an alarm signal transmission and outputs a matrix of received signal levels. The processing means is coupled to the sensing means and determines a location of the alarm signal transmission by comparing the matrix of received signal levels output by the sensing means to a stored matrix of values, and selects a location associated with one set of values in the stored matrix of values that best matches the matrix of received signal levels output by the sensing means. In this case, the sensing means can be coupled to the processing means using existing wiring, such as AC power lines, coaxial cable, twisted pair, previously installed alarm wiring, telephone wiring, cable television wiring, as well as RF links.

BRIEF DESCRIPTION OF THE DRAWINGS

FIGS. 18A and 18B depict the icons used in the graphical user interface of the present invention.

DETAILED DESCRIPTION

Figure 1:
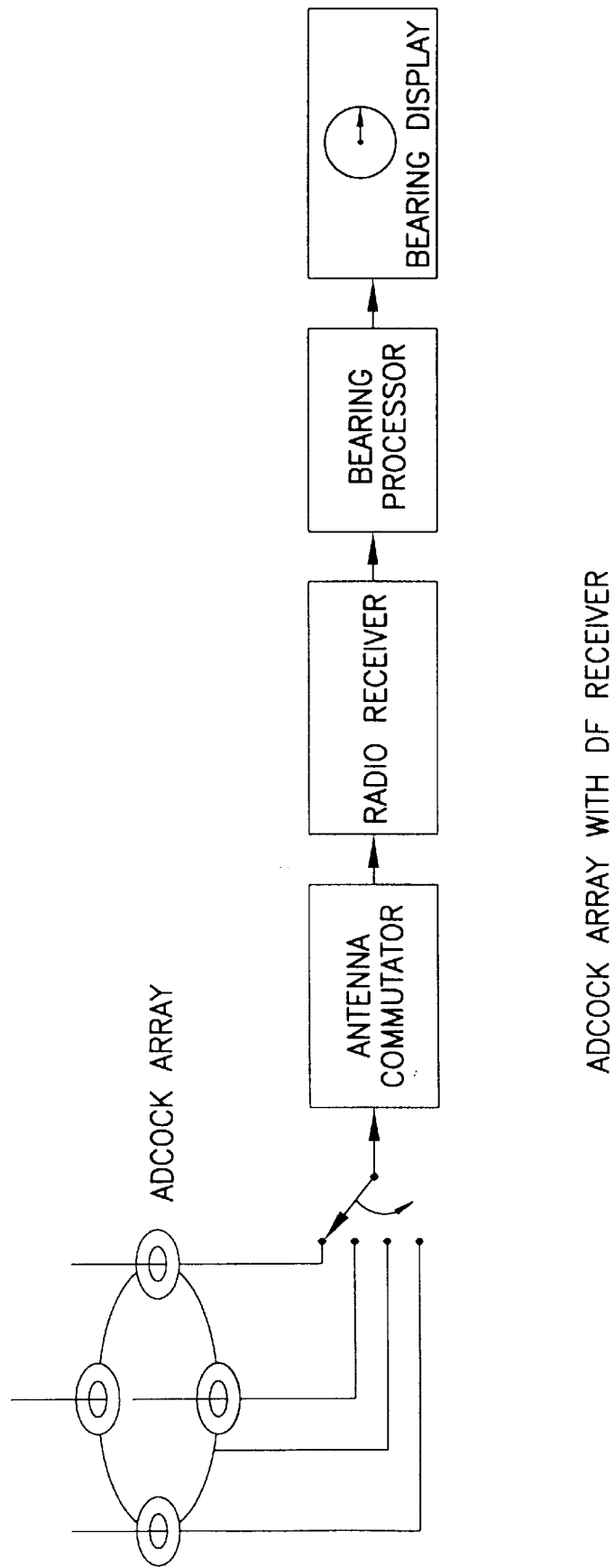
FIG. 1 depicts a block diagram of an Adcock array connected to a Direction Finding (DF) receiver and processor.
Figure 2:
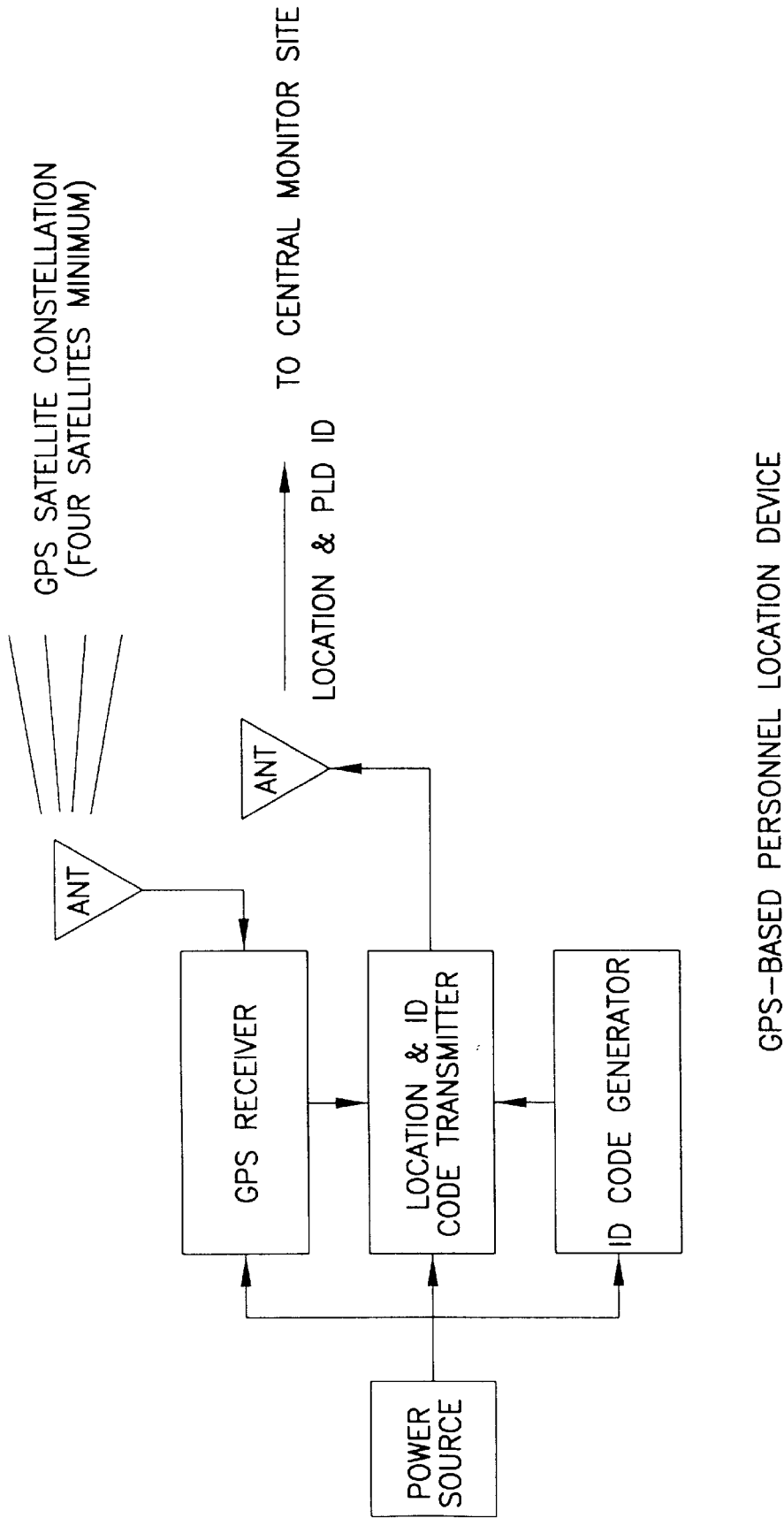
FIG. 2 depicts a block diagram of a Global Positioning System (GPS) based Personnel Location Device (PLD).
Figure 3:
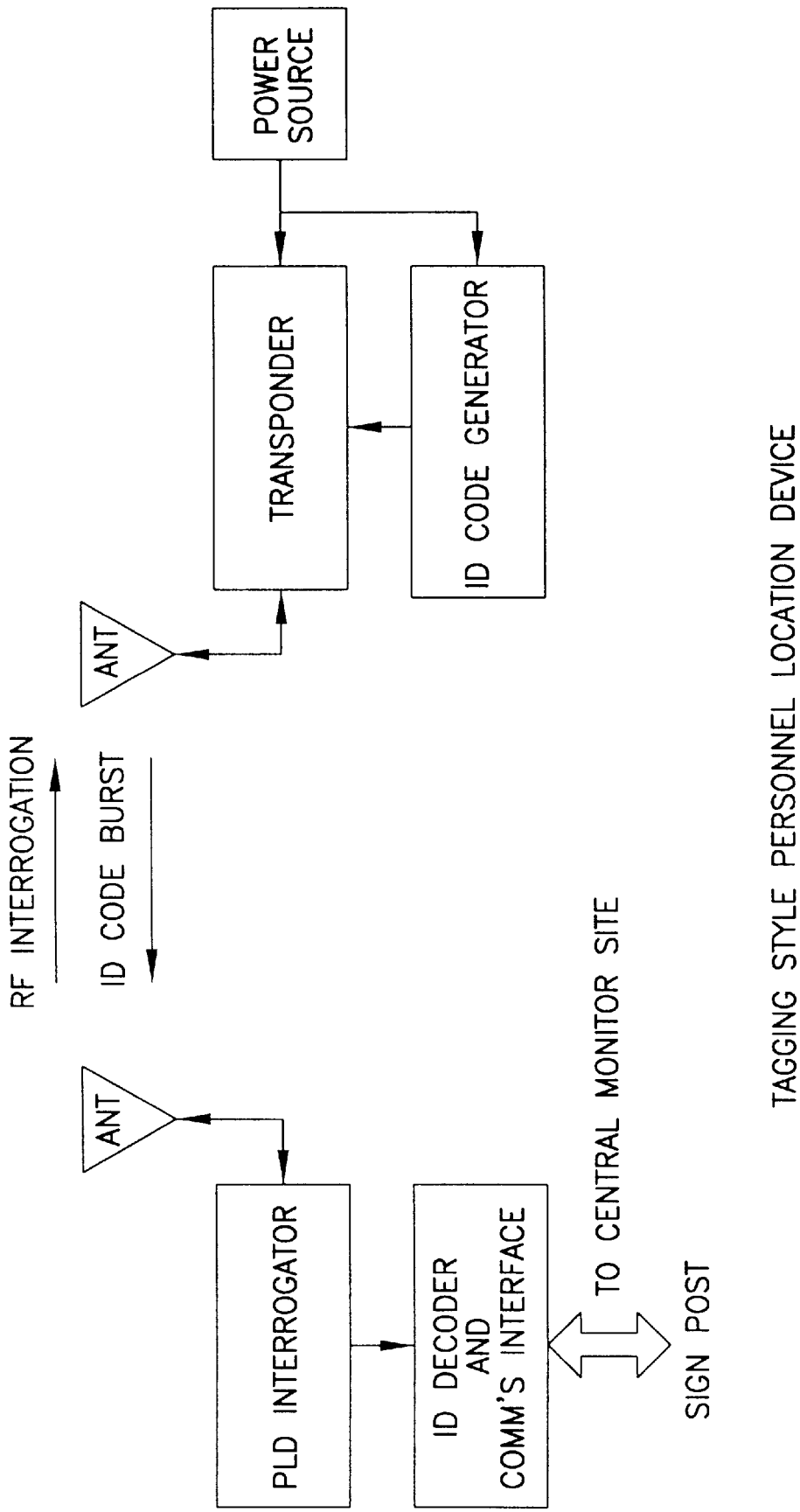
FIG. 3 depicts a tagging style PLD, in which the PLD acts as a transmitter, which announces to the system its location.
Figure 4:
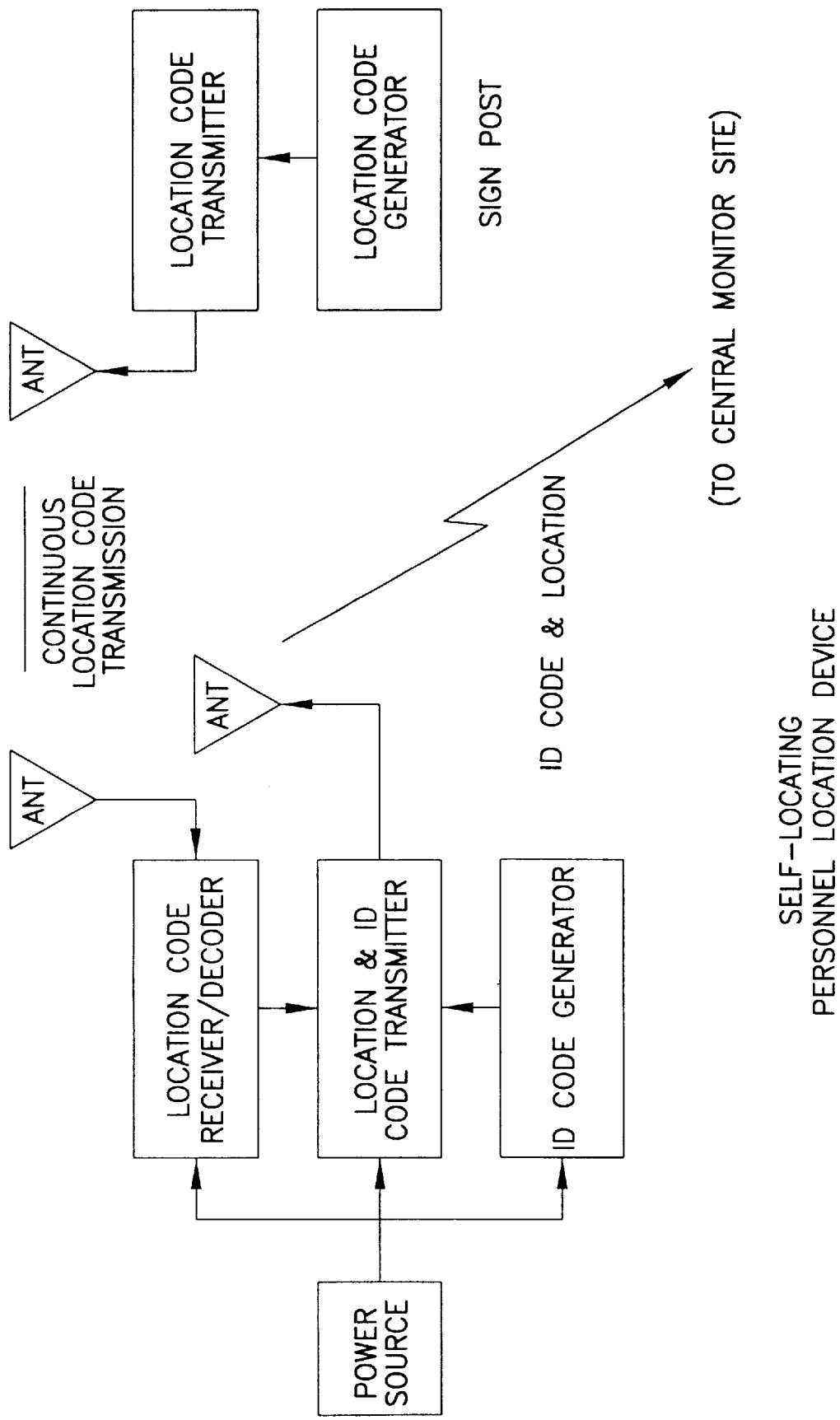
FIG. 4 depicts a self-locating PLD, in which the PLD acts as a receiver and determines its location from the signpost.
Figure 5:
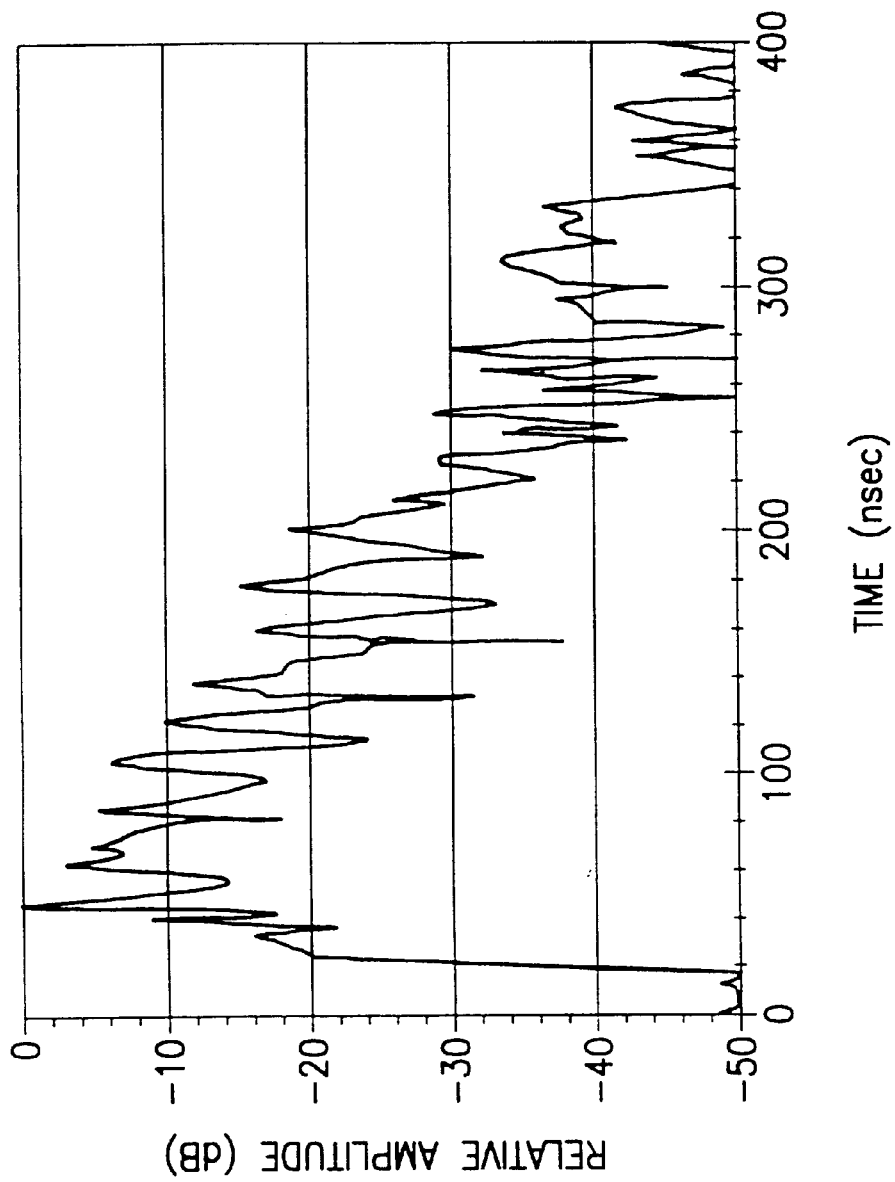
FIG. 5 depicts the results of a multipath propagation delay profile over an indoor obstructed path, in which no line of sight exists.

The present invention solves this problem by providing a system of sensors for locating within a facility, which sensors are calibrated so that upon activation of an alarm the feedback from all of the sensors enables differentiation of the location of the alarm.

System Overview

The apparatus of the present invention includes a Personal Alarm Location System—PALS, one application for which is a turnkey security solution for corrections facilities. Developed to meet standards written by actual corrections professionals, the apparatus of the present invention has the ability to locate corrections staff carrying personal alarm transmitters (PATs) as they freely move throughout penitentiaries.

Unlike infrared (IR) locating systems, the present invention does not fail when loose clothing covers the body-worn transmitter. What's more, direct sunlight will not jam the sensors used in the present invention (like it can when IR sensors are employed). Consequently, the apparatus of the present invention provides ultra-reliable personal security both indoors and outdoors.

Due to the unique design of the system of the present invention, it installs quickly and inexpensively. Unlike time-of-arrival locating systems, the present invention does not require costly installation of a cabled communication network. All communications take place over the facility's (e.g., a penitentiary's) existing wiring, such as AC power lines, coaxial cable, twisted pair, previously installed alarm wiring, telephone wiring, cable television wiring, as well as RF links using wireless modems. This is possible because the sensors and relays used in the present invention communicate with spread spectrum modems that can communicate successfully over a wide variety of media and noise sources.

In addition, the present invention locates existing transmitters or walkie-talkies. Consequently, there is no need to purchase new radio hardware, retrain staff, or abandon established depot repair procedures. This capability prevents waste by not requiring a new investment in radios, or a trashing of existing radios.

At the core of present invention is simplicity. To equip a facility with the present invention, an array of RF sensors (radio receivers) is installed throughout the facility to be monitored, such as a penitentiary. Multiple sensors monitor each zone of the prison, providing an overlapping blanket of security. If an alarm transmission occurs, each sensor reports back to a central monitor computer over the facility's AC power lines using state-of-the-art spread spectrum modems. The present invention actually uses the facility's AC power lines like a local area network—so installation cost and time are drastically reduced.

At the heart of present invention is a central mapping computer, which displays the location and identification (ID) of each active personal alarm. The computer continuously checks the operational status of all sensors and immediately reports any failures to the system administrator. The present invention includes a graphical user interface, so all operations are performed easily with a point and click of a mouse.

System Benefits

The present invention provides the following benefits.

Locates radio transmitters instantly

Proven accuracy to within 20 feet

Locates transmitters indoors and outdoors

Remains unaffected by clothing or building materials

Installs without dedicated cabling

Locates existing radio transmitters

Reduces escorting and manual tracking

Inexpensive, easy-to-install and use

Automated self-testing and diagnostics

Proven effective in correctional facilities

In a nut shell, the present invention begins by creating a calibration table of the system. A new entry (an array) exists in the calibration table for each location in the facility to characterize. One characterizes that location by keying an RF transmitter, and recording the signal strength reading received at the various sensors spread throughout the facility. The arrays in the table look as follows:

Location 102, Cell Block D:

| Sensor 12 | Sensor 13 | Sensor 14 | Sensor 15 | Sensor 16 |
|---|---|---|---|---|
| 50 | 60 | 220 | 70 | 21 |

Location 103, Cell Block E:

| Sensor 12 | Sensor 13 | Sensor 14 | Sensor 15 | Sensor 16 |
|---|---|---|---|---|
| 20 | 180 | 100 | 40 | 00 |

These two arrays represent only two calibration points. A typical facility may have over 650, depending upon the size.

The calibration data can be interpreted as follows. When a transmission occurred at Location 102, ( a particular spot in the facility) sensor 12 received a signal level of 50 dB, sensor 13 received a signal level of 60 dB, sensor 14 received a signal level of 200 dB, sensor 15 received a signal level of 70 dB and sensor 16 received a signal level of 21 dB. The signal level recorded actually represents the average of ten measurements taken over a small area. As you can see, location 102 must be closer to sensor 14 than to the other sensors (it received the largest signal reading).

After the system is calibrated, this calibration table is stored in the personal computer. Actual alarms transmissions will produce the same type of response—an array will contain large readings at the nearby sensor locations and small readings at the distant sensor locations. The location of these real alarms is determined by finding the best fit between the real alarms signal level array and the stored calibration arrays (i.e., minimizing the sum of the absolute value of the differences between actual sensor readings and stored readings).

The sensor hardware and PC and sensor software allows the sensors to be reprogrammable by sending commands from the PC over the AC power lines. In this manner, the system is truly adaptable and able to locate any transmitter. The sensor operating frequency can be reset and the type of modulation and coding that the sensor will respond to can be varied. In other words, if the system operator wants to start tracking cellular telephones in the building as opposed to personal alarm transmitters, a command to do so could be sent from the central computer.

This feature allows the signal strength receivers to decode the ID of different transmissions—adding a higher degree of distributed processing. Combining this feature with the ability to reprogram the type of signal that it can demodulate and decode is critical to allow the system to locate various types of transmitters.

The present invention includes the capability for linking propagation modeling programs to the software application in order to eliminate the requirement to manually calibrate a facility.

A known propagation prediction program can calculate the signal loss between any two points in a building. One such program has been written by Virginia Tech, and is known as SMT PLUS. The input data for this program is the CAD floor plan of the building. Other organizations (private companies and universities) have also developed similar programs. The software of the present invention can be linked to these models to allow these software programs to generate the calibration table automatically, without requiring the manual calibration. The net result is an intelligent system which "figures out" for itself how the sensors should respond from any given point in the facility. This feature is critical in a campus setting where calibrating all the possible outdoor locations would be impractical. With the existing system, one would have to key up the transmitter every 50 feet outdoors to calibrate the system—this would be prohibitively expensive. Furthermore, designing the minimum number of sensors is made possible without performing costly site surveys.

The present invention has applications to prisons, college campuses, hospitals and other facilities where security is an issue.

The location accuracy of the system is typically within twenty feet. The present invention can support Duress Alarm Transmitters, such as Digilarm, Teleprotect, and other pulsed RF transmitters in the VHF/UHF band. The system operates in the VHF and UHF frequency band. The system of the present invention supports the Senstar Facility Alarm Annunciation System (FAAS) alarm consoles. In addition to the Senstar system, the present invention may be used with other alarm consoles, or alarm systems.

The radio sensors & hubs receiver Dynamic Range is 80 dB. The Multipath Rejection uses the Polarization Diversity, Indoor Propagation Model Algorithm. The Sensor Interconnection Options include both AC Power Line and Wireless options. The AC Power Line operates using a Spread Spectrum CE Bus, FCC Part 15. The wireless option uses a 900 MHZ Spread Spectrum, FCC Part 15. The sensor also can use dedicated wiring consisting of twisted pair, or coaxial cable RS-422.

The system typically uses a sensor spacing of approximately one per 3000 Square Feet.

The monitor computer requires at least a personal computer with the equivalent of a 486DX2, 33 MHZ, 2 MB RAM with an MS DOS Operating system, 2 MB of Hard Drive Space, a 3.5" Floppy Drive, Modem and Mouse.

The system displays a facility map with a flashing alarm zone using a serial data interface to the FAAS Alarm Console. The Facility Map Format is a bitmap of 1280×640 pixels, 4 bit color.

1.0 Introduction

The present invention detects and locates the activation of small, portable radio frequency transmitters carried by personnel. To minimize cabling requirements the system uses power lines for communications where possible. The system generates location information in near real-time and can process transmissions in rapid succession.

The present invention identifies the location of portable transmitters to within one of a number of predefined protection zones into which the facility has been partitioned. The system utilizes sensor units strategically positioned within the facility to measure the signal strengths of transmissions. These measurements are correlated with empirical data collected during a system calibration process. The transmission is announced to have originated from within the zone whose set of calibration values most closely match those of the transmission. A map of the facility is presented with the location of the alarm transmission highlighted.

2.0 Theory of Operations

Figure 7:
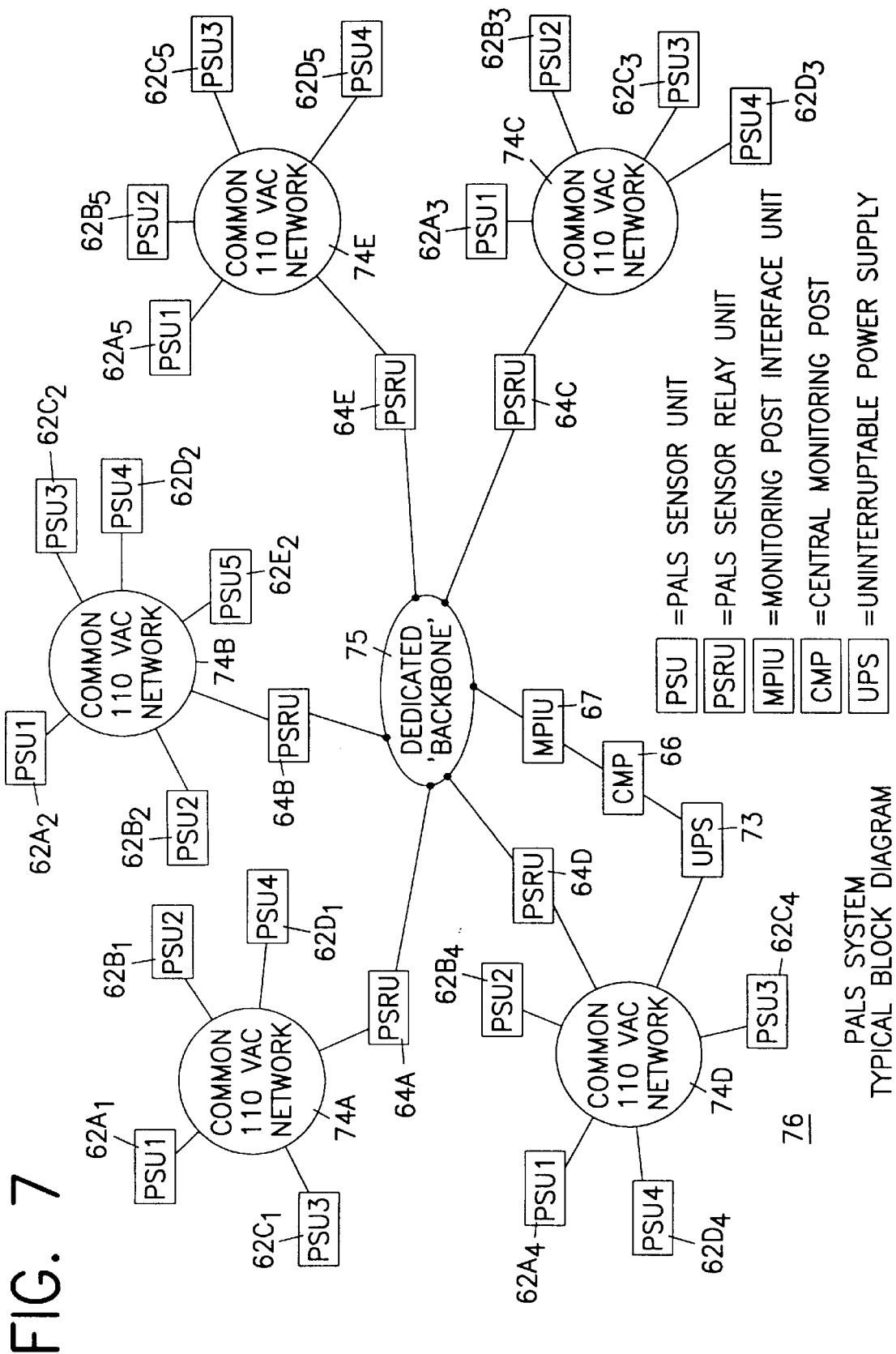
FIG. 7 depicts a block diagram of an embodiment of the PALS according to the present invention.

The present invention can be used in conjunction with a digiLARM Personal Portable Alarm (PPA) system. The PPA system uses pocket transmitters that are carried by correctional service personnel and a base station receiver that identifies the activated transmitter. The present invention enhances and expands the utility of the PPA system by adding location information to the identification information provided by the PPA system. The present invention receives an alarm signal at its multiple sensors, measures the signal strength at each sensor, and from these measurements, determines the location of the alarm. The information from both systems is displayed on the central computer graphics display (and, if the facility is so equipped, on the FAAS monitor 79 (FIG. 7).

Figure 6:
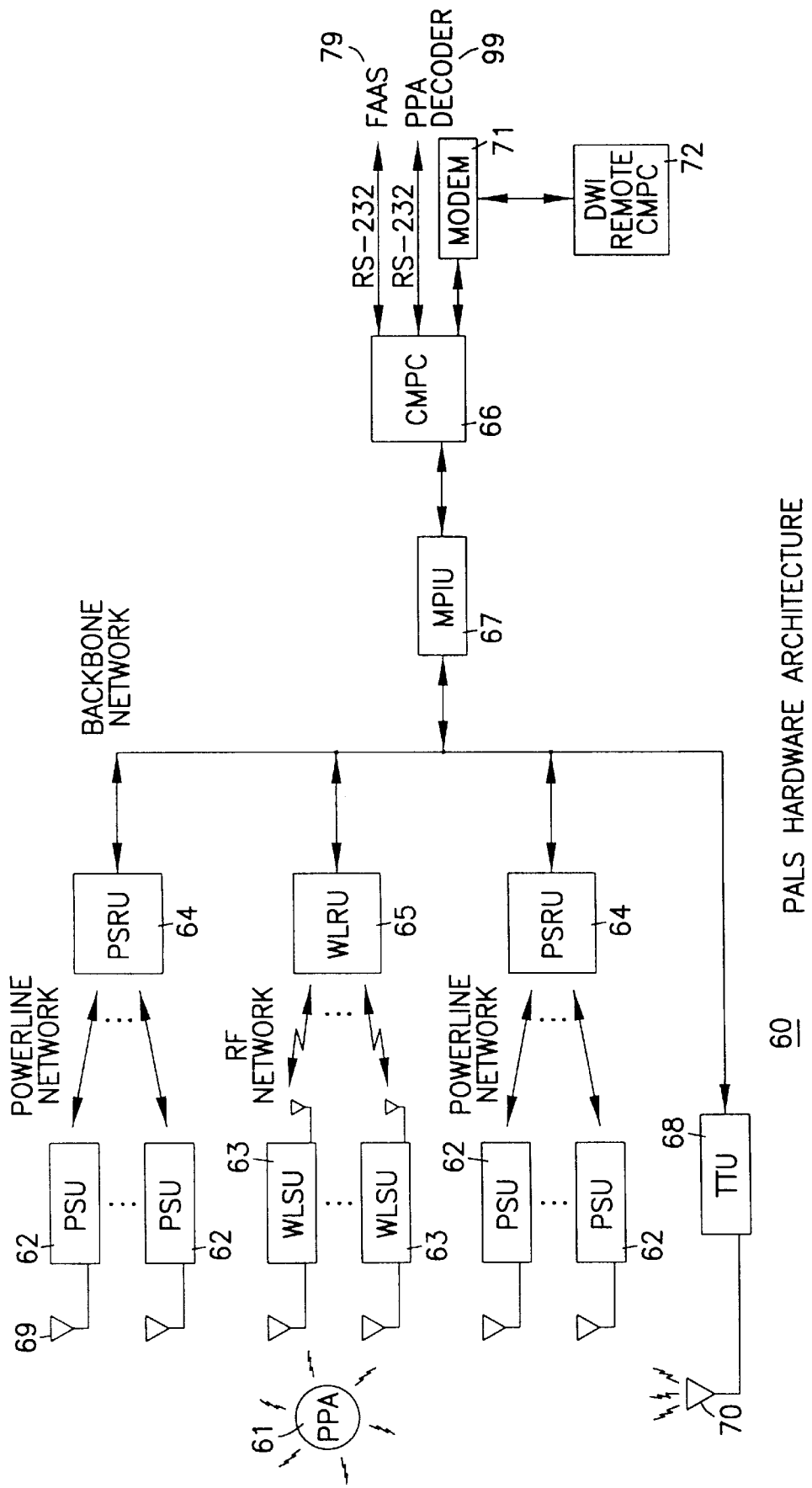
FIG. 6 depicts one embodiment of the Personal Alarm Location System (PALS) architecture of the present invention.

FIG. 6 shows one embodiment of the present invention (the Personal Alarm Location System—PALS). Shown in FIG. 6, a PPA transmits an alarm at an RF frequency, which is received by antennae 69 of multiple sensors, which are depicted in FIG. 6 as either powerline sensors 62, or RF sensors 63. The powerline sensors are coupled to a relay 64 via AC powerlines, whereas the RF sensors are coupled to a relay 65 via RF links. The relays 64, 65 transmit the alarms to an interface unit 67, which forwards them to a central computer 66. The computer is coupled to the FAAS 79, to which it reports the status of the alarms, and to a PPA decoder 99, which decodes the particular alarm transmitter. In addition, a modem 71 is used to enable remote access to the central computer 66 from a remote computer 72.

The present invention has five types of components: Sensors (PSU 62, WLSU 63), intelligent Sensor Relay Units (PSRU 64, WLRU 65), the Central Monitoring Post Computer 66 (CMPC), the interface between the Sensor Relay Units 64, 65 and the Central Monitoring Post Computer (MPIU 67), and Test Transmitter Unit (TTU) 68. The components are interconnected using EIA-standard CEBus technology. CEBus is a local area networking standard that uses the existing electrical power lines or RF transmissions as the physical interconnection layer. The Sensors 62, 63 detect alarm transmissions, report alarm events, measure signal strengths, and report the readings. They communicate with the Sensor Relay Units 64, 65 using either spread-spectrum signals conducted over power lines or wireless spread-spectrum RF transmissions.

The present invention has two types of sensors 62, 63 and, correspondingly, two types of intelligent Sensor Relay Units 64, 65 with which the two types of sensors communicate. The individual components and their abbreviations are listed below.

| | |
|---|---|
| PSU | Powerline Sensor Unit 62 |
| WLSU | Wireless Sensor Unit 63 |
| PSRU | Powerline Sensor Relay Unit 64 |
| WLRU | Wireless Sensor Relay Unit 65 |
| CMPC | Central Monitoring Post Computer 66 |

-continued

| TTU | Test Transmitter Unit 68 |
| MPIU | Monitoring Post Interface Unit 67 |

In addition, the PALS Control Processor (PCP 85, 95, 105, and 115) (FIGS. 8, 9, 10, and 11) is a common microprocessor control board, which is a key element in the design of all of the units (80, 90, 100, and 110). The design is based on the Motorola MC68HC811E2 microprocessor, however, it could employ any equivalent processor. The PCPs 85, 95, 105, 115 in all components of the present invention use firmware, which can operate in four modes. The PCP can function as a sensor controller 85, as the sensor side 95 of a Sensor Relay Unit (in which case it is known as a Hub PCP 95), as the CMPC side 105 of a Sensor Relay Unit (in which case it is known as a Relay PCP 105), or as a TTU controller 115. Each PCP 85, 95, 105, 115 has a CEBus ID number selector (e.g., a 7 position DIP switch), a CEBus Interface port, a serial port, a general purpose input/output port, and a mode selection input.

PSUs 62 interface with PSRUs 64 over the power lines, and WLSUs 63 interface with WLRUs 65 using RF transmissions. PSRUs 64 handle groups of PSUs 62 that are on the same power circuit (see FIG. 7, element 74a, for example), and WLRUs 65 handle groups of WLSUs 63 that operate at the same radio frequency. The PSRUs 64 and WLRUs 65 act as relays between Sensors 62, 63 and the CMPC 66 for addressed packets on the CEBus network. In addition, as part of alarm processing, each PSRU 64 and WLRU 65 polls its Sensors 62, 63, respectively, to collect signal strength measurements and sends the readings as a single large packet to the CMPC 66.

The need for WLSUs 64 and WLRUs 65 stems from the requirement to provide protection coverage to areas within the facility that are both physically and electrically remote. The transformer servicing these areas may be located remotely within the areas. Using PSUs 62 and PSRUs 63 would require very costly trenching and burying operations to install the required cables from the remote areas to the centrally located CMPC 66.

The PSRUs 64 and WLRUs 65 are interconnected over a coaxial cable or twisted pair backbone network 75 (FIG. 7) to the Monitoring Post Interface Unit 67 (MPIU). The MPIU 67, acting as a network bridge, interconnects the backbone networks (elements 74a–f, FIG. 7) to the Central Monitoring Post Computer (CMPC) 66. The MPIU 67 is an ISA compatible personal computer (PC) interface card and is physically inserted into a slot of the CMPC 66.

One embodiment of the CMPC 66 is an 80486-based IBM compatible PC. It presents a map of the facility upon which alarm locations are superimposed and from which an acoustic alarm emits under alarm/system warning conditions. The CMPC 66 also provides a user interface to the present invention, allowing a trained operator to configure the system, calibrate the system, set or modify various system parameters, and conduct various system diagnostic tests. The CMPC 66 can be configured to output alarm location messages to the FAAS 79 over a separate RS-232C channel, for example.

The present invention periodically conducts minor and major self-tests, both automatically and at the command of a CMPC operator. The major self-test is an end-to-end test of the entire system. During a major self-test, a Test Transmitter Unit 68 (TTU) is activated for a short period of time to verify that all components are functioning properly. Battery back-up functionality is also checked. Abnormal results are displayed as warning messages on the CMPC or are reported to the FAAS 79. They also affect system operation by changing assumptions about which components are functioning properly. Alarms during self-tests will cause the self-test to be aborted.

The minor self-test checks to make sure that the system hardware and software is functioning correctly. The CMPC 66 requests that each component in the system report its own self-test status, which reports the results of memory checks, and tests battery back-up functionality. Any reported failures will cause warning messages to be displayed on the CMPC 66 or to be reported to the FAAS 79. They also affect system operation by changing assumptions about which components are functioning properly. Minor self-tests will take less than two seconds to execute. Any alarms during a minor self-test will cause the self-test to be aborted.

The present invention operates unattended during normal operations. An operator is required for conducting maintenance and diagnostic procedures. The present invention operates for at least one hour without external power. Each of the Sensor and Relay Units are equipped with battery back-up power. The CMPC 66 is powered from the facility's Uninterruptable Power Supply (UPS) 73 (FIG. 7). TTUs 68 are not required to operate during power outages, hence they can be connected to normal power.

FIG. 7 depicts an other embodiment of the present invention, which shows the groupings of sensors on a common 110 VAC network. These networks 74a–d are interconnected by a dedicated backbone 75. Any group of the sensors and associated powerline relay unit (and common network) could be replaced by a group of wireless sensors and an associated wireless relay unit using a dedicated radio frequency. The interface 67 is connected to the groups of sensors via the dedicated backbone 75. The central computer 66 is then connected to the interface unit 67, and is also connected to an uninterruptable power supply 73.

3.0 Hardware Technical Description

This section presents detailed technical descriptions of each of the components introduced and discussed in Section 2.0. Separate subsections are devoted to each component. For each component other than the CMPC 66, the component subsections include an overview, specifications, and the theory of operations of the component. For the CMPC 66, subsections include an overview, specifications, and installed accessories.

3.1 PALS Control Processor (PCP)

3.1.1 Overview

The PCP 85, 95, 105, 115 is a common microprocessor control board which is a key element in the design of both Sensor Units 62, 63, both Sensor Relay Units 64, 65, and the Test Transmitter Unit 68. One embodiment of the microprocessor is a MC68HC811E2FN operating in expanded mux mode. One possible embodiment of the Programmable peripheral is a WSI PSD301 configured for 16-bit address multiplexed with 8-bit data bus, for example.

3.1.2 Theory of Operations

The PCP 85, 95, 105, 115 is controlled by a MC68HC811 Microcontroller (also referred to as simply the 6811). The 6811 executes at a clock frequency of 7.3728 MHZ. This frequency was chosen as a balance between 6811 throughput performance and the need for a reasonable baud rate clock source for communicating with standard equipment such as PCS. The 6811 uses a Maxim MAX690 to get a clean reset signal for power-on reset.

The 6811 has 5 user ports: A, B, C, D, and E. Port A is an 8 bit, general purpose Port with 3 dedicated inputs (PA0, PA1, PA2), 3 dedicated outputs (PA4, PA5, PA6), and 2 programmable inputs and outputs. PA3 is used as an input and PA7 is used as an output to reset the system as needed. In addition, the PA0, PA1, and PA2 inputs can be configured as interrupt inputs.

The 6811 is set up to operate in expanded multiplexed mode which uses Port B as an output of the most significant 8 bits of a 16 bit address and Port C as an output of the least significant 8 bits of the address, both multiplexed with a bidirectional data bus.

Port D is a 6 bit general purpose port. Under program control, 2 of these bits can be used as asynchronous serial data (PD0, PD1) and 4 bits can be used as synchronous serial data (PD2, PD3, PD4, PD5). The PCP uses PD0 to receive asynchronous serial data and PD1 to transmit asynchronous serial data. PD2–PD5 are used to communicate with a MC68HC705 microprocessor that is dedicated to decoding PPA identification codes.

Port E has 8 pins, each one of which can be independently used for general purpose binary I/O or as an analog input to internal 8 bit digitizers. The bit functions of Port E are specified under software control on a bit-by-bit basis. The PCP uses PE0 as an A/D input for monitoring sensor signal strengths. It uses PE1 as an A/D input for monitoring either the +V line or the Battery. The input to the A/D is selected by controlling the relay with PD4. If PD4 is high, the relay is on and the battery is connected to the A/D input. If PD4 is low, the +V is connected to the A/D input. PE2, PE3, PE4, PE5, PE6, and PE7 are used as inputs and are connected to the address selection switch. A pull-up resistor is used with the switch shorting the signal to ground when the switch position is closed.

A PSD301 Programmable Peripheral is used to expand the memory and I/O capability of the 6811. The PSD301 has 2K bytes of RAM and 32K bytes of UVEPROM It also has two 8 bit ports that can be dynamically programmed on a bit-by-bit bases as inputs or outputs, and a third port that can be used to decode I/O chip selects or additional input addresses. The PCP uses the first two 8 bit ports but not the third.

A 32K EEPROM is used to allow remote programming capabilities to the system from either the powerline or wireless modem. Most of the system program code will reside in this external 32K EEPROM. A 68HC705 is used to decode PPA identification codes. The 68HC705 monitors 2 voltage comparators that provide PPA identification in a unique format.

3.1.2.1 Modem Port

One embodiment of the PCP uses an Intellon Modem for communications. There are two different modems: one which uses the AC power line and one which uses RF as a communications medium. The interface to both looks exactly the same to the PCP hardware. The PCP does not interface directly with the Intellon interface. It PCP uses a special custom part that takes care of all of the low level protocol.

3.1.2.2 Hub Port

The PCP has a set of MODE pins that it reads under software control to determine which mode it is to enter and, therefore, which software routines will be used. The Mode 0 and Mode 1 pins are used for this purpose. The hardware has two inputs that are pulled up through resistors and are either jumpered to ground or left open, depending on the mode of operation required. The PCP also has a serial communication port over which data can be transmitted and received. This port is used to communicate with other PCPs. It can also be used to download data to the 6811 and external 32K EEPROM.

3.1.2.3 Receiver Port

The PCP interfaces with a custom RF receiver. The receiver provides a reference voltage output and a Received Signal Strength Indicator (RSSI) output which is an analog voltage proportional to the level of the received signal. The RSSI output is connected to the A/D of the Microcontroller. A detailed description of the receiver is given in Appendix B.

3.2 Power Line Sensor Unit (PSU)

3.2.1 Overview

Figure 8A:
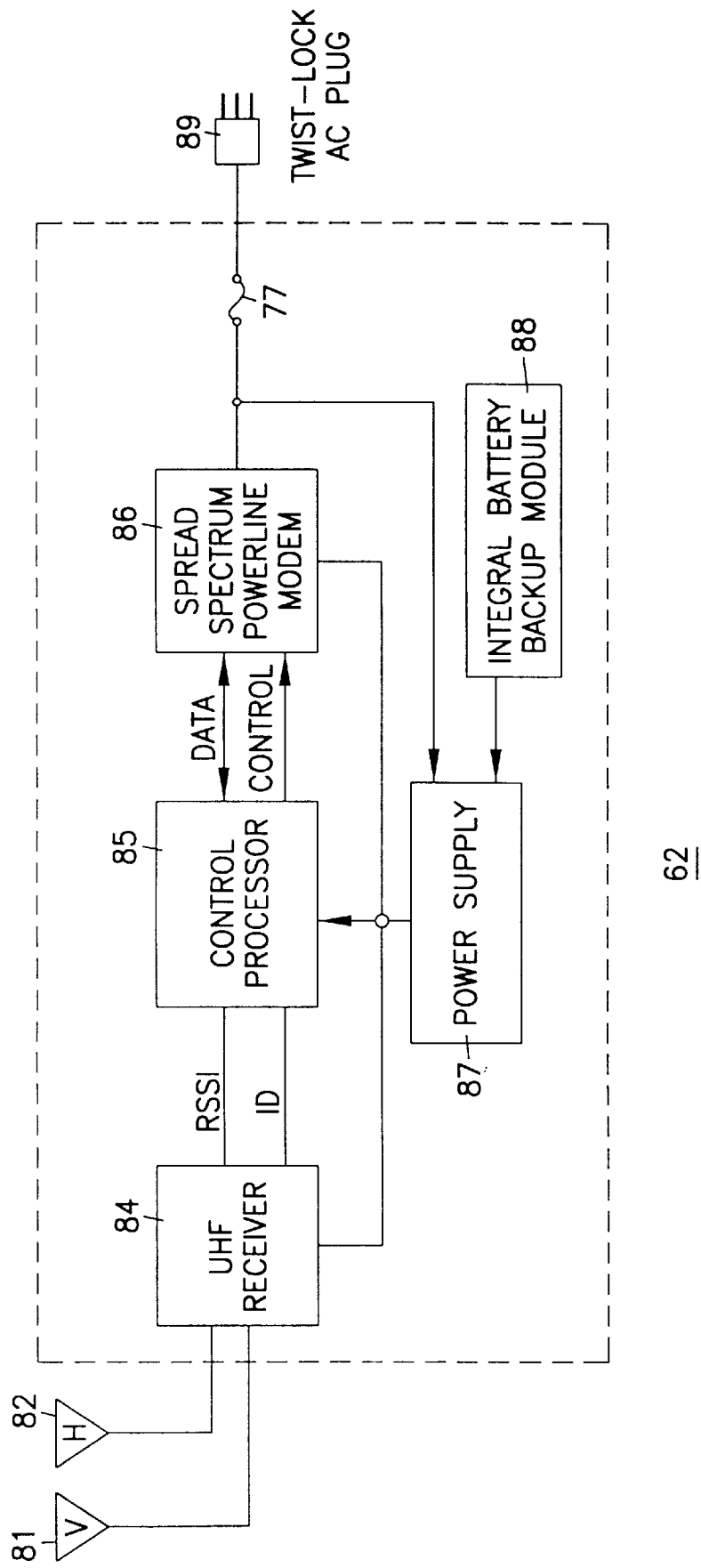
FIG. 8A depicts a block diagram of one embodiment of the PALS Sensor Unit (PSU) according to the present invention.

Referring to FIG. 8A, the PSU 62 is a device used to sense and monitor PPA transmitter RF signal strength and communicate data to a PSRU 64 over an AC line.

PSUs 62 are organized into groups and each group is associated with a single PSRU 64. This means that each PSU 62 belongs to one and only one PSRU's 64 group, and a PSRU 64 is responsible for communicating with all the PSUs 62 that belong to its group.

PSRUs 64 interface with the PSUs 62 in their group over the power lines. The characteristic that distinguishes the PSUs 62 that belong to a PSRU's 64 group is that they are all on the same electrical power circuit. An electrical power circuit is one which is serviced by a single electrical transformer. The PSRUs 64 act as relays between the PSUs 62 in their group and the CMPC 66 for addressed packets on the CEBus network. In addition, as part of alarm processing, each PSRU 64 polls the PSUs 62 in its group to collect signal strength measurements and sends the readings as a single large packet to the CMPC 66.

The PSRUs 64 are interconnected over a backbone network (coaxial cable, twisted pair) 75 to the Monitoring Post Interface Unit (MPIU) 67. The MPIU 67, acting as a network bridge, interconnects the backbone network 75 to the Central Monitoring Post Computer (CMPC) 66.

3.2.2 Theory of Operations 3.2.2.1 Power Distribution System

The PSU 62 gets its power from the AC line. The AC line is fused 77 and connected to a Power Line Modem 86 and an inductive filter (not shown). The Power Line Modem 86 allows the AC line to be used as a communications medium for data transmission and reception. The inductive filter is used in a unique manner: not so much as a filter but as a filter blocking device.

The DC power supply 87 has a filter (not shown) on its AC input which is used to reduce any RF interference that may be present on the power line. This filter would act as a short circuit to the Power Line Modem signals if it were connected directly to the AC line. To avoid this problem, an inductive filter (not shown) has been added in series with the DC power supply 87. The filter in the power supply 87 is effectively isolated from the AC line.

The DC power supply 87 is set at 15V and is used to supply power to the PCP 85. A battery 88 is present to act as a backup power source in the event of AC power outages that may last for up to 1 hour. The battery 88 is charged and discharged through the PCP 85. All other sub-assemblies get their power through the PCP 85.

3.2.2.2 Communications

The communications system used by the PSU 62 is a CEbus spread spectrum power line modem 86. It uses the AC line as a communications medium. The modem 86 is controlled by the PCP 85.

3.2.2.3 Receiver

The Receiver 84 is used to convert RF power to a DC voltage. The DC voltage is proportional to the logarithm of the RF power. The receiver 84 itself is not perfectly linear over the desired range, so a table of corrected values is stored in a EEPROM on the PCP board 85. An attenuator (not shown) is also used on the front end to improve dynamic range. The attenuator and EEPROM memory are controlled by the PCP 85. A detailed description of the receiver 84 is given in Appendix B.

3.3 Wireless Sensor Unit (WLSU)

3.3.1 Overview

Figure 8B:
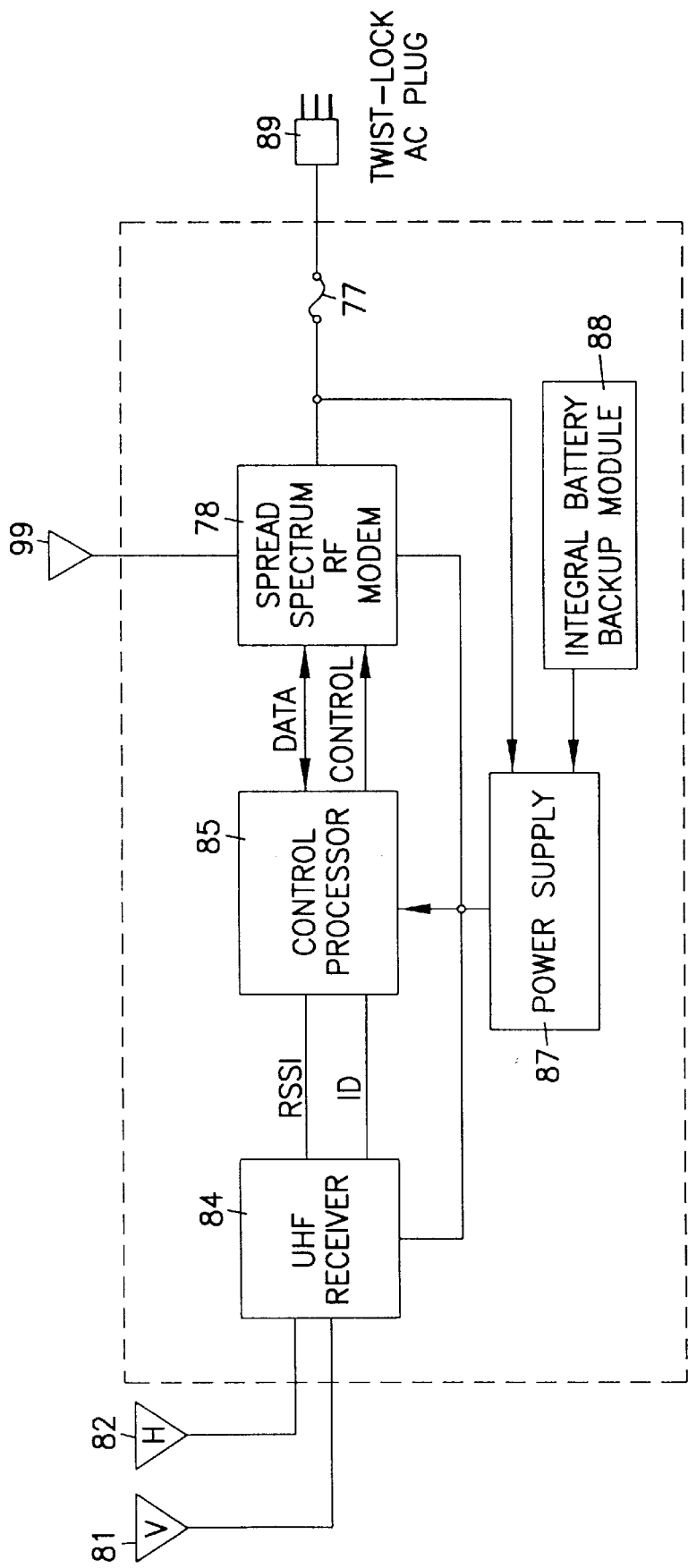
FIG. 8B depicts a block diagram of one embodiment of the PALS Wireless Sensor Unit (WLSU) according to the present invention.

Referring to FIG. 8B, the WLSU 63 is a device used to sense and monitor PPA 61 transmitter RF signal strength and communicate data to a WLRU 65 using RF transmissions over free space.

WLSUs 63 are also organized into groups and each group is associated with a single WLRU 65. WLRUs 65 interface with the WLSUs 63 in their group using RF transmissions. The characteristic that distinguishes the WLSUs 63 that belong to a WLRU's 65 group is that they all operate at the same radio frequency. The WLRUs 65 act as relays between the WLSUs 63 in their group and the CMPC 66 for addressed packets on the CEBus network 75. In addition, as part of alarm processing, each WLRU 65 polls the WLSUs 63 in its group to collect signal strength measurements and sends the readings as a single large packet to the CMPC 66.

The need for WLSUs 63 and WLRUs 65 stems from the requirement to provide protection coverage to areas within the facility that are both physically and electrically remote. The transformer servicing these areas may be located remotely within the areas. Using PSUs 62 and PSRUs 64 would require very costly trenching and burying operations to install the required cables from the remote areas to the centrally located CMPC 66.

The WLRUs 65 are interconnected to the MPIU 67 over the same coaxial cable backbone network 75 as are the PSRUs 64.

3.3.2 Theory of Operation 3.3.2.1 Power Distribution System

The WLSU 63 gets its power from the AC line via plug 89. The AC line is fused 77 and connected to a DC Power supply 87. The DC power supply 87 is set at 15 V and is used to supply power to the PCP 85. A battery 88 is present to act as a backup power source in the event of AC power outages that may last for up to 1 hour. The battery 88 is charged and discharged through the PCP 85. All other sub-assemblies get their power through the PCP 88.

3.3.2.2 Communications

The communications system used by the WLSU 63 is a CEbus spread spectrum RF modem 78. The modem is controlled by the PCP 85. The output of the Cebus spread spectrum RF modem 78 is coupled to an antenna 99 via which the RF signal to the WLRU is transmitted.

3.3.2.3 Receiver

The Receiver 84 is used to convert RF power to a DC voltage. The DC voltage is proportional to the logarithm of the RF power. The receiver 84 itself is not perfectly linear over the desired range, so a table of corrected values is stored in an on-board EEPROM. An attenuator (not shown) is also used on the front end to improve dynamic range. The attenuator and EEPROM memory are controlled by the PCP 85. A detailed description of the receiver 84 is given in Appendix B.

3.4 Power Line Sensor Relay Unit (PSRU)

3.4.1 Overview

Figure 9A:
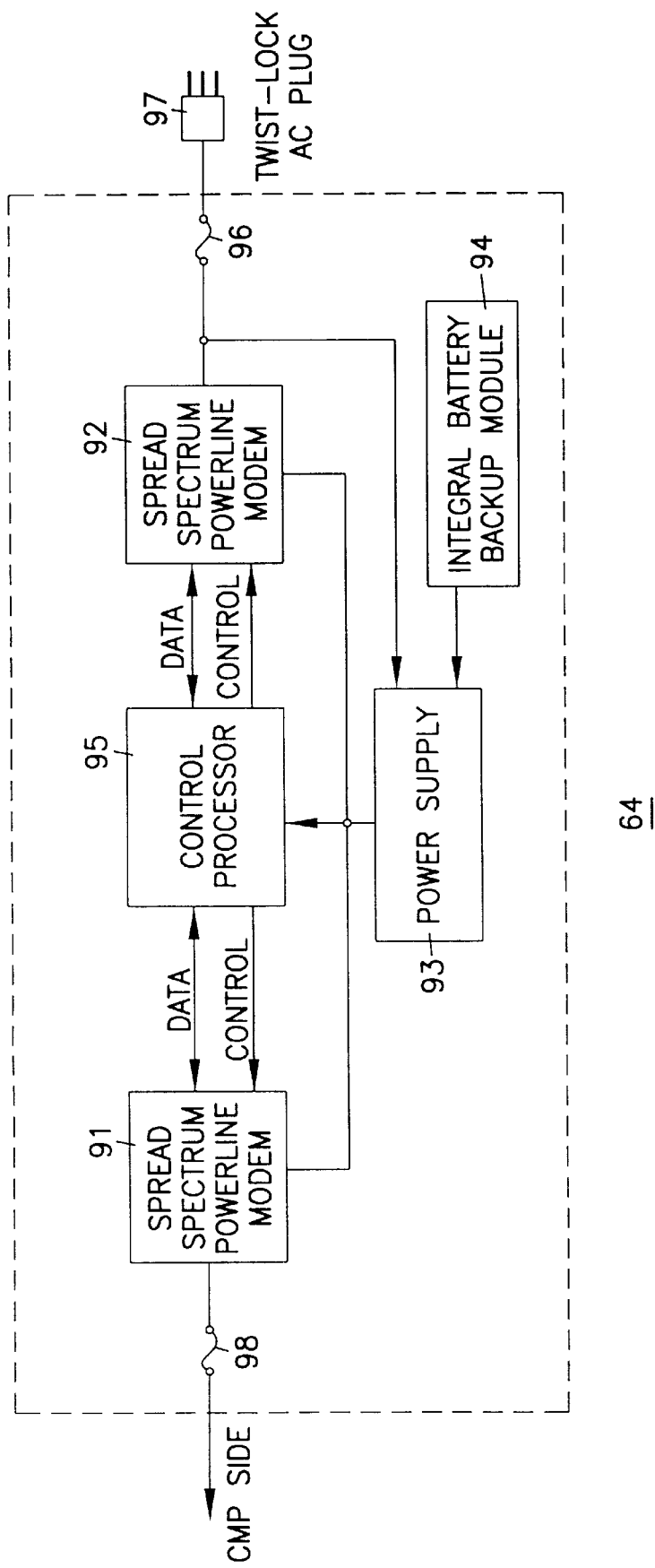
FIG. 9A depicts a block diagram of one embodiment of the PALS Sensor Relay Unit (PSRU) according to the present invention.

Referring to FIG. 9A, the PSRU 64 is a device used to relay data between a PSU 62 and the CMPC 66 via the MPIU 67.

PSRUs 64 interface with the PSUs 62 in their group over the power lines. The characteristic that distinguishes the PSUs 62 which belong to a PSRU's 64 group is that they are all on the same electrical power circuit (e.g., 74a–f, FIG. 7). An electrical power circuit is one which is serviced by a single electrical transformer. The PSRUs 64 act as relays between the PSUs 62 in their group and the CMPC 66 for addressed packets on the CEBus network. In addition, as part of alarm processing, each PSRU 64 polls the PSUs 62 in its group to collect signal strength measurements and sends the readings as a single large packet to the CMPC 66.

The PSRUs 64 are interconnected over a backbone network 75 (e.g., coaxial cable, or twisted pair) to the Monitoring Post Interface Unit (MPIU) 67. The MPIU 67, acting as a network bridge, interconnects the backbone network 75 to the Central Monitoring Post Computer (CMPC) 66.

3.4.2 Theory of Operation 3.4.2.1 Power Distribution System

The PSRU 64 gets its power from the AC line via plug 97. The AC line is fused 96 and connected to a Power Line Modem 92 and an inductive filter (not shown). The Power Line Modem 92 allows the AC line to be used as a communications medium for data transmission and reception. The inductive filter is used in a unique manner: not so much as a filter but as an isolator.

The DC power supply 93 has a filter (not shown) on its AC input which is used to reduce any RF interference that may be present on the power line. This filter would act as a short circuit to the Power Line Modem 92 signals if it were connected directly to the AC line. To avoid this problem, an inductive filter has been added in series with the DC power supply 93. The filter in the power supply 93 is effectively isolated from the AC line.

The DC power supply 93 is set at 15 V and is used to supply power to the PCP 95. A battery 94 is present to act as a backup power source in the event of AC power outages that may last for up to 1 hour. The battery 94 is charged and discharged through the PCP 95. All other sub-assemblies get their power through the PCP 95.

3.4.2.2 Communications

The communications system used by the PSRU 64 consists of two CEbus spread spectrum power line modems 91, 92. Each modem 91, 92 is controlled by a separate PCP 95 (only one of which is shown for simplicity purposes). One modem 92 is used to communicate with distant PSUs 62 over the AC power lines, and the other modem 91 is used to communicate with the CMPC 66 over the backbone network 75.

3.5 Wireless Sensor Relay Unit (WLRU)

3.5.1 Overview

Figure 9B:
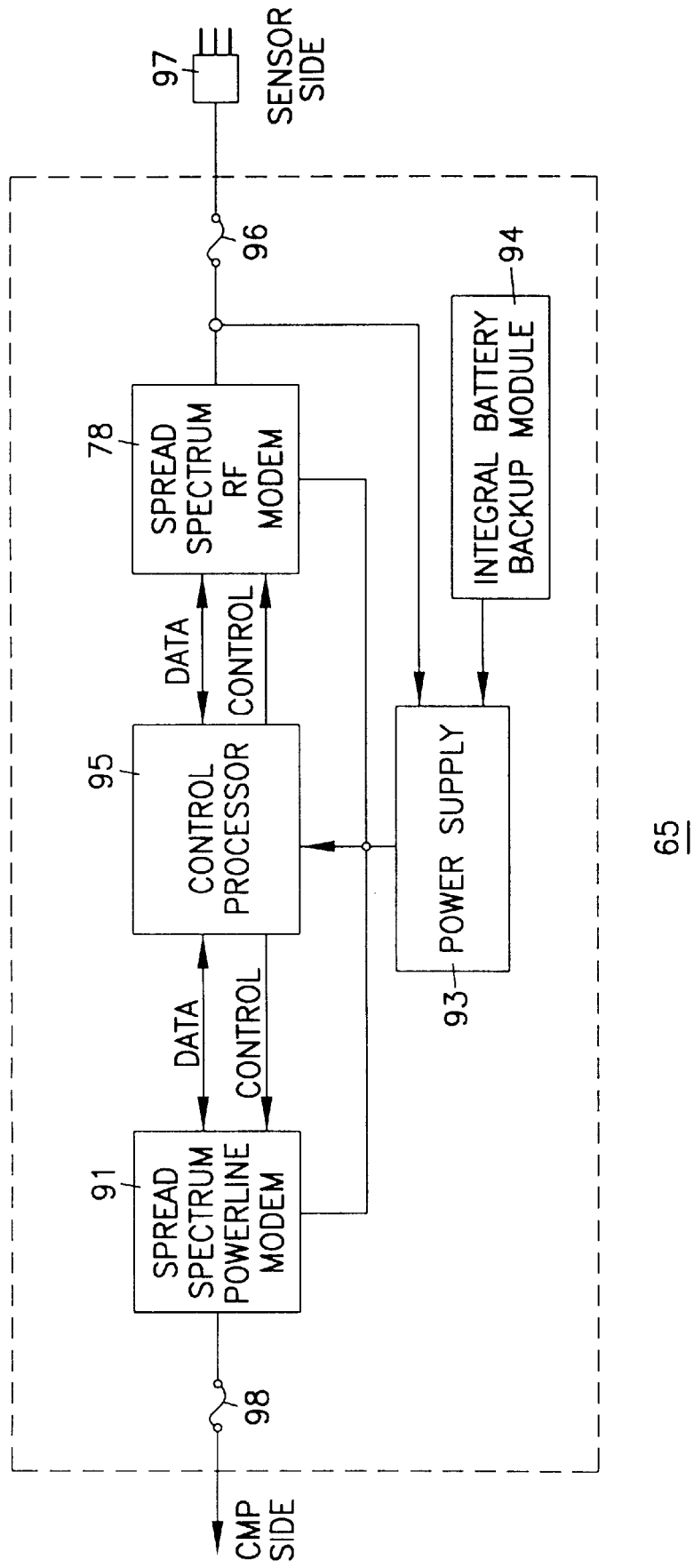
FIG. 9B depicts a block diagram of one embodiment of the PALS Wireless Sensor Relay Unit (WLRU) according to the present invention.

Referring to FIG. 9B, the WLRU 65 is a device used to relay data between a WLSU 63 and the CMPC 66 via the MPIU 67.

The need for WLSUs 63 and WLRUs 65 stems from the requirement to provide protection coverage to areas within the facility that are both physically and electrically remote. The transformer servicing these areas may be located remotely within the areas. Using PSUs 62 and PSRUs 64 would require very costly trenching and burying operations to install the required cables from the remote areas to the centrally located CMPC 66.

The WLRUs 65 are interconnected to the MPIU 67 over the same coaxial cable backbone network 75 as are the PSRUs 64.

3.5.2 Theory of Operation 3.5.2.1 Power Distribution System

The WLRU 65 gets its power from the AC line via plug 97. The AC line is fused 96 and connected to a DC Power supply 93. The DC power supply 93 is set at 15V and is used to supply power to the PCP 95. A battery 94 is present to act as a backup power source in the event of AC power outages that may last for up to 1 hour. The battery 94 is charged and discharged through the PCP 95. All other sub-assemblies get their power through the PCP 95.

3.5.2.2 Communications

The communications system used by the WLRU 65 consists of two modems: a CEbus spread spectrum RF modem 78 and a CEbus power line modem 91. Each modem 78, 91 is controlled by a separate PCP (only one of which is shown for simplicity purposes). The RF modem 78 is used to communicate with distant WLSUs 63 and the CEbus power line modem 9 is used to communicate with the CMPC 66 over the backbone network 75.

3.6 Test Transmitter Unit (TTU)

3.6.1 Overview

Figure 11:
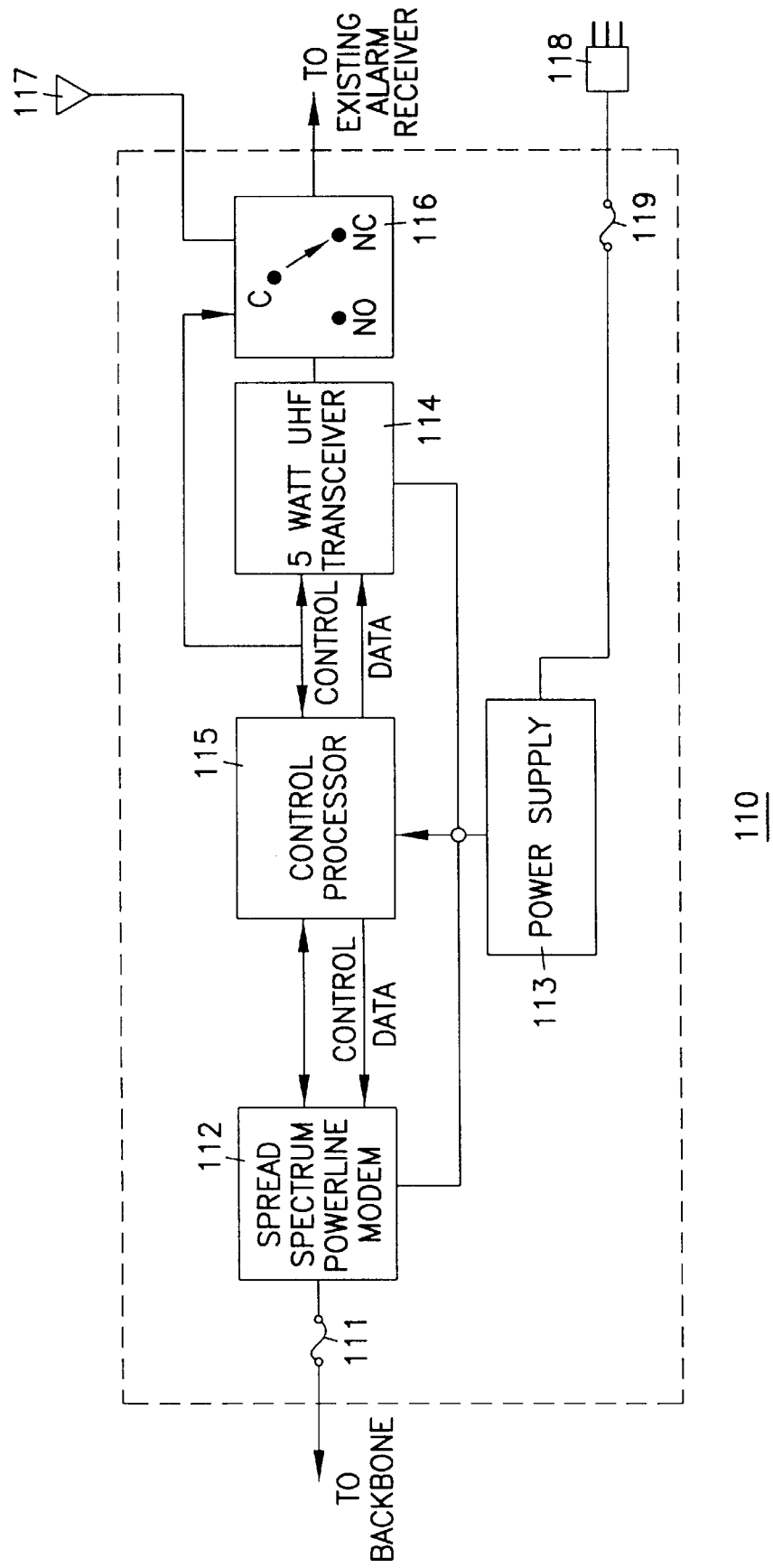
FIG. 11 depicts a block diagram of one embodiment of the PALS Transmitter Test Unit (TTU) according to the present invention.

Referring to FIG. 11, the TTU 68 is a device used to transmit an RF test alarm signal to simulate the activation of a PPA transmitter 61.

The present invention periodically conducts minor and major self-tests, both automatically and at the command of a CMPC operator. The major self-test is an end-to-end test of the entire system. During a major self-test, a TTU 68 is activated for a short period of time to verify that all components are functioning properly. Battery back-up functionality is also checked. Abnormal results are displayed as warning messages on the CMPC screen and are reported to the MPIU 67. They also affect system operation by changing assumptions about which components are functioning properly. Alarms that occur during certain critical phases of a major self-test cannot be distinguished from the TTU transmissions. During other phases, alarms will cause the self-test to be aborted.

3.6.2 Theory of Operation

The TTU 68 is a device used to transmit an RF test alarm signal to simulate the activation of a PPA transmitter 61. The TTU 68 operates under the command of the CMPC 66 to initiate a major system self-test. As part of calibrating the present invention, the signal strengths of responses of all PSUs 62 and WLSUs 63 to PPA RF transmissions are measured and recorded, including transmissions from TTUs 68. The signal strengths received by PSUs 62 and WLSUs 63 from TTUs 68 during a major system self-test are compared with the recorded calibration values to assess whether the system is functioning properly. Receipt of signals whose strengths differ from calibration values by more than some system tolerance is an indication of a malfunction.

3.6.2.1 Power Distribution System

The TTU 68 gets its power from the AC line via plug 118. The AC line is fused 119 and connected to a Power Line Modem 112 and an inductive filter (not shown). The Power Line Modem 112 allows the AC line to be used as a communications medium for data transmission and reception. The inductive filter on the AC input is used to reduce any RF interference that may be present on the power line. This filter would act as a short circuit to the Power Line Modem signals if it were connected directly to the AC line. To avoid this problem, the inductive filter has been added in series with the DC power supply 113. The filter in the power supply 113 is effectively isolated from the AC line.

The TTU 68 also has a separate voltage regulator to control the voltage supplied to the transmitter 114. During installation, this regulator is used to adjust the output power of the transmitter 114 so that all sensors can detect a TTU transmission as an alarm without being over-driven.

The DC power supply 113 is set at 12 V and is used to supply power to the PCP and the test transmitter.

3.6.2.2 Communications

The communications system used by the TTU 68 is a CEbus spread spectrum power line modem 112. It uses the AC line or the coaxial backbone as a communications medium. The modem 112 is controlled by the PCP 115.

3.7 Central Monitoring Post Computer (CMPC)

3.7.1 Overview

The CMPC 66 is a 486 based, IBM compatible PC, executing software under the MS DOS operating system.

The CMPC controls the operations of the other system components and processes the signal strength measurements received from sensors during an alarm event. It determines the location of the alarm transmission and presents the alarm location to the user on an internally-stored map of the facility. An acoustic alarm is also generated upon receipt of an alarm. If the facility is so equipped, the CMPC 66 also outputs alarm location messages to a Senstar Perimeter Intrusion Detection System Integration Unit (PIU) over a separate RS-232C serial channel. While the PIU is one type of alarm reporting system that the present invention interfaces with, the present invention can interface with any of a variety of alarm reporting systems, due to the kernal of software in the CMPC, which contains a set of modifiable parameters for communications with the alarm reporting systems. In addition to sending alarm information to the PIU, the CMPC 66 displays this information in text format on its own display. It can serve as a stand-alone backup system, logging the messages to its disk and a printer, in the event of a PIU failure. The CMPC 66 also provides a user interface to the system, allowing a trained operator to configure the system, calibrate the system, set or modify various system parameters, and conduct various system diagnostic tests.

If so configured, the CMPC 66 also monitors the serial data output from the Telecourier PPA decoder 99 to determine the ID of certain categories of PPA transmissions. In addition to the Telecourier PPA decoder, the present invention may also be used with other decoders. The PSUs 62, 63 also decode the ID of PPA transmissions. The decoder only serves to extend the physical range of the system when the Telecourier receiver installed at the facility utilizes a high gain, mast-mount antenna.

3.7.2 Specifications

The CMPC specifications are provided as to establish a level of equivalence. The particular specifications of one possible embodiment of the CMPC 66 are:

NEC PowerMate 466D PM-1410-24901

486 DX2 CPU, 66 MHZ clock

4 MB RAM, 8 KB Internal Cache

420 MB Hard Disk Drive, 11 ms., Local Bus IDE 3.5", 1.44 MB Diskette Drive

VGA VESA 2.0-Compatible Video Card

5 Expansion Slots (4 ISA, 1 shared 32-bit VL/ISA)

3 Drive Bays

1 Parallel Port, 2 Serial Ports

101 Key, PS/2 Compatible Keyboard

145 Watt Power Supply

Mouse

NEC VGA Monitor, 14" Diagonal, 0.28 mm Dot Pitch, Non-Interlaced

Maximum Resolution 1024×768 pixels

Hayes Accura 144B+FAX Internal Modem 14,400 bit/s Data and FAX

V.32 bis

V.42 bis data compression and error control

Commercial Software

MS DOS 6.21 and Windows 3.1

Symantec Norton pcAnywhere, Version 5.0

Remote Computing and Communications

TouchStone Checkit, PC Diagnostics Software 3.8 Monitoring Power Interface Unit (MPIU)

3.8.1 Overview

Figure 10:
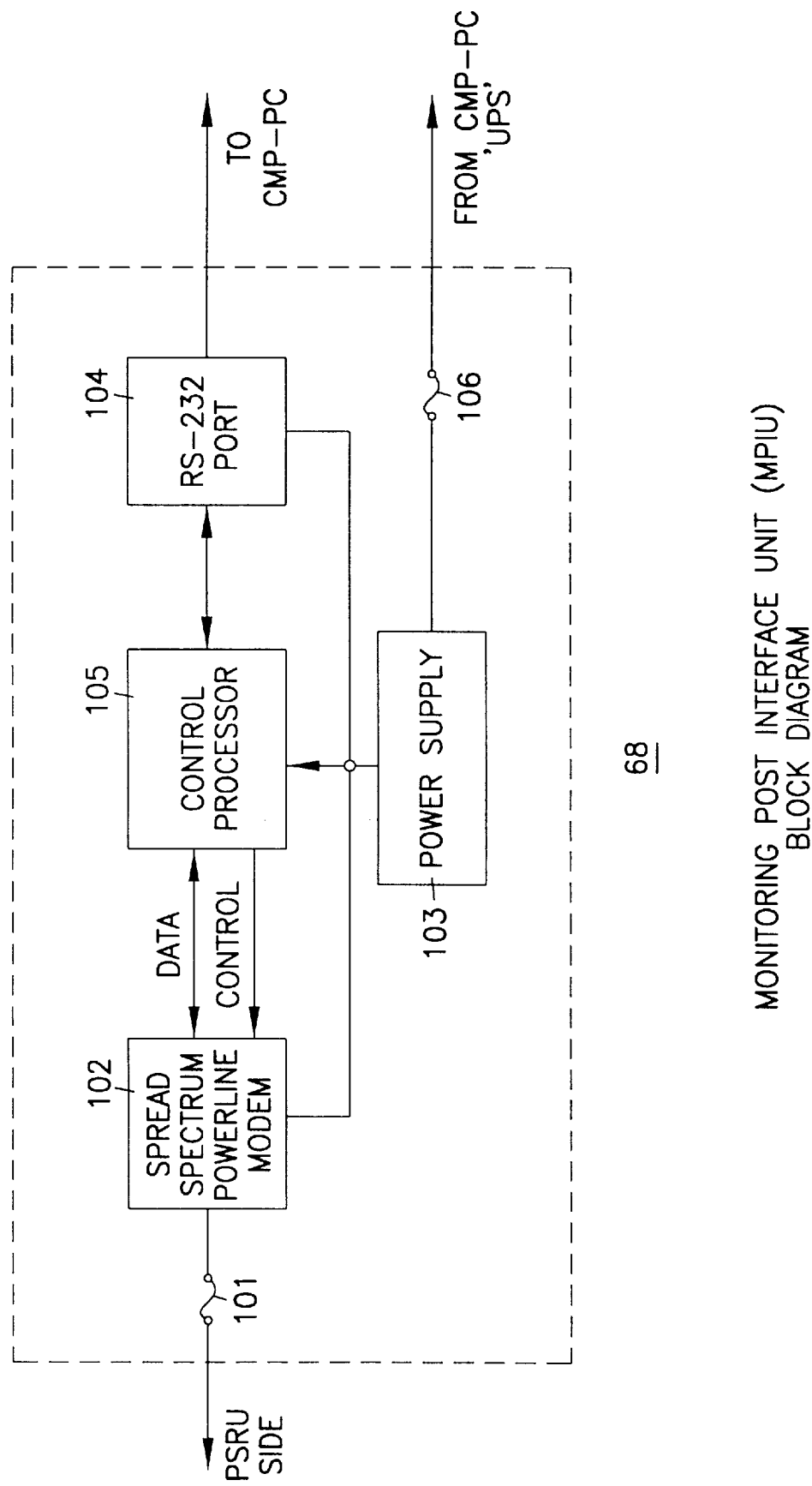
FIG. 10 depicts a block diagram of one embodiment of the PALS Monitoring Post Interface Unit (MPIU) according to the present invention.

Referring to FIG. 10, the MPIU 68 is a device used to relay data between the PSRUs 63 and the WLRUs 65 to the CMPC 66.

The MPIU 67 is connected to the relay units 64, 65 over the same coaxial cable backbone network 75.

3.8.2 Theory of Operation 3.8.2.1 Power Distribution System

The MPIU 68 gets its power from the UPS 73. The AC line is fused 106 and connected to a DC Power supply 103. The DC power supply 103 is set at about 12–15V and is used to supply power to the PCP 105. All sub-assemblies get their power through the PCP 105.

3.8.2.2 Communications

The communications system used by the MPIU 68 consists of a modem and an RS-232 port 104. The modem is a CEbus power line modem 102. The modem 102 is controlled by the PCP 105. The CEbus power line modem 102 is used to communicate with the relay units 64, 65 over the backbone network 75. The data is demodulated and converted to digital data by the modem 102, which data is transmitted to the CMPC via the RS-232 port 104.

4.0 Software Technical Description

The operational software consists of two primary computer software components: the software that executes in the PCP and the software that executes under DOS in the CMPC.

In addition to the DOS and Windows operating systems, two commercial software packages reside on the hard disk of the CMPC 66: Symantec Norton pcAnywhere, Version 5.0, a remote computing and communications utility, and TouchStone Checkit, a PC diagnostics software utility.

4.1 Control Processor Software

This section briefly discusses the software component that executes in the PCP 85, 95, 105, 115. This software was developed using the Avocet 6811 assembler.

4.1.1 Overview

All PCPs in the system contain the same software component written into their UV EPROM. The PCP software consists of the following high-level modules: Power-on initialization module, Kernel module, Transmitter mode module, Sensor mode module, Relay mode module, and Hub mode module. Each PCP executes the Power-on initialization module and requires the services of the kernel module. Only one of the mode modules is executed by any individual PCP, depending upon whether the PCP 115, 85, 95 controls a TTU 68, PSU 62 or WLSU 63, or the relay or hub side of a PSRU 64 or WLRU 65, respectively.

The following subsections address each of the PCP software component modules.

4.1.2 Power-on Initialization

Upon power-on or reset, the code first determines in which mode it should execute. The code executes in the transmitter mode for TTUs 68, and in the sensor mode for the PSUs 62, 63. For the relay side of the PSRUs 64 and WLRUs 65, the code executes in the relay mode. For the hub side of the PSRUs 64 and WLRUs 65, the code executes in the hub mode. The mode in which a unit will execute is determined by jumpers on the microprocessor board.

Also, all initializations common to two or more modes of operation are accomplished in this code module. For example, addresses are necessary for all modes of operation, so the power-up initialization code is responsible for reading the address pins. This common initialization takes place before the jump to the proper code module is made.

4.1.3 Kernel

In the interests of efficient development and to save code space, all functionality common to two or more modes of operation are placed in the kernel module. This includes communicating via the CEBus and RS-232 ports, self-test, reset, battery check, and other functions.

The self-test code in the kernel module includes a RAM, ROM, and a battery test. The reset code in the kernel sends an ACK message to the CMPC 66, then jumps to the start of the power-on initialization code.

4.1.4 Transmitter Mode

In transmitter mode, the software responds to only one special command from the CMPC 66, the SYSTEST command, which will cause the TTU 68 to turn its transmitter on for 120 milliseconds, and then shut it off An ACK message will be returned to the CMPC 66 upon receipt of this message, via the CEBus. For other message handling within transmitter mode, see section 4.1.8.

4.1.5 Sensor Mode

In sensor mode, the software responds to several commands from the CMPC 66, as well as monitors the receiver signal strength for alarm conditions. The sensor 62, 63 samples the signal strength from one of its two antennae 81, 82 every millisecond. If switching the attenuator in the receiver 84 is required, it will re-sample the same antenna one millisecond later. The signal strength values from both antennae 81, 82 are normalized by using the look-up table from the receiver 84, and the highest normalized value is used as a final, combined RSSI value. This value is compared to the noise floor (which is based on the average signal strength when no alarms are occurring), and any significant rise above the noise floor triggers the sensor 62, 63 to begin keeping track of the highest alarm signal strength, and also to send an alarm message to the CMPC 66. When the signal strength again falls to the noise floor, or 250 samples have been taken, the sensor 62, 63 stores the highest signal strength reading, along with a time stamp from the start of the alarm, and again begins to look for a rise in strength again.

After transmitting an alarm message, the sensor 62, 63 expects a mark message from the CMPC 66. If none is received within 150 ms, the sensor 62, 63 re-transmits the alarm message. This continues indefinitely. When the mark message is received, the sensor 62, 63 records the time encoded in the message, and prepares to transmit the signal strength recorded at that time (within plus or minus 50 milliseconds). When the sensor 62, 63 receives a signal strength request, it transmits that data in a signal strength response message along with the decoded PPA identification code.

After a mark message has been received, the sensor 62, 63 will no longer transmit alarm messages to the CMPC 66. The sensor 62, 63 must either receive an all over message, or wait for five seconds to elapse from the last mark message received before beginning to transmit alarm messages again. A sensor 62, 63 may also receive a test-mode-1 message, which will prohibit it from ever sending alarm messages, until the sensor 62, 63 receives a reset command. A sensor 62, 63 may also receive next-alarm requests, in which case the sensor 62, 63 will return only the signal strength of the next alarm in its buffer (without the next alarm time), and erase that alarm from the buffer.

If a sensor 62, 63 receives a noise floor request, it will format a noise floor response message, and send it to the CMPC 66 via the CEBus. And on receipt of a clock message, the sensor 62, 63 will set its internal real-time clock to the new time specified by the message. The clock is used solely to time stamp the start of alarm events. For other message handling within transmitter mode, see section 4.1.8.

4.1.6 Relay Mode

In relay mode, the software receives packets from the serial interface, and transmits them over the CEBus, or vice-versa. Any and all packets are passed through from one medium to the other, when not addressed specifically for the relay. The only modifications made to the packets are simple transformations from CEBus packets to serial packets, or from serial to CEBus.

If a packet is addressed to a relay, it will be one of the more common packets, discussed in section 4.1.8.

4.1.7 Hub Mode

In hub mode, the software must do three things: act as a relay, gather signal strengths, and filter traffic on the CEBus and the serial ports. It must act as a relay when it receives messages that are not addressed to it from either the CEBus or the serial ports. These messages must be passed on, without modification, just as in relay mode. The only exception to this is when the hub must filter traffic. Each hub may have up to thirty-two sensors 62, 63 and the CMPC 66 with which to communicate, and so CEBus traffic not addressed to one of the sensors 62, 63 or the CMPC 66 are not relayed, but are instead ignored. Also, serial port traffic not addressed to the CMPC 66 will be ignored, and not passed on. Additional filtering accomplished by the hub is to limit the number of alarm messages passed to the CMPC 66 from the sensors 62, 63. If more than one alarm message is received by the hub from its sensors 62, 63, it only relays one of them to the CMPC 66. Messages addressed globally are always relayed.

The CMPC 66 will send the hub a list of the sensors 'attached' to the hub, based on information in the CMPC database. This list is used for filtering and polling purposes. The hub code will write the list into EEPROM, so that in case of power-outage, it will retain the list after a reset.

When a mark message is received by the hub, the hub will relay the message on to its sensors 62, 63, four times (to make sure all the sensors receive it). After relaying, the hub will poll all of its sensors for signal strength information. The hub will then wait for the CMPC 66 to request the signals strengths, and the hub will send back a message with all of the collected values.

For diagnostic purposes, the hub may receive requests from the CMPC 66 that enable the CMPC 66 to determine with which sensors the hub can communicate. The messages request the hub to query a particular sensor 62, 63 to report its self-test results. The hub then reports back to the CMPC 66 a success or failure code based on whether or not the hub received a response from that sensor.

For other message handling within hub mode, see section 4.1.8.

4.1.8 Common Functionality

Because each mode of the software contains its own loop for receiving and processing messages, there is some code that is redundant in each module. When any PCP receives a self-test request, it will call the self-test routine in the kernel module, passing it the address to which to send the self-test response message. The kernel will then format the self-test response message, and send it back to the specified address. If the PCP is executing in Hub mode, the response will be sent via the serial bus, otherwise it will be sent via the CEBus. Receipt of reset messages will cause the PCP code to call the reset function in the kernel module, which will send an ACK message to the CMPC (via serial bus if a Hub, otherwise via the CEBus), wait for the ACK to be completely transmitted, and then the kernel will jump to the start of the power-on initialization code. And if a loop-back message is received by a PCP, the code will transmit the message, verbatim, back to the sender by the same port the message was received from.

Except for TTUs 68 and relays, which have no batteries, whenever a PCP receives a battery check request, it will jump to the battery check routine in the kernel, which will test the battery and return its status to the CMPC 66.

4.2 Central Monitoring Post Computer Software

The software that executes on the CMPC 66, other than the DOS operating system, consists of the system operational software component and the commercial software packages supplied with the system. These software components are addressed in this section.

Figure 13:
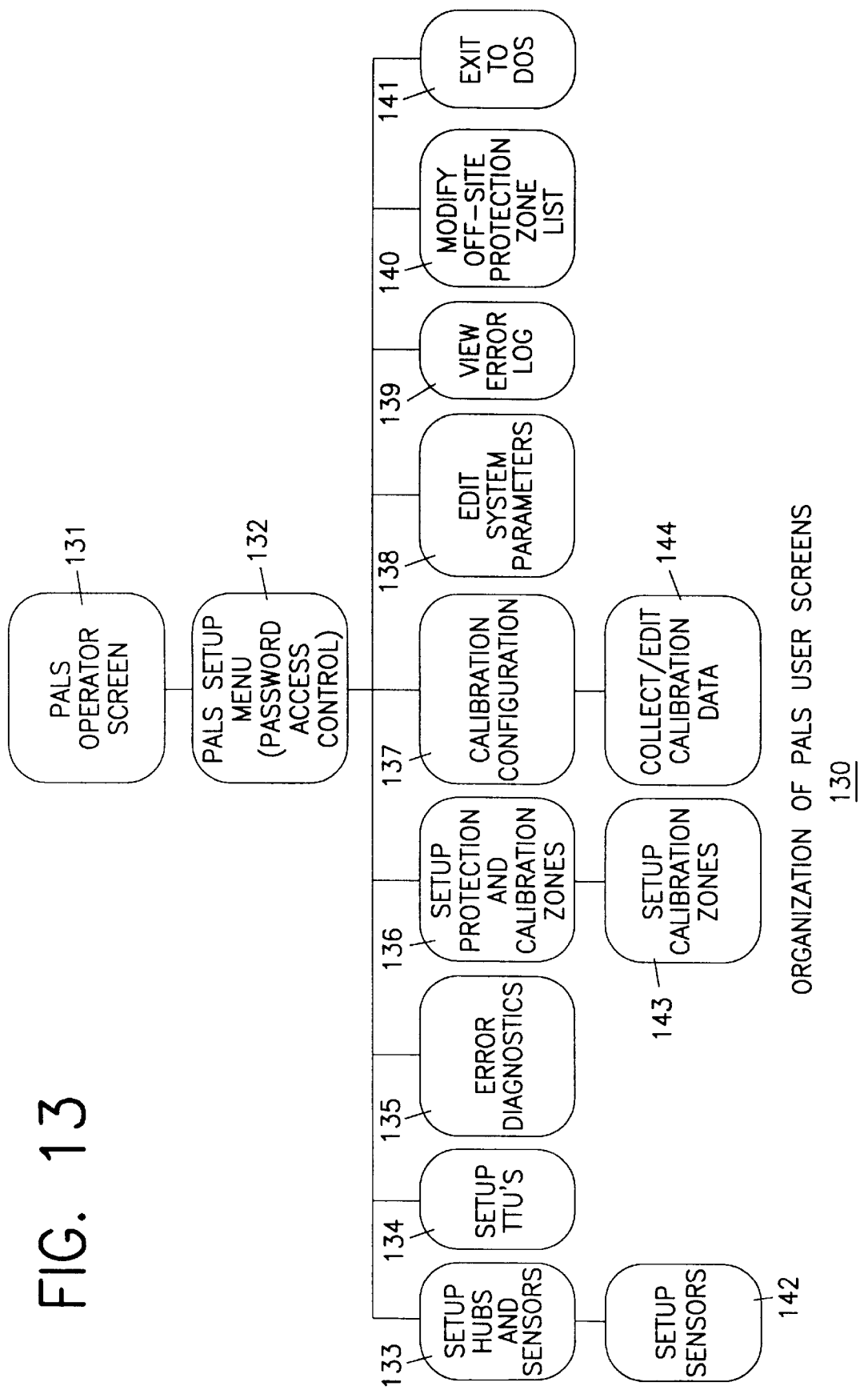
FIG. 13 depicts the organization of the PALS user screens presented in the graphical user interface of the present invention.

Referring to FIG. 13, when operating out of the Operator Screen 131, the CMPC 66 is unable to display received alarms. Most alarms will be buffered for display and annunciation immediately upon returning to the Operator Screen 131. In the Diagnostics Screen 135, actual alarms will be reported as signal strength readings—alarms received while the CMPC is in the Diagnostics Screen 135 will not be reported when returning to the Operator Screen 131. Certain functions, such as calibrating sensors, require the sensors to be reset—this operation will erase any actual alarms buffered in the sensor memory.

4.2.1 CMPC Operational Software

This section briefly discusses the operational software component that executes on the CMPC 66. This software executes on an IBM AT or 100 percent compatible machine with four megabytes of RAM and a hard disk. It was developed using the Borland C 3.1 compiler. It requires DOS 3.3 or higher.

4.2.1.1 Overview

The CMPC software consists of the following four high level modules: initialization, operating mode, setup mode, and diagnostics mode. Each of these modules is briefly described in the following sections.

The modules referred to above are all executable and, together, constitute the single system executable file, PALS.EXE, which is invoked by the batch file CMPC.BAT. PALS.EXE requires five additional files to execute. The first is CENODE.EXE, the CEBus driver program, which is also invoked by CMPC.BAT. Three are binary data files, and one is an ASCII text file, and all reside in the PALS_DB subdirectory. The file, PALS.CFG, contains data which define the system equipment and their interconnections (PSUs, WLSUs, PSRUs, WLRUs, and TTUs). The file, PZ.CFG, contains data which define the facility's protection zones. The file, CZ.CFG, contains data which define the facility's calibration zones and the results of the most recent system calibration process. And the file PALSOPT.CFG is an ASCII text file with several different parameters that should be set once during installation of the system, and never modified again.

In addition, the PALS_DB directory may contain a sequence of triplets of files with names PALSxxxx.CFG, PZxxxx.CFG, and CZxxxx.CFG, where xxxx represents a 4 digit number (e.g. 0003 or 0145). These are backup versions of PALS.CFG, PZ.CFG and CZ.CFG, created whenever some aspect of the system has been changed from the setup mode of the PALS CMPC software.

4.2.1.2 Initialization

Initialization of the system includes reading the binary data files from the hard disk of the computer. These files contain the lists and configuration of equipment and locations, calibration data, along with the other information entered by the user. Using the configuration data, the CMPC sends each hub a list of the sensors with which it can communicate. The software automatically checks to make sure that the system is functioning properly by executing minor self-tests. After the tests have been executed, additional program functionality is initialized, including the screen windowing capability, memory management, (optional: access to and control of the serial interface to the FAAS 79) and the CEBus interface to the PALS backbone network. The software then enters the operating mode.

4.2.1.3 Operating Mode

The primary functionality implemented in operating mode (at which time the operator screen 131 is displayed to the user) is monitoring for alarms and providing notification when they occur. Other functionality includes message and protection zone display, self-test execution, and invocation of the setup or diagnostic modes upon user command.

There are three types of messages that may be displayed on the main screen 131: notices, warnings, and alarms. Notices are issued for routine activities, including the start and end of automatic self-tests and the logging of user initiated activities, such as entering and leaving the setup or diagnostic modes. Warnings are issued when a system or component malfunction is detected, such as might occur as the result of a self-test. Alarms are issued when the activation of a PPA is detected. The system must be calibrated before alarm monitoring can occur.

Messages will scroll up the screen 131 as necessary, with the most recent message highlighted in red. Warning and alarm message displayed to the screen can also be transmitted to the FAAS 79 via an RS-232 port. (After transmission to the FAAS 79, the software waits for an acknowledgment from the FAAS 79. If one is not received within ten seconds, the message is retransmitted.) All messages are also echoed to a local printer, if one is connected to the CMPC 66, and stored in a log file on the computer, in an ASCII format.

Each message has the following format:

<Date><Time><Type><Message> where Type can be 'Note:', 'warning', or '*ALARM*'.

To detect possible system degradation, self-tests are executed automatically in operating mode. One major self-test is conducted per day at a user specified time. Since alarm monitoring is suspended for approximately 0.75 seconds during a major self-test, the time should be set accordingly. The default is 2:00 AM. Minor self-tests occur more frequently. The time interval between minor self-tests is a parameter that can be set by the user. The default is 10 minutes.

If the system has been calibrated, the software, when in the operating mode, monitors for alarm messages from the sensors in the system. The sensors transmit these messages when they detect a rise in their received signal strengths above an alarm threshold. Upon receipt of an alarm message, the CMPC 66 transmits four MARK commands with a global address. Four are sent to ensure receipt of at least one by each sensor 62, 63 and sensor relay unit 64, 65 in the system. After the MARK commands are received, the sensor relay units (SRUs) 64, 65 poll the sensors 62, 63 for signal strength readings for the duration of the alarm signal, and the CMPC 66 polls the SRUs 64, 65 for those signal strengths after the SRUs 64, 65 have collected them. The CMPC 66 then determines a best match, comparing the signal strengths to the signal strengths obtained during system calibration, and displays the best match as the location of the alarm using an alarm message. The CMPC 66 then transmits more MARK commands, collects the signal strengths again, and calculates a new position if any of the signal strengths are still above the alarm threshold of the sensors 62, 63. This continues until no sensor 62, 63 reports an alarm condition. The CMPC 66 then transmits ALL OVER commands to all the sensors 62, 63 in order to return them to normal operation.

4.2.1.4 Setup Mode

The setup mode is accessible from the PALS Setup Screen 132. Access to this screen 132 is password protected since alarm monitoring is temporarily suspended while in this mode. In setup mode, the CMPC software allows a user to add, delete, and modify lists of sensors, sensor relay units (loosely referred to as hubs), TTUs, and locations. The user is also allowed to modify self-test timing, alarm and warning volume, time and date, type of FAAS, and the administrator password. Calibration of the system is also accomplished through setup menus. Refer to Section 5.0 for a more thorough discussion of how to accomplish the various functions available under the setup mode and the use of the PALS Setup screens. The system does not automatically report alarms which occur while in the setup mode.

4.2.1.5 Diagnostics Mode

PALS diagnostics functions are provided in the PALS Diagnostics screen 135. In diagnostics mode, the CMPC software allows a user to conduct real-time interactive testing. The user may read status and data from the sensors, hubs, and TTUs at any time, with various display options. Both major and minor self-tests may be executed. Refer to the Section 5.0 for a more thorough discussion of how to accomplish the various functions available under the diagnostics mode.

4.2.2 Commercial Software

In addition to the DOS and Windows operating systems, the two commercial software packages that reside on the hard disk of the CMPC are Symantec Norton pcAnywhere, Version 5.0, a remote computing and communications utility, and TouchStone Checkit, a PC diagnostics software utility.

4.2.2.1 pcAnywhere

This remote computing utility allows remote access of one PC by another over the telephone lines. Its primary anticipated use is to allow remote access of the CMPC 66, should the need for problem identification and resolution arise.

4.2.2.2 Checkit

This diagnostic software utility contains tests for each hardware component of an IBM compatible PC. It attempts to determine the underlying cause of problem symptoms. In addition, it includes software that displays information describing the PC, its hardware components, configuration, and installed software. Benchmark software also tests the performance of the main system and the hard disk.

4.2.3 Embedded Functions

4.2.3.1 AutoDispatcher

The PALS application includes the capability such that the CMPC generates a voice message indicating the location of a received alarm. This audio message can be handled in several ways:

1) Send audio over Facility Public Address System

Used in this manner, the audio is heard by all security staff, but, most importantly by the person who activated the alarm (thus confirming that the transmission has been received) and by the potential attacker (who will likely break off the attack knowing that help is immanent).

2) Transmit Audio over Security Radio Network

In this case, the Transmitter Test Unit (TTU) is modified such that the audio message can be transmitted over the facility's existing security radio network. All security officers carrying portable radios will hear the location of the alarm—even if they are out of range of the public address system. This can reduce response time and also eliminates the requirement for continuous monitoring of the CMPC for facilities without a 24 hour dispatcher.

4.2.3.2 Dynamic Mapping

The location algorithm and operator interface are modified to significantly improve location accuracy. Accuracy has been improved particularly in outdoor areas and at border points where indoor and outdoor areas meet. The above mentioned algorithm calculates the calibration point, which best fits (based on minimum sum of signal strength differences calculated from all sensors—PSU's) the actual signal strength matrix received from an alarm transmission. Depending on a number of variables (body position, actual position relative to calibration position, proximity of nearby objects, etc.) the best fit calibration point may be outdoors when the person is actually standing in a doorway or is actually standing adjacent to a window indoors. In such instances, the reported location, although still very close, indicates that the person is outdoors when they are actually standing indoors. This limitation will occur, to varying degrees, with any technology having a finite location accuracy.

Dynamic Mapping reduces the impact of this fundamental limit. Under Dynamic Mapping, the PALS application not only calculates the single best fit calibration point, but also calculates the top N calibration points based on minimum distance (N is an integer which can be selected by the system administrator). Analysis of actual alarm data indicates that an N value of 3 to 5 is optimum. The PALS application then displays this cluster of points on the facility map. The best fit calibration point is displayed in a different color. This cluster represents the boundary within which the person is standing. The degree of compactness represents the certainty of the person's position. The clustering of these calculated points is a valuable tool to aid an operator in dispatching security teams. For example, when the cluster spans an indoor/outdoor boundary, it tells the operator to dispatch security personnel to locations on both sides of the building exterior wall.

4.2.3.1 Distant Sensor Error Truncation

One limit to the accuracy of the system is the cumulative error resulting from physically distant sensors which may respond with a signal strength reading during calibration but do not respond (i.e., do not receive a signal level sufficiently greater than the software-programmed noise floor) under actual alarm conditions. This effect occurs due to body positioning and simply due to the Gaussian distribution of receiver post-detection noise. The algorithm which performs the minimum distance calculation is modified such that sensors not responding are prevented from contributing their noise floor error to the running difference total. This modified algorithm has been shown to significantly reduce the occurrence of reported locations which do not correspond to the actual.

5.0 System Configuration

This section specifies the information that is required to configure PALS. PALS configuration is a series of steps that are taken in the Central Monitoring Post Computer (CMPC) software setup mode. Configuring PALS informs the PALS software about the types, numbers, and connectivity of hardware components that are part of the system, and how the facility has been partitioned into protection and calibration zones. This information is stored by the PALS software in binary configuration files and constitutes the PALS system data base.

The components and location zones have already been introduced in previous sections. In this section, the specific information items required to specify these components and zones for the configuration process are set out. The actual steps needed to configure the system are presented in the next section.

5.1 Sensor Relay Units

Sensor relay units may be either PSRUs or WLRUs. No distinction is made between the two types in configuring the system or its operation. Within the CMPC software, both types of sensor relay units are termed intelligent hubs, or simply hubs. Do not confuse this generic use of the term, hub, with the Hub PCP, which refers to the sensor side PCP of a sensor relay unit 64.

The information that is required for each hub is its ID, or CEBus address, and a descriptive text string. The text string can be a name, a facility location (e.g., South Hallway or Kitchen), or any other convenient word or word sequence. The CEBus address is the number entered in the 7 position DIP switch on both the Hub PCP and the Relay PCP sides of the hub. This number must be unique among all hubs, sensors, and TTUs in PALS (each has its own CEBus address). Although the same number is entered in the DIP switch of both the Hub PCP and the Relay PCP sides of the hub, internally 128 (80 hexadecimal) is added to obtain the CEBus address of the Relay PCP.

5.2 Sensors

Since sensors are organized into groups and each group is associated with a single hub, the information for sensors is entered in the CMPC setup mode by first selecting a hub (via screen 133) and then addressing each of the sensors (via screen 142) that belong to the hub's group. The information that is required for each sensor is similar to that required for a hub: its ID, or CEBus address, and a descriptive text string. The CEBus address is the number entered in the 7 position DIP switch on the sensor PCP.

5.3 Test Transmitter Units

The information that is required for each TTU is similar to that required for a hub: its ID, or CEBus address, and a descriptive text string. The CEBus address is the number entered in the 7 position DIP switch on the TTU PCP. Setup of the TTU can be accomplished via screen 134.

5.4 Protection Zones

The information that is required for each PZ is a descriptive text string and the calibration zones which belong to its group. Each PZ in the system must be associated with at least one CZ. As for a hub, the text string is for the convenience of the user. The CMPC software automatically selects a unique numerical identification for the PZ to be provided to the Senstar PIU in the event of an alarm. Access to this setup is via screen 136.

5.5 Calibration Zones

The only information that is required for each CZ is a descriptive text string for the convenience of the user. The calibration process will generate the baseline signal strength measurements that will be associated with each CZ and that are required for location identification in the event of an alarm. Access to this setup menu is via screen 136 to screen 143.

6.0 Setup, Operation and Maintenance
6.1 User Functions

The application software was developed to communicate with the distributed hardware and to provide a graphical user interface for the operator and maintenance technician to perform all necessary system operations. The application initiates upon power up of the CMPC. It immediately enters the operator screen 131 where all alarm location capabilities are supported. This screen 131 can only be exited by first entering a password. Entry of the correct password allows access to the remaining screens where all system setup, diagnostics, and maintenance functions are found.

When operating out of the system Operator Screen 131, the CMPC 66 is unable to display received alarms. Most alarms will be buffered for display and annunciation immediately upon returning to the Operator Screen 131. In the Diagnostics Screen 135, actual alarms will be reported as signal strength readings—alarms received while the CMPC 66 is in the Diagnostics Screen 135 will not be reported when returning to the Operator Screen 131. Certain functions, such as calibrating sensors, require the sensors to be reset—this operation will erase any actual alarms buffered in the sensor memory. The screens are organized according to the structure depicted in FIG. 13.

6.2 System Setup Procedure

This section presents an outline of the steps to follow in the initial setup of the system.

6.2.1 Setup Parameters

Power up the CMPC and wait for the PALS Operator Screen to initiate and all system self tests to complete. Exit this screen by clicking on the utilities icon 181 (FIG. 18A). The CMPC will query the user to enter the password. A default password is used when the system is shipped from the factory. Enter the password and access the Setup Parameters screen 138 according to the screen outline diagram shown in FIG. 13. The system defaults will appear initially (with the exception of the map file name). Where necessary, enter the deviations from the defaults according to the instructions in Section 6.3.3. When entering the map from a floppy disk, enter the path statement in the Map File line (i.e.,. "B: MAP.BMP"). When the file is copied onto the hard drive, the program will prompt the user if the file should be converted into a map file. Respond, yes. An updated version of the file will be saved with the same name but with a ".MAP" extension.

6.2.2 Enter/Draw Protection Zones

Access the Setup Protection Zones screen 136. Based on the results of the site survey, enter the list of all protection zones and their names. Then draw the outline of the protection zones according to the detailed instructions presented in Section 6.3.4 of this manual. Use the existing walls to guide the drawing of the zone outline. By holding down the shift key, only straight lines will be drawn. The outline entered for a given protection zone will be highlighted if an alarm is determined to be located in that zone.

After entering the on-site protection zones, set up the off-site protection zones using the Setup Menu item dedicated to that purpose entitled, "Modify Off-Site Site Protection Zone List." In this screen 136, the administrator enters the names of the off-site protection zones and the PPA ID's that are assigned to those locations. The ID's must be a subset of the ID range assigned in the Setup Parameters screen. Any time the system detects a particular off-site PPA ID, the system will report the location as the zone name entered in the off-site protection zone list. For this reason, it is imperative that off-site PPAs only be operated only in the off-site areas identified on the above list.

6.2.3 Enter/Position Calibration Zones

Select the desired protection zone from the Setup Protection Zones screen 136 using the up/down arrows, scroll bar, or mouse. Notice that the both the name and the outline of the selected protection zone are highlighted. For each protection zone, click on the Modify C-Zone List icon 188. This will bring up the Setup Calibration Zone screen 143. Enter the name of the desired calibration zones and position the calibration zone center point on the map as described in Section 6.3.4.1. Knowledge of these locations is critical in calibrating the system later.

6.2.4 Install Hardware and Set Unit Addresses

Set the hardware addresses for all PALS units to be installed in the network. Record these addresses along with the unit serial number and installation location. Install the units according to the site plan.

6.2.5 Enter and Position Hubs and their Addresses

Access the Setup Hubs and Sensors screen 133. Add each hub to the list and enter each hub address. Position the hub installation points on the map using the cursor function. This will speed system repair if a hub must be replaced. Refer to Section 6.3.5 for a detailed description of the Hub setup screen 133.

6.2.6 Enter and Position Sensors for each Hub and Set Sensor Addresses

The hub (PSRU) is selected in the Setup Hubs and Sensors screen 133 by moving the highlighted bar (using up/down arrows, the scroll bar, or the mouse). The sensors (PSU's) connected to that hub are entered by clicking the Sensors icon 183, which activates the Setup Sensors screen 142. The sensors connected to the elected hub can then be entered. First the sensor address is entered and then the sensor is positioned on the facility map. Section 6.3.5.1 contains a detailed description of the Setup Sensors screen 142.

6.2.7 Enter TTU Position(s) and Set Addresses

Access the Setup TTU's screen 134. Enter each TTU address and place it on the map using the cursor function. Refer to Section 6.3.6 for details on operating the Setup TTU's screen 134. System setup is now complete.

6.2.8 Run Diagnostics and Confirm Operation

Access the Diagnostics screen 135 from the PALS setup menu. Conduct each of the six tests and confirm that the appropriate response is displayed on the results screen. If errors are observed, refer to the troubleshooting guide. Section 6.3.7 presents details on operating the Diagnostics screen 135.

6.2.9 Calibrate Sensors

Access the Calibrate System screen 137. Select the desired calibration zone (using up/down arrows, the scroll bar, or the mouse) and observe that it is highlighted on both the calibration zone list and on the map. To calibrate the selected zone, click on the Calibrate Selected Zone icon 187. This brings up the screen 144 which collects and edits actual calibration data. Key up the test transmitter at ten locations in each zone, making sure to move throughout the calibration zone in the process. The signal strength readings from each sensor will be displayed on the screen 144 for each transmission. If the data is all received correctly and the range of readings from a given sensor is less than 50, save the data and move on to the next calibration zone. If data is received incorrectly, redo that calibration point by setting off another transmission. If the range is too large, redo the whole set of calibration data for that zone. If the range exceeds 50 a second time, break that calibration zone into two calibration zones and repeat. Refer to Section 6.3.8 for a detailed description of the functions found in the Calibrate Sensors screen 144.

6.2.10 Calibrate TTU

Return to the Calibrate System screen 137. Click on the TTU icon 184. This automatically activates all the TTU transmitters and calibrates the sensors for comparison against future TTU transmissions. Section 6.3.8 gives a detailed description of the functions available on this screen 137.

6.2.11 Conduct Location Accuracy Tests

Conduct rigorous accuracy tests of the system. Throughout the facility, key up the PPA transmitter from several locations in each protection zone. Record the number of alarms that are reported in the correct protection zone, the number of alarms that are off by one, and the number of alarms that are off by two or more.

6.2.12 Backup all System Files

Copy all files from the system working directory to a floppy disk. Repeat this procedure any time the system configuration is modified. Store this disk in a safe place to speed the restoration of the CMPC if the hard drive should fail.

6.3 Detailed Operation of System Screens

This section will present detailed descriptions of the functions performed by each screen. The purpose of each screen button will be defined and important notes to aid in the setup and maintenance of the system will be included.

6.3.1 Operator Screen

The primary functionality implemented in operating mode is monitoring for alarms and providing notification when they occur. Other functionality includes message display, self-test execution, and invocation of the setup mode upon user command.

There are three types of messages that may be displayed on the main screen: notices, warnings, and alarms. Notices are issued for routine activities, including the start and end of automatic self-tests and the logging of user initiated activities, such as entering and leaving the setup mode. Warnings are issued when a system or component malfunction is detected, such as might occur as the result of a self-test. Alarms are issued when the activation of a PPA is detected. The system must be calibrated before alarm monitoring can occur. Messages will scroll up the screen 131 as necessary, with the most recent message highlighted in red.

If the system is configured (see Setup Parameters) to operate with a Senstar FAAS console, warning and alarm message displayed to the screen 131 will also be transmitted to the FAAS via an RS-232 port. After transmission to the FAAS, the software waits for an acknowledgment from the FAAS. If one is not received within ten seconds, the message is retransmitted. All messages are also echoed to a local printer, if one is connected to the CMPC, and stored in a log file on the computer, in an ASCII format.

Each message has the following format:

<Date><Time><Type><Message> where Type can be 'Note', 'warning', or '*ALARM*'.

To detect possible system degradation, self-tests are executed automatically in operating mode. One major self-test is conducted per day at a user specified time. Since alarm monitoring is suspended for approximately 0.75 seconds during a major self-test, the time should be set accordingly. The default is 2:00 AM. Minor self-tests occur more frequently. The time interval between minor self-tests is a parameter that can be set by the user. The default is 10 minutes.

If the system has been calibrated, the software, when in the operating mode, monitors for alarm messages from the sensors in the system. The sensors transmit these messages when they detect a rise in their received signal strengths above an alarm threshold. NOTE: When operating out of the Operator Screen, the CMPC is unable to display received alarms. Most alarms will be buffered for display and annunciation immediately upon returning to the Operator Screen. In the Diagnostics Screen 135, actual alarms will be reported as signal strength readings—alarms received while the CMPC is in the Diagnostics Screen 135 will not be reported when returning to the Operator Screen 131. Certain functions, such as calibrating sensors, require the sensors to be reset—this operation will erase any actual alarms buffered in the sensor memory.

Normal user operation does not require the use of a keyboard. All user screen operations can be carried out using only a mouse. Therefore, a keyboard is not installed during normal operation—it is only used for system administration or maintenance operations.

Below is a description of the operation of each icon (FIGS. 18A–B) on the user screen. After the system is powered up and the system self test has been run, the status message (the header line of the message block) will display "PALS Operational." The facility map will be presented on the screen along with a list of user messages shown within the message block area. The message block presents any warning messages and alarm data. Each message contains the time, date, and, in the case of alarms, the ID of the PPA transmitter and the name of the location of the transmitter as determined by PALS. This location is also shown graphically on the map at the top of the screen if the location is on-site.

ON-SITE ALARMS are alarms whose location has been determined to be within the perimeter of the facility. On-site alarms can occur from any PPA transmitter issued to the penitentiary.

OFF-SITE ALARMS are alarms which originate from PPA transmitters which have been permanently issued for use only at specific off-site locations. The system does not attempt to calculate the position of these transmitters. It merely reports the physical location that a given PPA ID transmitter was issued for use in. No matter where that ID PPA actually is, the system will report alarms originating from that ID as having come from the off-site location that it was issued to. Therefore, it is imperative that off-site PPA transmitters are only used at their off-site locations.

Alarms are reported and acknowledged differently depending on whether they are reported as on-site or off-site alarms.

Acknowledgment of On-Site Alarms

On-site alarms are reported both as text on the message block and as a red highlighted zone on the facility map. [Note: there is a 20% chance that the alarm transmitter could actually be located in an adjacent zone. Plan your response accordingly.] The audio alarm can be silenced by pressing the bell icon 192—this does not acknowledge the alarm. If another alarm is received, the audio alert will begin again. If an alarm occurs, and the activation of a false or test transmission is not immediately confirmed, then emergency response measures must be taken. Once the response orders have been issued, acknowledge the alarm. On-site alarms can be acknowledged by clicking the mouse within the red highlighted zone on the facility map—the color of the highlight will change from red to yellow. If the color changes from red to yellow but then immediately changes back to red, then there has been more than one alarm from two or more different PPA ID transmitters in that zone. Check the message block to confirm the multiple ID's.

The yellow status of a highlighted zone indicates that the alarm has been received and acknowledged. It remains in yellow to remind the desk officer that an alarm occurred in that zone and that emergency response procedures are under way. When the "all clear" report from the response team is received, click on the yellow highlighted zone a second time and the highlight will disappear.

Acknowledgment of Off-Site Alarms

If the alarm has been received from an off-site zone, no highlight will appear on the map. Instead, the off-site alarm icon 208 will begin to flash in addition to the activation of the alarm silence icon 192 and the acoustic alarm. One possibility of an off-site alarm icon can be an arrow, for example. Examine the message block to confirm that an alarm has occurred from the off-site location. Under alarm conditions, the off-site alarm icon 208 flashes. If an off-site alarm occurs, and the activation of a false or test transmission is not immediately confirmed, then emergency response measures must be taken. Once the response orders have been issued, silence the alarm by clicking on the alarm silence icon 192. When the "all clear" report from the response team is received, click on the off-site alarm icon 208 and the icon 208 will disappear.

PALS Operator Screen Functions

Silence Alarm This icon 192 is displayed when an alarm has been received. By clicking on it, the acoustic alarm is silenced but all identified protection zones remain highlighted. The on-screen message log continues to display the PPA ID, the time, and the location of the alarm. No user commands can erase or alter the message log.

Acknowledge On-Site Alarm The actual shape and position of the acknowledge on-site alarm button will change to match the perimeter and location of the protection zone where PALS has determined the alarm to originate. The alarmed protection zone is displayed on the facility map on the CMPC screen. By clicking on it once, the acoustic alarm is silenced and the highlighted protection zone changes from red to yellow. If the color immediately changes back to red, then multiple alarms from different ID transmitters has been received in that zone. In this case, each alarm ID must be individually acknowledged. Otherwise, clicking on it a second time will cause the highlighted zone to disappear from the map. The on-screen message log continues to display the PPA ID, the time, and the location of the alarm. No user commands can erase or alter the message log.

Acknowledge Off-Site Alarm: This icon 208 flashes if an alarm has been received from an off-site zone. Clicking on it will acknowledge the occurrence of the most recent alarm which has been determined to originate from locations outside of the facility perimeter. More information on off-site alarms is provided below.

Enter Setup Mode No icon is presented to prompt the user to enter the Setup Mode because this is not a user function. The Setup Mode is intended for the system administrator and maintenance staff only. From the Operator Screen 131, the administrator simply types in the password as defined in the Edit System Parameters Screen 138. When the last character of the password is entered, the system automatically enters the Setup Mode. Password protection is required because exiting the Operator Screen 131 will temporarily suspend alarm monitoring. Only authorized system administrators or maintenance technicians should proceed with this operation.

6.3.2 Setup Menu

The Setup Menu allows the user to access any one of ten remaining system screens. All of these screens permit the user to make changes to the system setup, configuration, and calibration or to exit the application. It is very important that the maintenance technician makes sure that all system data has been backed up before proceeding beyond the Setup Menu. No further passwords are required to access the remaining screens. The available screens as presented in the software organization chart will be listed below.

6.3.3 Edit System Parameters

The system parameters screen contains many of the system defaults which govern the way the system accepts and reports PPA alarms, the way the system communicates with the user (sounds, display type), the automated self-test cycles, and the system sensitivity to communication errors. The names of the map files are entered here as well. Some functions, such as the hardware port settings, will be set during installation and should never be changed again unless there is a major reconfiguration of the CMPC.

Mode: Stand Alone

Senstar

Testing

The user can toggle the mode entry between these three states using the mouse. "Stand Alone" defines the mode of operation where the CMPC both determines the PPA location and provides the operator interface (map display, alarms . . . ). "Senstar" chooses the Senstar FAAS console as the operator interface for map display and alarm reporting. In this mode, the CMPC calculates the position and sends this information to the FAAS for processing. "Testing" is an undocumented diagnostic mode where the maintenance technician can generate random alarms for testing and development.

Major Self-Test:

The user is presented with the major self-test time in the form hh:mm. The factory default time is 02:00 AM. As with the system time and date (see Time and Date, above), the hours or minutes of the test can be changed by clicking on either field, then using the up and down arrow keys on the keyboard to modify the values.

Minor Self-Test:

The user is first presented with the minor self-test time interval, in minutes. The factory default is 10 minutes. As with the system time and date (see Time and Date, above), the minutes between tests can be changed by clicking on the field, then using the up and down arrow keys on the keyboard to modify the value.

Alarm Sound:

The system administrator can disable the PALS acoustic alarm indicator by toggling this selection from ON to OFF.

Warning Sound:

The system administrator can disable the PALS acoustic warning indicator by toggling this selection from ON to OFF. The warning tone is distinguishable from the alarm tone in that it is single frequency.

Language:

The system administrator can toggle between various international languages for the user screens, prompts and status messages.

Archive Drive

This field allows the user to identify the drive to which to write archive log files. The field can be "N/A" to specify that no archiving should be done, or "A:" to "Z:" as drive identifiers. As with the system time and date (see Time and Date, above), the archive drive can be changed by clicking on the field, then using the up and down arrow keys on the keyboard to modify the value. Note that if the archive drive is set to "N/A", then the Archive Days field (see below) will also be N/A.

Archive Days

This field allows the user to specify the number of days for which archive log data should be kept. This field will be "N/A" if the Archive Drive field (see above) is "N/A", or it can be any number from 1 to 999. As with the system time and date (see Time and Date, above), the archive days can be changed by clicking on the field, then using the up and down arrow keys on the keyboard to modify the value.

TTU Sensor Drift:

PALS will report a warning if any sensor reports a signal strength reading (in response to a TTU transmission) which differs from its calibrated level by more than this amount. The default level is 20.

TTU Total Drift:

PALS will report a warning if the cumulative reported signal strength readings (in response to a TTU transmission) differ from their calibrated level by more than this amount. The default level is 100.

Low Signal Strength:

The low signal strength applies to the case where only one sensor reports an alarm. This event typically only occurs due to radio frequency interference or a PPA activation from outside the facility. Sensor signal strengths must increase beyond this threshold before an alarm is reported. For example, if an intermittent source of interference was causing false alarms, this could be used to eliminate the problem. Consult the factory before making any adjustment.

Min. Comm. Errors:

If the CMPC has to perform more than this number of packet retries before successfully communicating with a hub or sensor, a failure-to-communicate warning message occurs.

Min. Sensor Errors:

An error message is displayed on the user screen (system unstable) if this number of sensors fail to respond to a single self-test or a single sensor fails consecutively on this many self-tests.

Min. Hub Errors:

An error message is produced to the user (system unstable) if this number of hubs fail to respond to a single self-test or a single hub fails consecutively on this many self-tests.

Map File:

This file name defines the source of the bit map image containing the facility map.

Hardware Port Settings:

| DEFAULT SETTINGS | | |
|---|---|---|
| Ports | IRQ | Addr. |
| FAAS | N/A | N/A |
| MPIU | 4 | 03F8 |
| PPA RX | 6 | 0320 |
| Printer | — | 0378 |

6.3.4 Setup Protection/Calibration Zones

In this screen, the system administrator can enter the list of all protection zones and their names and access the Setup Calibration Zone screen 136. The user can draw the outline of the protection zones according to the results of the site survey. Use the existing walls to guide the drawing of the zone outline. By holding down the shift key, only straight lines will be drawn. To complete the drawing of a given zone, the beginning and ending points must match within four pixels—the user must be careful to enclose the complete protection zone area (selecting a higher level of map zoom helps in this process). The outline entered for a given protection zone will be highlighted under alarm conditions if PALS determines that the PPA transmission originated from that zone.

It is important to understand the relationship between the Setup Protection Zones 136 and Setup Calibration Zones screens 143. When the user enters the Setup Calibration Zones screen 143 and adds/modifies calibration zone information, this data applies to the calibration zones which lie within the protection zone which was selected when the Setup Protection Zones was last exited.

Redraw Selected Protection Zone. This function allows the system administrator to modify the drawing of a given protection zone. It can be used if an area of the facility is modified or if the user was unsatisfied with the prior results of drawing a zone. Select the zone to be redrawn from the on-screen list. Click on the Redraw icon 186. The program generates a prompt confirming that you wish to redraw the selected zone—answer YES. You can now completely redraw the zone. NOTE: If you have already placed the calibration points within this protection zone, and the outline of the zone changes significantly, you must reposition the calibration points in the Setup Calibration Zones screen (and, under some conditions, recalibrate those points).

Modify C-Zone List. This icon 189 brings up the Setup Calibration Zones screen 143. It allows the system administrator to add or modify the calibration zones within the protection zone selected under the Setup Protection Zones screen 136.

6.3.4.1 Setup Calibration Zones

This screen 143 allows the user to add or modify the names and placement of calibration Zones. Before accessing this screen 143, select the desired protection zone from the Setup Protection Zones screen 136 using the up/down arrows, scroll bar, or mouse. Notice that the both the name and the outline of the selected protection zone are highlighted. For each protection zone, click on the Modify C-Zone List icon 189. This will bring up the Setup Calibration Zone screen 143. Enter the name of the desired calibration zones and position the calibration zone center point on the map. Knowledge of these locations is critical in calibrating the system later.

Move Selected Cal Zone. This icon 190 allows the system administrator to reposition calibration zones. Simply highlight the calibration zone to be moved and click on this icon 190. The program will prompt you to confirm that you actually desire to move the zone—answer, YES.

Move C-Zone to New P-Zone. Following calibration and test of the PALS system, the user occasionally needs to rearrange the grouping of calibration zones. This is generally caused by the presence of some large metallic structure which causes large, localized changes in the RF propagation characteristics of the facility. Regrouping is accomplished by moving a calibration zone to a new protection zone. By pressing this icon 190, the PALS application brings up a subscreen which prompts the user to select the new protection zone number which the calibration zone should be moved to. Click on the check icon 191 to accept the change or click on the X icon 200 to reject it. Make sure to physically move the location of the displayed calibration zone to the new protection zone as well.

6.3.5 Setup Hubs and Sensors

The purpose of this screen 133 is to setup the database of hubs (PSRU's) and sensors (PSU's). This database includes the number of hubs and their corresponding sensors, the hardware addresses and position of all hardware within the facility. This position information aids in locating hardware if repair or modification is necessary. The hub information is entered from the Setup Hubs and Sensors screen 133. To enter the sensor information for a given hub, select the desired hub from the on-screen list and click on the Sensors icon 183. This action will bring up the Setup Sensors screen 142.

6.3.5.1 Setup Sensors

This screen 142 allows the user enter or to modify the addresses and locations of the sensors connected to a given hub. Setup Sensors is accessed by clicking on the SENSORS icon 183 found in the Setup Hubs and Sensors screen 133. The hub to which the sensors are connected is configured in the Setup Hubs and Sensors screen 142.

Move Selected Hub or Sensor. This icon 198 allows the system administrator to reposition installed hardware. Simply highlight the hub or sensor to be moved and click on this icon 198. The program will prompt you to confirm that you actually desire to move the unit—answer, YES.

6.3.6 Setup TTU's

This screen 134 allows the system administrator to configure the Transmitter Test Units (TTU). The TTUs' hardware addresses are set and the positions of the TTU's within the facility are recorded. Most facilities will require only a single TTU, but where additional units are required, they can be added here. The Setup TTU's screen is accessed by clicking on the TTU icon 184 in the PALS Setup Menu screen 132.

Move Selected TTU. This icon 198 allows the system administrator to reposition installed hardware. Simply highlight the TTU to be moved and click on this icon 198. The program will prompt you to confirm that you actually desire to move the unit—answer, YES.

6.3.7 Enter Diagnostics

This screen 135 allows the system administrator to conduct various hardware and software diagnostics. The diagnostics confirm correct operation of PALS following initial installation and to aid in locating system faults. Actual PPA alarms which occur while the CMPC is in the diagnostics mode will cause the system to display the received signal strength data. No location determination will take place. Therefore, other security procedures need to be put in place while operating diagnostics.

The Diagnostics screen contains a results window which displays the results of each diagnostic test. Carefully review the messages displayed here following each test.

Major Self-Test. The major self-test is used to make sure the system is running within tolerances of calibration. This operational mode will automatically test the system by measuring battery voltages and by turning on the various TTU's and comparing the PSU responses to previous responses by the system. Large changes in response data will cause the CMPC to output a warning. This test will not execute if an alarm has occurred within the previous hour in order to keep the system free from communications traffic during critical periods.

First, the CMPC will request a battery test of every unit equipped with a battery and will report the results as bad or marginal units. The TTU's in the system will be turned on, one at a time, and the PSU signal strength readings will be compared with the baseline set of Major self-test readings taken during calibration of the system. If any PSU reading is off by more than a value specified in Edit System Parameters (see Section 6.2.1), a warning will be issued via the Send Warning function.

Minor Self-Test. This operational mode will automatically check for various problems with the system, asking each PSU, PSRU, WLSU, WLRU and TTU, and the MPIU, to report its status. Any anomalies will cause the CMPC to output a warning. These tests will not execute if an alarm has occurred within the previous fifteen minutes, in order to keep the system free from communications traffic during critical periods.

This module is used to do a simple test of the integrity of the system. It will use the Send Packet function to request the status of each and every unit, in turn. If a unit returns a packet that indicates that it has detected a problem with itself during self-test, a message will be displayed, giving as much detail about the problem as possible. If a unit fails to reply to the status request within one second, a message will be sent saying that the unit is not responding.

A note about units that fail to respond: Users should be aware that there are several different, well-defined scenarios that can occur with non-responding units. (1) a single unit fails to respond—something about that unit has failed, or communications with it are incredibly bad. (2) two units (possibly more) fail to respond, or respond so badly that the software fails to find a valid packet—either both have failed coincidentally, or (more likely) they have accidentally been set to the same address, and all their messages are colliding on the CE-Bus. (3) several units fail to respond—if they all communicate to the CMPC through the same PSRU, then that PSRU is probably bad, otherwise, see #2, above. (4) all units fail to respond—this is most likely caused by the MPIU failing, and so no packets are ever transmitted to the units. After checking every unit, this module will then return execution to normal operation.

Battery Test. This test is a subset of the major self-test. During the battery test, the CMPC commands every hub and sensor to place a resistive load across the battery backup module. The embedded processor then measures the loaded voltage. If the battery fails to support the programmed minimum voltage, a battery warning message is produced for that unit.

TTU Test. This test is a subset of the major self-test. The first TTU will be told to broadcast a 120-ms signal. The CMPC will then wait for ALARM messages. The CMPC will gather the signal strengths as it does during a 'real' alarm, and compared them to the data stored for that TTU as the baseline. If the absolute value of the difference for a single PSU is greater than the setup file parameter, the warning will be sent. When all PSUs have been read, the total of the differences will be compared to another setup parameter, and if the total is greater than that value, a warning will be issued, since total PSU drift is just as dangerous to the system as individual drift. Then the code will turn the next TTU on. The process loops from there. When all the TTUs have been activated, the code will return to normal operations.

Communications Test The CMPC will send communications check requests to determine if all the wired and wireless hubs can communicate with their sensors.

"Flipper" Communications Utility. This icon 206 starts the communications utility called, "Flipper." Flipper presents real time communications reliability statistics for all sensors and hubs in the system and is an extremely valuable tool for troubleshooting communications problems with individual PALS hardware modules.

6.3.8 Calibrate System (Select Calibration Zones)

This setup 137 function allows the user to calibrate the system. After making sure, by resetting and sending clocks to all units in the system, that the system is okay, the user will be presented with the list of all calibration zones, and prompted to select one to calibrate. By clicking on the Calibrate Selected Zone, the user moves to the Collect/Edit Calibration data screen 144. Otherwise, clicking on the EXIT icon 182 will send the user back to the Setup menu 132. The user may also create baseline readings for later TTU tests (Major Self tests) by clicking on the TTU icon 184.

Calibrate TTU's. Selecting this icon 187 will activate the TTU transmitter(s). The CMPC will collect and store the signal strength readings from all sensors installed in the system. These stored values will be compared with the data generated during subsequent TTU tests. To the extent that the test results deviate from the expected stored values, a warning message will be presented.

Calibrate Selected Zone. Selecting this icon 187 will transfer the system to the collect/edit calibration data mode. Calibration data will be collected for the zone selected in the Calibrate System screen 137.

6.3.8.1 Collect/Edit Calibration Data

Once a calibration zone has been selected, the user will be shown a blank calibration screen 137, with space for up to ten calibration samples. The CMPC will begin to wait for ALARM messages. When an alarm is generated by someone with a PPA in the physical location of the calibration zone, the CMPC will gather alarm signal strengths as during a normal alarm. But the CMPC, rather than trying to calculate the location of the alarm, will instead store those values temporarily, display them in one of the blank spaces, and also update an average value for each PSU and WLSU, and a range value, both displayed on the screen. Up to ten sample alarms may be used to calibrate a location. By clicking on the check icon 191, the user can accept the values displayed on the screen, and the averages will be stored as the calibration data for that zone. The user may press the recycle icon 197 to reject the data, and start over on the zone (clearing all ten samples).

Accept/Save Data. Click on this icon 191 once the data has been collected and reviewed. This must be done before exiting or the new data collected will not be saved. If the user exits before saving, the old data will be maintained.

Delete Selected Data Point. If a given data point was corrupted due to communication errors or PPA malfunction it can be deleted using this function. Select the data point to be deleted by clicking on the data point number column heading (1–10). Click on the delete icon 197 and recollect the sensor data for that point.

Delete All Samples. If the user wishes to clear all new data collected, click on this icon 199. Exiting at this point will save the old data. If one clicks on the Accept icon 191 after deleting all samples, the old data will be purged. New data can be collected at any time after deleting all samples. Make sure to save new data before exiting.

6.3.9 Modify Off-Site Protection Zone List

After entering the on-site protection zones, set up the off-site protection zones using the PALS Setup Menu item dedicated to that purpose entitled, "Modify Off-Site Protection Zone List." In this screen 140, the administrator enters the names of the off-site protection zones and the PPA ID's that are assigned to those locations. The ID's must be a subset of the ID range assigned in the Setup Parameters screen. Any time the system detects a particular off-site PPA ID, PALS will report the location as the zone name entered in the off-site protection zone list. For this reason, it is imperative that off-site PPAs only be operated only in the off-site areas identified on the above list.

Example of Application of PALS

Figure 12:
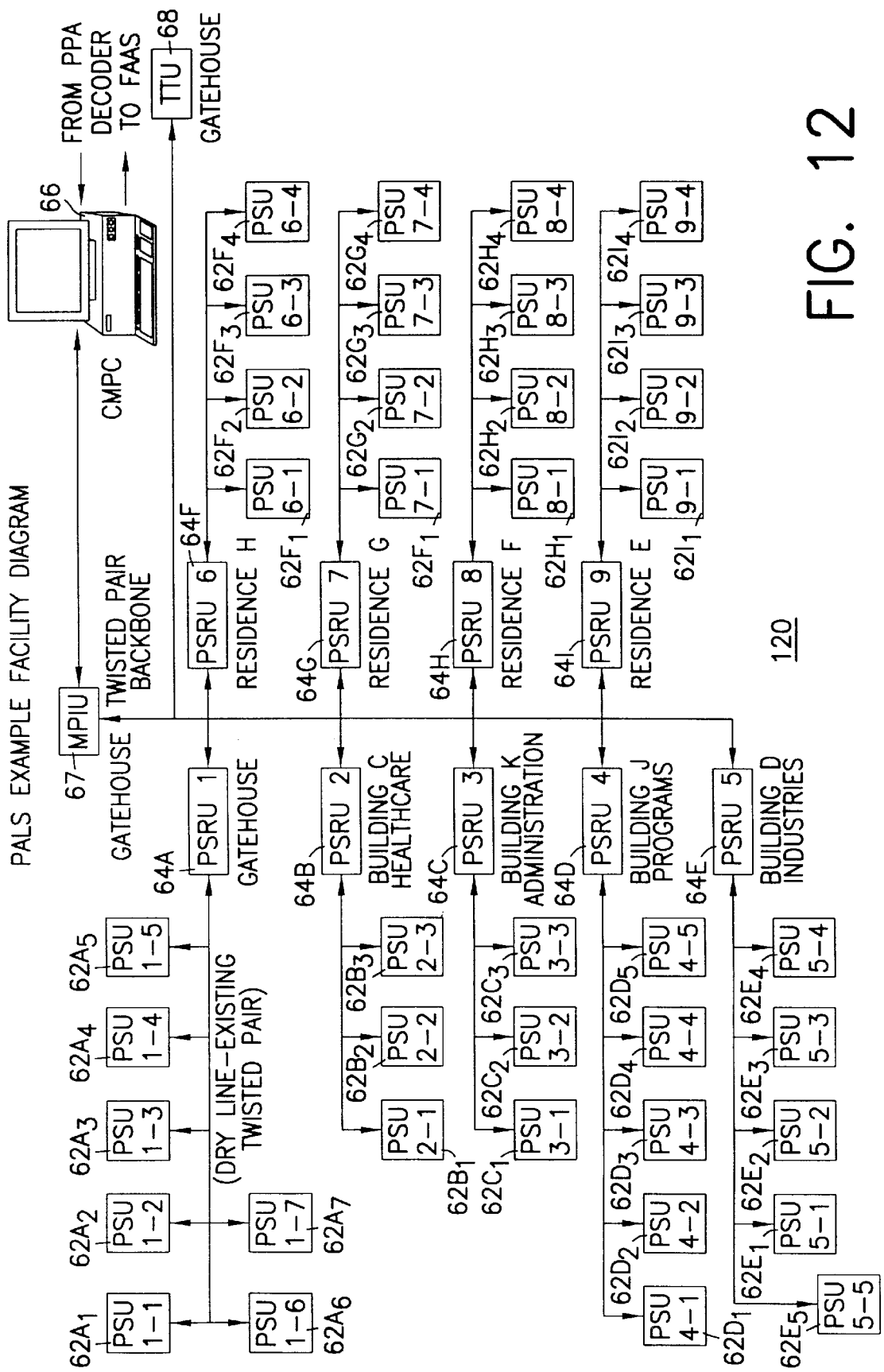
FIG. 12 depicts another embodiment of the PALS according to the present invention.

FIG. 12 depicts one example of an application of the present invention. In this example, the PALS is used to track corrections officers in a prison facility. Each of the officers carries a portable alarm, which when activated transmits a signal that can be detected by the sensors 62.

Seven sensors 62$a_{1-7}$ and relay unit 64$a$ are coupled to one power line. The relay 64$a$ is located in a gatehouse. One sensor is located in each of seven buildings. Next, three sensors 62$b_{1-3}$ and a relay unit 64$b$ are connected to the powerline feeding the healthcare building. Three more sensors 62$c_{1-3}$ and a relay unit 64$c$ are connected to the powerline feeding the administration building. Five additional sensors 62$d_{1-5}$ and a relay unit 64$d$ are connected to the powerline feeding the J programs building. Five sensors 62$e_{1-5}$ and a relay unit 64$e$ are connected to the powerline feeding the D industries building. Four sensors 62$f_{1-4}$ and a relay unit 64$f$ are connected to the powerline feeding residence H. Four sensors 62$g_{1-4}$ and a relay unit 64$g$ are connected to the powerline feeding residence G. Four sensors 62$h_{1-4}$ and a relay unit 64$h$ are connected to the powerline feeding residence F. Next, four sensors 62$i_{1-4}$ and a relay unit 64$i$ are connected to the powerline feeding residence E.

The relay units 64$a$–$i$ are connected to the interface unit 67 via twisted pair backbone. The interface unit 67 is then connected to the central computer 66, which has inputs/outputs to the PPA decoder and the FAAS.

The TTU 68 is located in a gatehouse and is coupled to the interface unit 67 via the backbone. Thus, the present invention has applications to indoor facilities, such as prisons, as well as outdoor facilities, such as university and school campuses.

Micropower Identification Transponder

According to the present invention, the system accuracy can be enhanced in wooden structures and at indoor/outdoor boundaries by adding a micropower identification transponder circuit to the existing personal alarm transmitter. This device operates from its own multi-year battery and therefore provides a simple, inexpensive upgrade to an existing personal alarm. Its purpose is to reradiate and modulate a portion of an incident interrogation signal such that interrogators placed at strategic points in a facility can detect when a given identification transponder has passed. This identification information is transmitted over existing facility wiring using the PCP assembly to be processed by the existing PALS location application.

According to the present invention, the micropower identification (ID) transponder 140 can be used as the alarm generator. In this case, the transponder 140 modulates and reflects a portion of an incoming RF wavefront. The enabling feature is that this device does not generate any of the power used to produce the outgoing RF signal—it merely modulates and reflects this incoming wavefront to dramatically reduce the necessary current drain to operate such a device. The modulation contains the unique ID of the micropower transponder. The power consumption of the transponder is only that required to generate the ID sequence and that of a voltage-controlled subcarrier oscillator . Further reductions in average power consumption will be implemented by enabling the ID code generator and oscillator only when the device is illuminated by an incoming RF interrogation signal.

Figure 14:
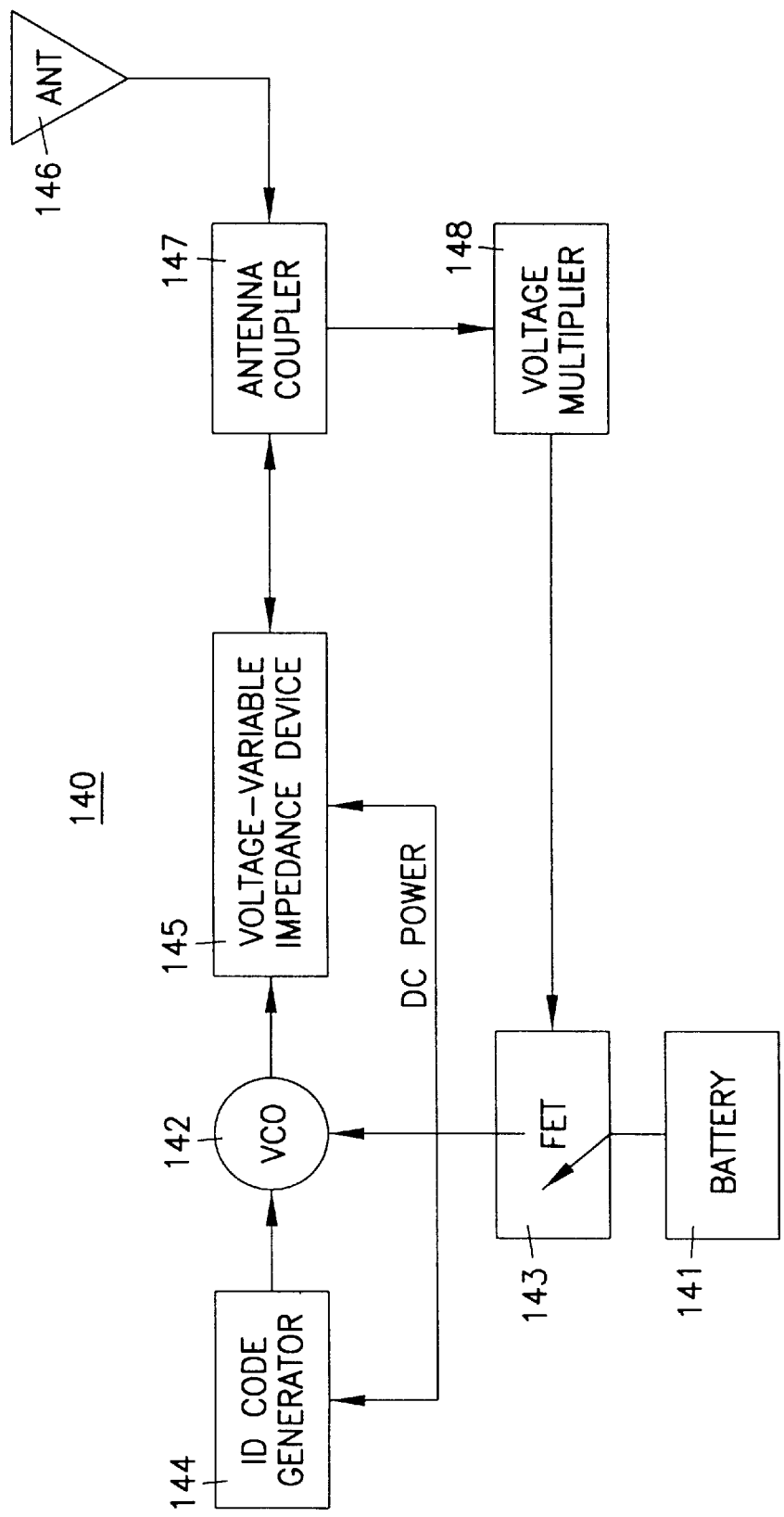
FIG. 14 depicts one embodiment of a micropower identification transponder according to the present invention.

Referring to FIG. 14, a battery 141 is coupled to the rest of the transponder by a switch 143 controlled by the interrogation signal. Only when the transponder is interrogated will the battery 141 supply power. An identification code generator 144 powered by the battery 141 outputs a code to a voltage controlled oscillator 142, which outputs an analog signal to a voltage-variable impedance device 145, which modulates the analog signal on the incoming RF signal. The modulated signal is reflected back out the antenna 146 via antenna coupler 147. Voltage multiplier 148 is used to control the switch 143.

The interrogator 150 in this case is a CW, monostatic, homodyne radar which emits a CW RF signal at the micropower ID transponder's center frequency. The modulated, reflected signal from the micropower ID transponder 140 is received by the radar (using a common transmit and receive antenna—or monostatic) and downconverts this signal using the outgoing RF signal as the local oscillator (homodyne). The resulting signal is the transponder's subcarrier signal which itself has been frequency modulated with the ID of the transponder. In this manner, the ID is extracted.

Figure 15:
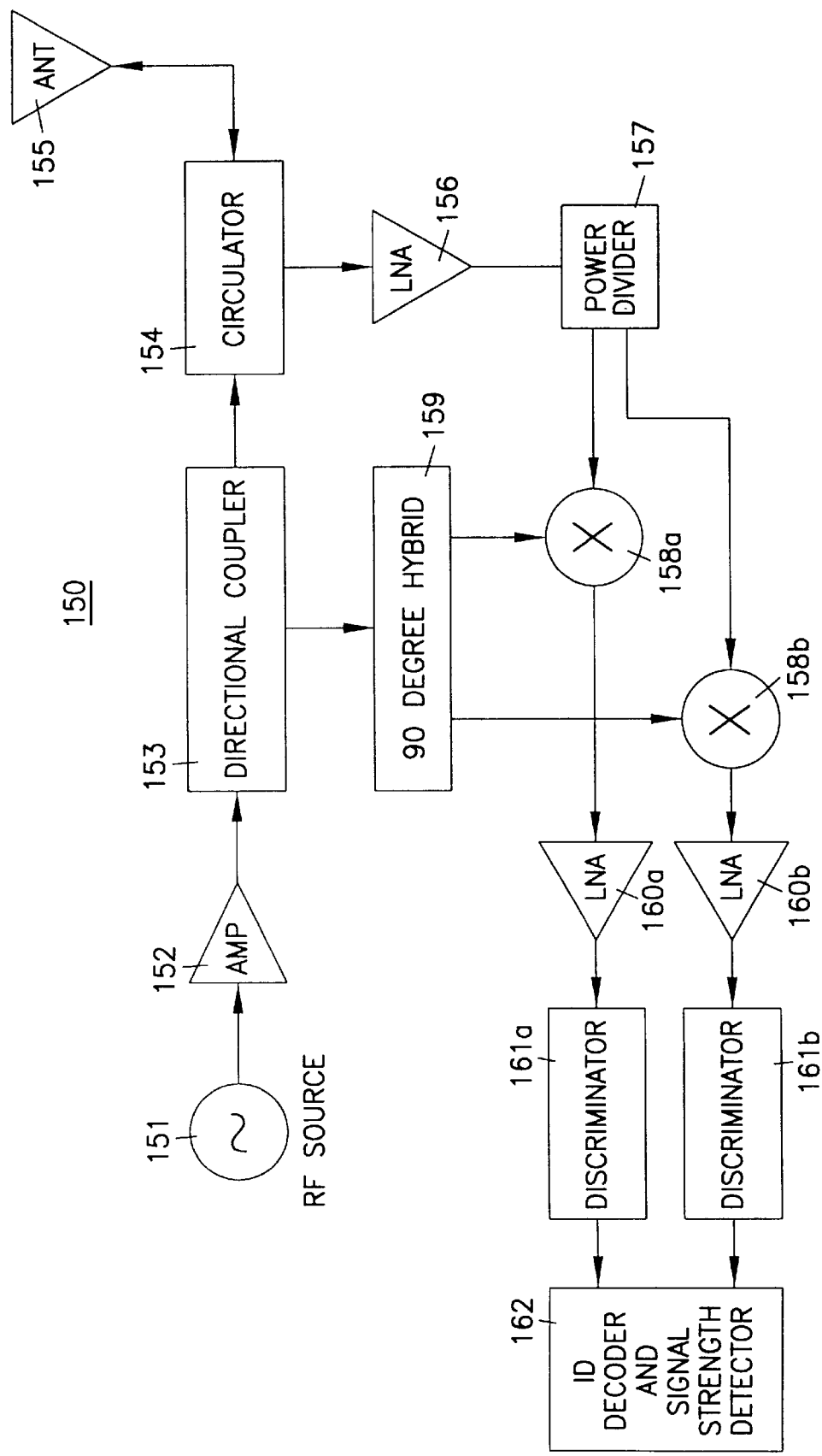
FIG. 15 depicts one embodiment of an interrogator according to the present invention.

Referring to FIG. 15, RF generator 151 outputs an RF signal which is amplified 152 and passed to a directional coupler 153, a circulator 154 and out the antenna 155. The incoming signal received by the antenna 155 is passed back to the circulator 154 and into a low noise amplifier 156. A power divider 157 creates two identical signal, which are fed into two mixers 158a, 158b, and are mixed with the original signal, which is output by the 90 degree hybrid 159, which creates the original signal and its 90 degree version. The outputs of the mixers 158a, 158b, are amplified by LNA's 160a, 160b, passed to a discriminator 161a, 161b and decoded by decoder 162. The decoder 162 also detects the signal strength of the received signal.

The low power and small size of the transponders allows multi-year life from extremely small batteries. The transponder can then be attached to or integrated with other devices (personal alarms, merchandise, ID badges, etc.) which are likely to be carried or body-worn. For personnel-location applications, the interrogators are positioned at key locations where personnel must pass (building entrances, stairwells, etc.). The interrogator monitors the ID of transponders passing through its illumination area and relays this information using power-line or RF communications links back to a central computer. Key to this location isolation is the fact that the radar communication path is characterized by radar returns which decline as $I/R^4$ where R is the distance between the transponder and interrogator antennas as opposed to $1/R^2$ when signals propagate directly from a transmitter to a receiver. This permits much more accurate discrimination of distance when using signal strength or signal presence to calculate position.

Operation of Micropower ID Transponder

The interrogator signal at frequency $f_c$ is collected by the transponder antenna 146. A portion of this signal is absorbed in the antenna termination impedance 145 and the remaining energy is reflected and is re-radiated into space. It is this re-radiated signal that the interrogator 150 receives and demodulates to yield the desired ID code. By varying the termination impedance 145 of the transponder antenna 146, the amplitude and frequency of the reflected/re-radiated signal can be modulated. It is in this manner that the ID code information is placed on the re-radiated signal.

The ID code serial sequence frequency modulates a voltage controlled oscillator (VCO) 142 operating at a subcarrier frequency, $f_s$. The ID information is contained in the zero crossings of the subcarrier waveform. This modulated waveform then modulates the antenna's termination impedance 145 to cause a re-radiation of the interrogation signal. By using a subcarrier, the re-radiated signal is translated in frequency from the interrogation carrier by an amount equal to the subcarrier frequency. The desired ID information is therefore contained in modulation sidebands at frequencies of $f_c \pm f_s$. The result is that the modulation sidebands are separated from the original interrogation carrier. This is a benefit because the spectrum of the original interrogation carrier is unavoidably corrupted by noise (so called, "1/f noise" because its amplitude decreases as 1/f near the carrier where f is the frequency of separation from the carrier)—this noise level determines the sensitivity of the interrogator receiver. By translating the modulation sidebands away from the carrier, the interrogator sensitivity is improved and the operating range can be increased.

The purpose of the voltage multiplier 148 is to detect the presence of an interrogation signal (i.e., the ID transponder 140 has moved into the illumination area of the interrogator 150). The voltage multiplier 148 generates a DC voltage proportional to the level of the received interrogator carrier. When the level is sufficiently high, the DC voltage increases to the point of biasing a FET 143 on to apply the battery voltage to the ID code generator 144, VCO 142, and modulatable impedance device 145. In this manner, these three devices only consume battery power when it its needed—when the ID transponder is located in the illumination area of the interrogator 150. This approach dramatically reduces average power consumption and allows multi-year battery lives in very small volume housings.

Battery-Free Personal Alarm Transmitter

The personal alarm transmitter carried by personnel according to the present invention is a low power device (under 100 mW) which only consumes power for a very short period (approximately 120 mS) when it is activated by the individual wearing the device. Typically, the wearer presses a button or removes a pull-pin from the device to activate it. The physical action of pressing the button or extracting the pull-pin is used to generate sufficient electrical power to operate the personal alarm transmitter for the short period that it must transmit.

According to the present invention, two types of generators are of particular interest:

1. Piezoelectric (as in a gas grill or butane lighter igniter) (FIG. 16)
2. Electromechanical (a magnet moving withing a coil— or solenoid) (FIG. 17)

The primary interest in this technique is the elimination of batteries from the personal alarm transmitter. Batteries are prone to failure and discharge over time. This electromechanical generator will enhance reliability, increase product life, reduce maintenance and improve the safety of the individual carrying the personal alarm transmitter. Implementation will require the development of a reliable activation device, energy storage circuitry, and an improve voltage regulator.

Figure 16:
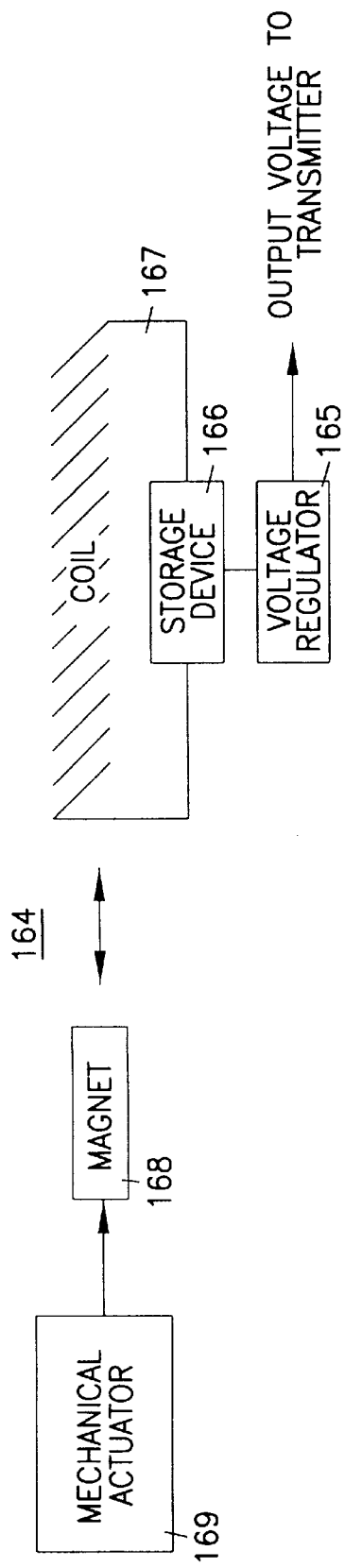
FIG. 16 depicts an embodiment of a mechanically-actuated transponder according to the present invention.

FIG. 16 depicts the electro-mechanically actuated transmitter 164 according to the present invention. A mechanical actuator 169 is coupled to a magnet 168, which moves in a coil 167. A storage device 166 stores the generated energy and outputs it to a voltage regulator 165, which outputs the voltage to the transmitter.

Figure 17:
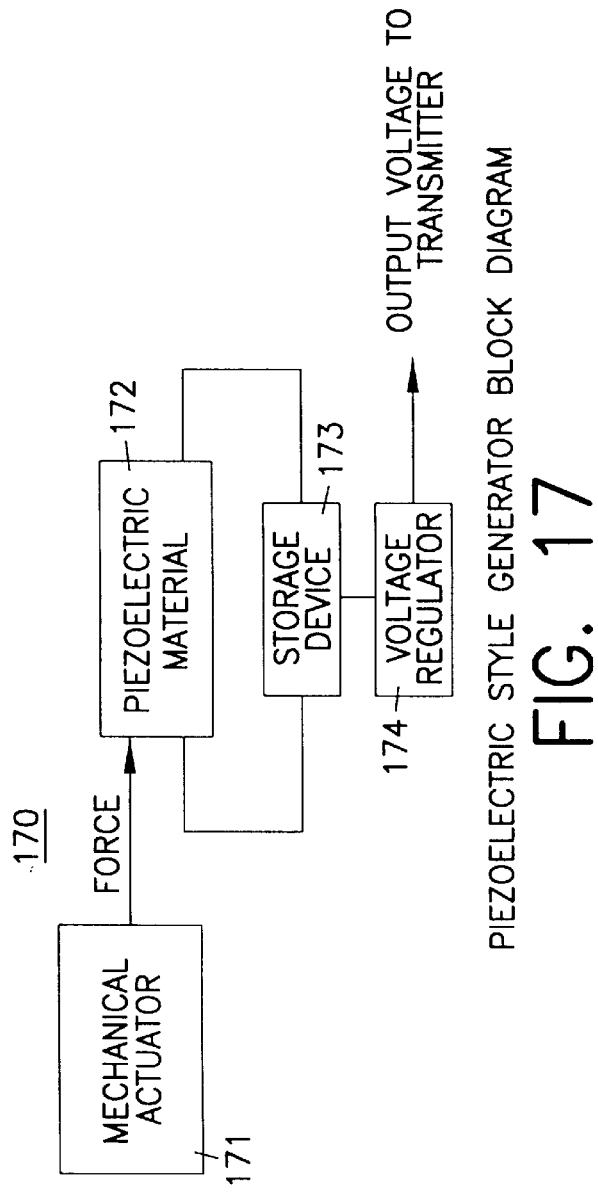
FIG. 17 depicts an embodiment of another mechanically-actuated transponder according to the present invention.

FIG. 17 depicts the piezoelectric actuated transmitter 170 according to the present invention. A mechanical actuator (switch, button, pull-up, etc.) exerts a force on the piezoelectric material 172, which passes a current through the storage device 173. Voltage regulator 174 controls the output voltage to the transmitter.

It should be understood that while several commercially available products are recited herein as used with, or interface to parts of the present invention, these products are not the only ones capable of performing these functions. Other equivalent products can be used to perform the same or similar function, as would be apparent to one of skill in the art.

Appendix A

Senstar 100/PALS Implementation of Starcom Protocol V2.0

1.0 Introduction

The Senstar 100/PALS Protocol adheres to the existing driver used by Senstar 100 V3.3 systems, for example. The protocol is discussed in the SENSTAR Starcom Communications Protocol Version 2.0 document dated Mar. 25, 1994 and the V3.3 implementation presented in its Appendix A. The Senstar 100/PALS Protocol conforms to that Appendix A unless otherwise noted. The Personal Alarm Location System (PALS) functions as a Senstar Device with up to 1008 INPUT POINTs and no OUTPUT POINTs. PALS is made up of a number of hardware Modules and many Personal Portable Alarm (PPA) Location zones. Each of these Modules and Locations is a unique Starcom POINT. PALS communicates with the Senstar 100 via a RS232 port. The transmission format is:

9600 baud 8 data bits no parity 1 start bit 1 stop bit 2.0 Implementation Details 2.1 Supported Messages

| Message Type | | Message Flow | |
|---|---|---|---|
| Value | Name | Senstar 100 | PALS |
| 00 | Reset | Send | Receive |
| 02 | Set Point | Both | Both |
| 03 | Alarm Status Request | Send | Receive |
|  | Alarm Status Value | Both | Both |
| 04 | Hardware Status Request | Send | Receive |
|  | Hardware Status Value | Receive | Send |
| 05 | Date/time Request | Receive | Send |
|  | Date/time Value | Send | Receive |
| 06 | Data Logger Text | Receive | Send |

For the ALARM STATUS VALUE message, Senstar 100 only receives Detection Alarm and Tamper Alarm messages and only transmits Detection Alarm messages. A Detection Alarm message from a PALS Location POINT indicates a PPA signal has been detected at that location. A Detection Alarm message from a PALS Module POINT indicates a mission critical hardware problem. Whereas, a Tamper Alarm from a PALS Module is a warning that a problem exists which may limit the usefulness of the system. Details of Module related alarms are reported in DATA LOGGER TEXT messages.

2.2 Input Point Capacity and Messaging

Starcom POINT 0 through POINT 129 are reserved for PALS Modules. The remaining 878 POINTs are reserved for Alarm Locations and are reported as Starcom POINT 130 through POINT 1007.

Senstar 100 is informed of the status (Detection/Tamper, or no alarm) of a PALS Input POINT when it receives an ALARM STATUS VALUE message from PALS. PALS sends the ALARM STATUS VALUE message to Senstar 100 whenever there is a PPA alarm, a change in status to one of its modules or in response to an ALARM STATUS REQUEST message from Senstar 100. All ALARM STATUS REQUEST messages are acknowledged and an ALARM STATUS VALUE is returned to Senstar 100. PALS returns the No Alarm value (0) for non-existent Modules and all Locations.

2.3 Output Point Capacity and Messaging

Senstar 100 can support a maximum of 512 OUTPUT POINTs per Starcom device, but PALS does not have OUTPUT POINTs. PALS acknowledges all ALARM STATUS VALUE messages.

2.4 ACK/NAK Processing

Senstar 100 will acknowledge a message from PALS when the entire message is correctly received. It does this by sending a DLE ACK to PALS.

If the message from PALS is incorrect, as determined by the message checksum (CKSUM), Senstar 100 will reject the message, clear its input buffer, and ask for a re-transmission of the message by sending a DLE NAK to PALS.

When Senstar 100 transmits a message to PALS, PALS responds with either a DLE ACK or DLE NAK. If the response from PALS is a DLE ACK, Senstar 100 will go on to the next message. If the response from PALS is a DLE NAK, the Senstar 100 will re-transmit the current message. If Senstar 100 is unsuccessful in transmitting the current message after 5 attempts, it will discard the current message and go on to the next message.

2.5 Status Auditing

As a background audit Senstar 100 will request the status of all configured PALS Input POINTs (ALARM STATUS REQUEST message), send the status of all configured PALS Output POINTs (ALARM STATUS VALUE message), and request the hardware status of PALS (HARDWARE STATUS REQUEST message).

The auditing is done one POINT at a time, in sequential order, at regular intervals. The Input POINT Status Request and the Output POINT Status Value for the same POINT number are send together if both POINTs are available. For example, if there is an Input POINT 80 and an Output POINT 80, then the ALARM STATUS REQUEST for Input POINT 80 and the ALARM STATUS VALUE for Output POINT 80 are sent one after the other in the same time interval.

The rate at which these audit messages are sent is determined by the Senstar 100 time-out period set for PALS. These messages are sent 4 times at regular intervals within the time-period. For example, if PALS time-out period is set to 40 seconds, a STATUS REQUEST and/or STATUS VALUE message(s) will be sent every 10 second. If a time-out period for PALS has not been set in Senstar 100, i.e. a time-out period of 0, then the audit messages will by sent every 5 seconds.

2.6 Communication Link Fail Processing

If a PALS time-out period has not been set in the Senstar 100, Senstar 100 will not detect and process Starcom communication fail alarms.

If a PALS time-out period is set in the Senstar 100, it will monitor incoming messages from PALS to detect the loss of communications. If the Senstar 100 does not receive any message (ALARM STATUS VALUE, HARDWARE STATUS VALUE, DATE/TIME REQUEST, OR DATA LOGGER TEXT) from PALS within the time-out period, Senstar 100 will declare a Starcom Communication Fail Alarm. Therefore, in order to prevent Senstar 100 from declaring a Communication Fail Alarm, PALS must maintain a minimum message rate to the Senstar 100. This can be achieved by responding to the Senstar 100 audit messages which are sent 4 times during the time-out period.

If Senstar 100 has not received any message from PALS halfway through the time-out period, Senstar 100 will send a DLE XON message to PALS in case it has previously received a DLE XOFF message.

If Senstar 100 has declared a Starcom Communication Fail Alarm, it will try to re-establish communication with PALS every 60 seconds by sending it a DLE XON message and a software RESET message.

Upon receiving a software RESET message, PALS re-initializes the communications port.

2.7 Date/Time Processing

Senstar 100 sends the DATE/TIME VALUE to PALS upon Senstar 100 startup, at hourly intervals, and in response to a DATE/TIME REQUEST from PALS

3.0 Implementation Examples

3.1 Senstar 100 Initiated Messages

---

1) Senstar 100: sends a software RESET message
  DLE STX 03 00 01 FB DLE ETX
PALS: I) acknowledges receipt of message DLE ACK
  ii) re-initialize the communications port
2) Senstar 100: sends an XOFF, DLE XOFF
PALS: stops transmitting to Senstar 100 and buffers all further messages
3) Senstar 100: sends an XON, DLE XOFF
PALS: resumes sending messages to Senstar 100
4) Senstar 100: sends an ACK, DLE ACK
PALS: sends next message
5) Senstar 100: sends a NAK, DLE NAK
PALS: resends last message, up to 5 times
6) Senstar 100: sends an ALARM STATUS REQUEST message for input POINT 0
  DLE STX 06 02 02 00 00 03 00 F3 DLE ETX
PALS: i) acknowledges receipt of message
  DLE ACK
  ii) sends ALARM STATUS VALUE message for POINT 0 (e.g. Detection alarm)
  DLE STX 07 02 02 00 00 03 01 00 F1 DLE ETX
7) Senstar 100: sends ALARM STATUS VALUE message to initiate major self-test
  DLE STX 03 03 01 01 F8 DLE ETX
PALS: i) acknowledges receipt of message
  DLE ACK
  ii) performs major self-test and reports any errors
8) Senstar 100: sends HARDWARE STATUS REQUEST message
  DLE STX 02 04 00 FA DL EE TX
PALS: i) acknowledges receipt of message
  DLE ACK
  ii) sends HARDWARE STATUS VALUE message (e.g. RAMerror)
  DLE STX 03 04 01 02 F6 DLE ETX
9) Senstar 100: sends DATE/TIME VALUE message (e.g. 93/04/29 12:30:00)
  DLE STX 08 05 06 5D 04 1D 0C 1E 00 45 DLE ETX
PALS: i) acknowledges receipt of message
  DLE ACK
  ii) sets date/time PALS Initiated Messages 1) PALS: input buffers nears full capacity, sends an XOFF
  DLE XOFF
Senstar 100: buffers all further messages and does not send to PALS
PALS: must send XON within the timeout period in order to prevent communication failure declaration by Senstar 100
2) PALS: send XON
  DLE XON
  Senstar 100: resumes sending messages to PALS
3) PALS: sends an ACK
  DLE ACK
Senstar 100: sends next message
4) PALS: sends a NAK
  DLE NAK
Senstar 100: i) resends last message
  ii) after 5 retries, Senstar 100 will discard current message and proceed to send next message
5) PALS: i) detects a change in alarm state for one of its POINTs (e.g. POINT 130 goes into detection alarm state)
  ii) sends a ALARM STATUS VALUE message for POINT 130
  DLE STX 07 02 02 82 00 03 01 01 6E DLE ETX
Senstar 100: acknowledges receipt of message
  DLE ACK -continued 6) PALS: i) detects a change in hardware status (e.g. RAM error)
  ii) sends a HARDWARE STATUS VALUE message
  DLE STX 03 04 01 02 F6 DLE ETX
Senstar 100: acknowledges receipt of message
  DLE ACK
7) PALS: sends a DATE/TIME REQUEST message
  DLE STX 02 05 00 F9 DLE ETX
Senstar 100: i) acknowledges receipt of message
  DLE ACK
  ii) sends DATE/TIME VALUE message
8) PALS: sends a DATA LOGGER TEXT message (e.g. "POWER UP")
  DLE STX 0B 06 09 50 4F 57 45 52 20 55 50 0D 87 DLE ETX
Senstar 100: i) acknowledges receipt of message
  DLE ACK
  ii) prints "POWER UP" on printer

---

Appendix B

PALS Sensor Receiver Theory of Operation

1.0 Overview

This Theory of Operation pertains to the PALS signal strength receiver. The receiver detects the presence of in-band PPA transmissions and decodes the PPA ID modulation for processing by the CMPC.

The receiver is a conventional dual conversion superheterodyne with a first IF at 45 MHZ and second IF at 455 KHz. The first IF was chosen high enough for the helical input filter to provide adequate image rejection at 516.7875 MHZ (426.7875+2*45) and also allow use of an "off the shelf" filters at 45 MHZ. A two stage crystal filter stage was used to provide adequate image rejection at 427.6975 MHZ (426.7875+2*455).

The RSSI detection is done using the Phillips/Signetics SA616, which has extended RSSI range, linearity and monotonicity at 455 KHz. Also, Signetics gives provides adequate design data regarding RSSI temperature sensitivity. The RSSI current output is converted to voltage on chip, buffered using an internal op amp.

To insure accuracy of the RSSI analog output, a serial EEPROM is used to map the measured RSSI output voltage to calibrated input power data. To determine the actual power, the analog output is read with an 8 bit ADC, and this value is used as the address for the serial EEPROM. The data read from the EEPROM is the actual output power.

Since the SA616 cannot reliably cover the entire 80 dB dynamic range, a one bit variable attenuator is used for large input power levels. When the measured RSSI output voltage is greater than −35 dBm the attenuator will be enabled. When the attenuator is enabled, a 1 is appended (as most significant bit) to the ADC value read, and this number is used as the 9th bit of the EEPROM address. The recommended power ranges are be 0 dBm to −50 dBm (with the attenuator enabled) and −35 dBm to −100 dBm (without attenuator), so there will be a 15 dB hysteresis between ranges to eliminate frequent range changes near the power level boundaries.

The receiver is calibrated by measuring the analog RSSI voltage with and without the 30 dB attenuator at 5 dBm intervals from 0 dBm to −100 dBm. The receivers are calibrated at 50° C. to match the expected temperature in their final enclosure. Linear interpolation is used to calculate the input signal power for all possible ADC values (2×256)

and these values are stored in the EEPROM. In operational mode, the ADC converts the RSSI voltage to an 8 bit value, and the state of the attenuator is used as the most significant 9th bit. The 9 bit value is used as the address for the EEPROM and the contents of that address is the calibrated input power. During calibration, the 5V regulator voltage is measured, and values stored in EEPROM are compensated for any deviation from the calibration ADC 5.000V reference. This allows the use of the receiver on board 5V reference for the ADC operational reference voltage.

2.0 Detailed Circuit Description 2.1 RF Section/Attenuator

The RF section consists of a diversity switch, filter F1, Amplifier U2 and the single bit attenuator consisting of two MMIC switches and an resistive pad.

The purpose of the diversity switch is to reject multipath by sampling the received signal strength in two orthogonal antenna polarizations. The receiver samples these two RF inputs using a SPDT MMIC switch. The sampling rate is sufficiently fast to allow the PCP to determine which of the two signal levels is the greater and record this level within 50 ms.

Filter F1 is a three stage helical device, which attenuates out of band signals, and provides most of the image rejection at Frf+90 MHZ. The center frequency is 425 MHZ, with a pass band of about 4 MHZ. The insertion loss is 5.5 dB Max.

Amplifier U2 is a Mini Circuits monolithic RF amp, which provides about 13 dB of gain, and has a 1 dB compression point of 5.5 dBm. It is used to isolate the filter and attenuator circuits, and improve the noise figure of the system.

The digital attenuator is composed of the two SPDT MMIC switches and a resistive pad. When the attenuator is on (−30 dB) U1-4 is high. The SPDT switches are configured as a transfer switch with a short circuit in one path (0 dB) and a resistive pad in the other (30 dB).

2.2 Local Oscillator/Mixer

The local oscillator is composed of the Motorola 13176 PLL IC and associated components. The 13176 consists of a current controlled oscillator, fixed frequency divider, analog phase detector and crystal oscillator circuit.

The crystal oscillator circuit is composed of crystal Y1, C6 and C5. The crystal frequency (14.74336 MHZ) is exactly 1/32 of the (471.7875 MHZ) LO frequency. Capacitors C6 and C5 provide the feedback for a single transistor Colpitts oscillator. The values are selected to get as close as possible to the exact crystal frequency.

The crystal oscillator frequency is compared with the divided down VCO frequency, with an internal "mixer type" phase comparator. The current output of this phase detector is at pin 7 of the device. This current is fed to the loop filter composed of R2, C1 and C2. C2 is used primarily to suppress crystal frequency energy, to prevent unwanted reference frequency sidebands on the LO. The loop bandwidth is about 10 KHz, which is high enough to achieve adequate phase noise performance, but low enough to insure adequate reference frequency sideband rejection. Transistors Q2 and Q1 compose a current mirror to provide gain and adjust the DC levels to match the internal circuits on the IC. Q1 also provides additional current drive to the VCO to improve frequency range.

The VCO output is buffered and divided by 32 internally. The LO signal is then amplified and output at pin 14. The signal is fed to two stage helical filter F2 and then to the mixer LO port. The LO filter has a bandwidth of 3 MHZ, which will suppress LO harmonics, and somewhat suppress LO sideband spurs at 14.74 MHZ from the carrier. Mixer U6 was selected for good spurious signal performance, and relatively low cost.

2.3 IF Section

The IF section consists of crystal filters F3 and F5, U7 and associated components.

Crystal filters F3 and F5 both have a center frequency of 45 MHZ, bandwidth of 30 KHz and image rejection of greater than 60 dB at −910 KHz. The center frequency was chosen to be high enough to allow adequate image rejection near the RF input frequency, yet low enough to be able to procure standard values quickly and inexpensively.

The transistor amplifier formed by Q3 and associated components provides about 20 dB of gain, and matches the 910 ohm input resistance of crystal filter F3. Transistor Q4 is a emitter follower to provide isolation between the two filters. Two filters stages were used to provide better image rejection than was possible with the previous design topology.

U7 down-converts the 45 MHZ IF to 455 KHz by mixing with 44.545 MHZ. The 44.545 MHZ crystal oscillator circuit is formed by crystal Y2, C16, L5, C14 and C15. Crystal Y2 is a 3rd overtone device so L5 and variable cap C15 are tuned to resonate at the overtone frequency (44.545 MHZ). R11 is used with the input resistance of U7 to match the 910 output resistance of F5.

The mixer output is at pin 20 and is fed to ceramic filter F4. This filter has a bandwidth of 30 KHz and a −40 dB bandwidth of 60 KHz. The filter bandwidth was made wide enough to cover the transmitter frequency error, FM modulation of the carrier and the LO frequency error.

The filter output is fed to the IF amp input on the SA616. The IF amp output at U7-16 is fed to a resistor divider composed of R15 and R14, which provides a 12 dB inter-stage attenuation, and then input to the limiter stage. The inter-stage attenuation is recommended by Signetics for optimum RSSI linearity. The RSSI output is fed to the non-inverting input to an internal op amp. Resistors R13, R12 and R35 provide gain and bias to cover the 0.5 to 4.5 V range. Capacitor C37 is used to reduce RSSI output noise at the lower input power levels. A quad coil is provided to demodulate the PPA ID code. An active Butterworth filter limits the 3 dB bandwidth of the baseband signal to 300 Hz to 1 KHz.

2.4 Other Circuitry

The 9 pin DSUB I/O connector was selected to attenuate conducted energy between the PALS receiver and Dominion Wireless controller assemblies. Each pin has a PI L/C attenuator, to provide over 50 dB of attenuation above 200 MHZ. The voltage regulator is a LM78L05 three terminal device, which is bypassed at both the input and output with 10 uF tantalum capacitors.

What is claimed is:

1. A method for locating an object within a predetermined area comprising the steps of:
    a) sensing a signal output by the object using a plurality of sensors disposed within the predetermined area;
    b) forwarding a plurality of received signal levels from the plurality of sensors to a central processor; and
    c) comparing the plurality of received signal levels with a plurality of reference values to determine a location of the alarm signal, wherein the step of comparing comprises performing a best fit analysis of the plurality of received signal levels with the plurality of reference values.

2. The method according to claim 1, further comprising the steps of:
    d) transmitting one at a time a plurality of reference transmission signals; and e) measuring a received signal level output from each of the plurality of sensors after each transmission in step e), thereby forming the plurality of reference values.

3. The method according to claim 1, further comprising the step of coupling the plurality of sensors to a central computer via existing wiring in the predetermined area.

4. The method according to claim 1, further comprising the step of coupling the plurality of sensors to a central computer via a local area network having a physical interconnection layer, wherein existing wiring in the predetermined area is used as the physical interconnection layer of the local area network.

5. The method according to claim 4, further comprising the step of transmitting data from at least one of the sensors to the central computer as a spread spectrum signal.

6. The method according to claim 1, further comprising the steps of:
   d) grouping the plurality of sensors in predetermined groups;
   e) coupling each group of sensors to a relay via either an RF link or existing wiring; and
   f) coupling each of the relays to a central computer via a network.

7. The method according to claim 1, further comprising the steps of:
   d) grouping the plurality of sensors in predetermined groups;
   e) coupling each group of sensors to a relay via either an RF link or an AC power line;
   f) coupling each of the relays to an interface unit via a network; and
   g) coupling the interface unit directly to a central computer.

8. The method according to claim 1, further comprising the step of reprogramming any of the plurality of sensors by sending commands from a central computer to the plurality of sensors over existing wiring.

9. The method according to claim 1, further comprising the step of generating a voice message indicating the location of a received alarm.

10. The method according to claim 9, further comprising the step of transmitting the voice message over a public address system of the facility.

11. The method according to claim 9, further comprising the step of transmitting the voice message over a security radio network.

12. A method for locating an object within a predetermined area comprising the steps of:
   a) sensing a signal output by the object using a plurality of sensors disposed within the predetermined area;
   b) forwarding a plurality of received signal levels from the plurality of sensors to a central processor; and
   c) comparing the plurality of received signal levels with a plurality of reference values to determine a location of the alarm signal, wherein the step c) of comparing comprises determining a single best location that best fits the plurality of received signal levels.

13. A method for locating an object within a predetermined area comprising the steps of:
   a) sensing a signal output by the object using a plurality of sensors disposed within the predetermined area;
   b) forwarding a plurality of received signal levels from the plurality of sensors to a central processor; and
   c) comparing the plurality of received signal levels with a plurality of reference values to determine a location of the alarm signal, wherein the step c) of comparing comprises determining a plurality N of best locations that best fit the plurality of received signal levels.

14. The method according to claim 13, wherein the plurality N of best locations includes three to five locations.

15. A method for locating an object within a predetermined area comprising the steps of:
   a) sensing a signal output by the object using a plurality of sensors disposed within the predetermined area;
   b) forwarding a plurality of received signal levels from the plurality of sensors to a central processor; and
   c) comparing the plurality of received signal levels with a plurality of reference values to determine a location of the alarm signal, wherein the step c) of comparing comprises determining a boundary within which the object is located by determining a plurality of locations that best match the plurality of received signal levels and defining the boundary as a shape that encompasses the plurality of locations.

16. The method according to claim 15, further comprising the step of preventing sensors that do not receive a signal level greater than a predetermined value from contributing any input to the comparison in step c).

17. A method for locating an object within a predetermined area comprising the steps of:
   a) sensing an alarm signal output by the object using a plurality of sensors disposed within the predetermined area;
   b) creating a propagation model of the predetermined area, which can determine a signal level of an imaginary signal received at each of the plurality of sensors if a reference signal was transmitted at a reference location; and
   c) comparing a plurality of signal levels sensed by the plurality of sensors with a plurality of reference values predicted by the propagation model to determine a location of the alarm signal.

18. The method according to claim 17, further comprising the step of coupling the plurality of sensors to a central computer via existing wiring in the predetermined area.

19. The method according to claim 17, further comprising the steps of:
   d) grouping the plurality of sensors in predetermined groups;
   e) coupling each group of sensors to a relay via either an RF link or an AC power line; and
   f) coupling each of the relays to a central computer via a network.

20. An apparatus for locating a person within a facility comprising:
   a) a personal alarm transmitter;
   b) central monitoring system for locating a person carrying the personal alarm transmitter; and
   c) an array of sensors disposed throughout the predetermined area wherein multiple sensors are disposed within a plurality of overlapping zones within the predetermined area, said array of sensors being coupled to the central monitoring system, wherein if the personal alarm transmitter outputs an alarm signal, each sensor within a zone in which the personal alarm transmitter is disposed reports back to the central monitor computer, wherein said central monitoring system determines a location of an alarm by finding a best fit between a received alarm signal level array and a stored calibration array.

21. The apparatus according to claim 20, wherein the array of sensors and central monitoring system are coupled together by existing wiring in the facility.

22. An apparatus for locating a person within a facility comprising:
   a) a personal alarm transmitter;
   b) central monitoring system for locating a person carrying the personal alarm transmitter; and
   c) an array of sensors disposed throughout the predetermined area wherein multiple sensors are disposed within a plurality of overlapping zones within the predetermined area, said array of sensors being coupled to the central monitoring system, wherein if the personal alarm transmitter outputs an alarm signal, each sensor within a zone in which the personal alarm transmitter is disposed reports back to the central monitor computer; and
   d) a propagation model stored in the central mapping computer against which the received alarm signal level array is compared to determine a location of the alarm.

23. A system for locating a person within a facility comprising:
   a) a portable alarm transmitting means for transmitting a user activatable alarm signal;
   b) a sensing means sensing an alarm signal transmission and outputting a matrix of received signal levels; and
   c) a processing means coupled to the sensing means for determining a location of the alarm signal transmission by comparing a matrix of received signal levels output by the sensing means to a stored matrix of values, and selecting a location associated with one set of values in the stored matrix of values that best matches the matrix of received signal levels output by the sensing means.

24. The system according to claim 23, further comprising means for coupling the sensing means to the processing means.

25. The system according to claim 23, further comprising means for generating the stored matrix of values.

26. The system according to claim 25, wherein the means for generating comprises a propagation model that predicts a received signal level at the sensing means for a plurality of reference transmissions.

27. The system according to claim 23, wherein the means for coupling includes existing wiring.

28. The system according to claim 27, wherein the existing wiring includes AC power lines, coaxial cable, twisted pair, previously installed alarm wiring, telephone wiring, and cable television wiring.

29. A method for locating an object within a predetermined area comprising the steps of:
   a) interrogating the object with an interrogation signal;
   b) modulating the interrogation signal and reflecting an RF signal;
   c) sensing the reflected RF signal using a plurality of sensors disposed within the predetermined area;
   d) forwarding a plurality of received signal levels from the plurality of sensors to a central processor; and
   e) comparing the plurality of received signal levels with a plurality of reference values to determine a location of the alarm signal by performing a best fit analysis of the plurality of received signal levels with the plurality of reference values.

30. The method according to claim 29, wherein the step b) of modulating further comprises reflecting an incoming RF wavefront.

31. The method according to claim 29, further comprising the step of using only incoming RF power to generate the reflected RF signal.

32. The method according to claim 29, wherein the step of modulating comprises modulating the RF signal with a unique identification of the object.

33. The method according to claim 29, further comprising the step of enabling a code generator and an oscillator only upon receipt of the interrogation signal.

\* \* \* \* \*